(12) United States Patent
Barnett, Jr.

(10) Patent No.: US 12,006,926 B1
(45) Date of Patent: Jun. 11, 2024

(54) ANTI-CAVITATION DEVICE, FLUID END, AND METHOD

(71) Applicant: W. H. Barnett, Jr., Fort Worth, TX (US)

(72) Inventor: W. H. Barnett, Jr., Fort Worth, TX (US)

(*) Notice: Subject to any disclaimer, the term of this patent is extended or adjusted under 35 U.S.C. 154(b) by 1057 days.

(21) Appl. No.: 16/879,965

(22) Filed: May 21, 2020

Related U.S. Application Data

(60) Provisional application No. 62/850,745, filed on May 21, 2019.

(51) Int. Cl.
| | |
|---|---|
| F16K 15/06 | (2006.01) |
| F04B 11/00 | (2006.01) |
| F04B 15/02 | (2006.01) |
| F16L 41/03 | (2006.01) |
| F16L 55/055 | (2006.01) |
| E21B 43/26 | (2006.01) |

(52) U.S. Cl.
CPC .............. *F04B 11/00* (2013.01); *F04B 15/02* (2013.01); *F16L 41/03* (2013.01); *F16L 55/055* (2013.01); *E21B 43/2607* (2020.05)

(58) Field of Classification Search
CPC ...... F16K 15/065; F16K 15/066; F04B 11/00; F04B 15/02; F16L 55/055
See application file for complete search history.

(56) References Cited

U.S. PATENT DOCUMENTS

| | | | | |
|---|---|---|---|---|
| 7,891,374 B2* | 2/2011 | Vicars | ..................... | F16K 15/18 137/542 |
| 10,465,807 B2* | 11/2019 | Jinno | ..................... | F16K 15/063 |
| 2009/0142199 A1* | 6/2009 | Blanco | ..................... | F04B 53/10 137/542 |
| 2010/0183448 A1* | 7/2010 | Leugemors | ............. | F04B 49/22 417/53 |
| 2016/0215588 A1* | 7/2016 | Belshan | ................ | F16K 15/028 |

* cited by examiner

*Primary Examiner* — P. Macade Nichols
(74) *Attorney, Agent, or Firm* — Brian K. Yost; Decker Jones, PC

(57) ABSTRACT

The anti-cavitation device comprises a housing and valve assembly. A fluid end comprises one or more intake chambers, one or more exhaust chambers, a compression chamber, a plunger chamber, and one or more intake manifolds. The intake manifolds are fluidly connected to the intake chambers such that the intake manifolds are adapted to deliver the hydraulic fracturing fluid to the intake chambers. The intake chambers comprise intake valve assemblies adapted to regulate flow from the intake chambers to the compression chamber. One of the intake chambers comprises an anti-cavitation chamber positioned across from and co-planar with the plunger chamber. The anti-cavitation device is positioned within the anti-cavitation chamber. A method of reducing cavitation is provided, the method comprises the step of inserting the anti-cavitation device into the access opening of the fluid end. The anti-cavitation device may be used in existing, previously used, or new fluid ends.

20 Claims, 68 Drawing Sheets

Figure 8

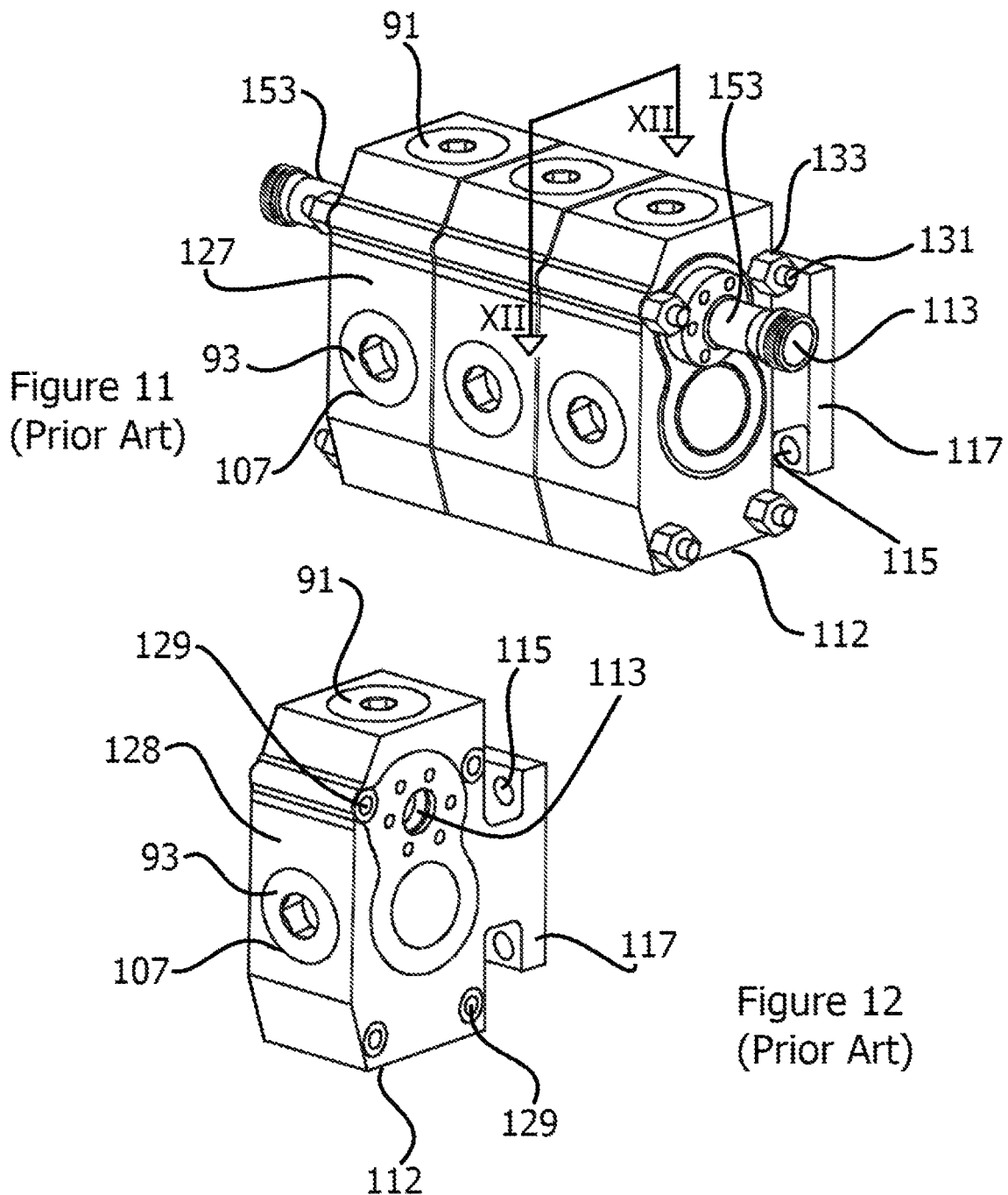

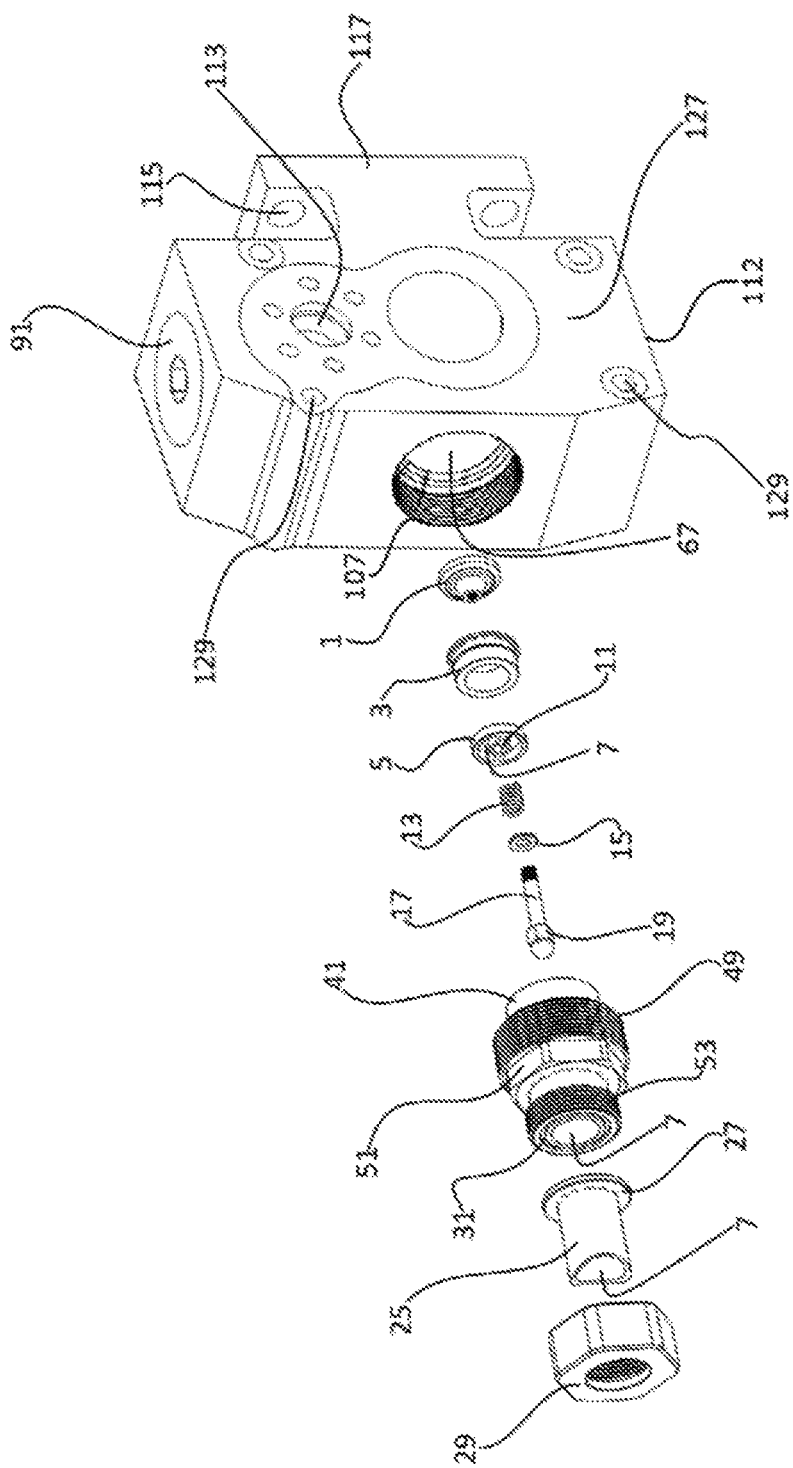

ANTI-CAVITATION DEVICE, FLUID END, AND METHOD

FIELD OF THE INVENTION

This invention relates in general to hydraulic pumps and specifically to an anti-cavitation device for installment in a fluid end of a hydraulic pump, a fluid end comprising an anti-cavitation device, and method of modifying a fluid end.

BACKGROUND OF THE INVENTION

Hydraulic fracturing is the injection, under pressure, of water, sand, and/or other fluids within a well formation to induce fractures in a rock layer. Oil and gas drilling operators commonly use hydraulic fracturing, or "fracking" to release petroleum and natural gas well as other substances from the rock layer. The high-pressure injection creates new channels in the rock which can increase the extraction rates and ultimate recovery of fossil fuels. A hydraulic fracturing pump or "frac pump" is used to pump water, sand, gravel, acids, proprietary liquids and concrete into the well formation. The solids pumped down the hole into the fractures keep the fractures from closing after the pressure is released. Operators generally attempt to pump as much volume as possible at or above the pressure necessary to frac the well.

Fracking gas or oil wells is very expensive and generally charged by the hour. Because the formation may be located thousands of feet below the earth's surface, the pressures generated and required by frac pumps are substantial, sometimes exceeding 20,000 pounds per square inch (psi). At peak times, a given frac pump may operate for more than eight consecutive hours (with drive engines running) at as much as 2800 revolutions per minute (rpm). With gear changes, the pump generally runs between a low of 60 rpm to a high of as much as 300 rpm.

A frac pump comprises two major components: a power frame and a fluid end. The power frame and fluid end are held together by a group of stay rods. The power frame is driven by high horsepower diesel engines, electric motors, or turbine engines. Internally, a frac pump increases pressure within a fluid cylinder by reciprocating a plunger longitudinally within the fluid end cylinder. Conventional high pressure, high volume frac pumps have either three or five cylinders.

The fluid ends of hydraulic or well stimulation pumps must produce enormous pressure and move a large volume of abrasive fluids that is high in solids content. Frac pumps were originally designed for intermittent service of six to eight hours per day. Today's pumps operate a continuous duty cycle many more hours per day and require more maintenance than ever before.

The high-volume requirements at extended use results in damage caused by a process known as "cavitation". Cavitation is one of the most important factors impacting performance, operability, reliability, and fluid end life. The word "cavitation" refers to the formation of vapor bubbles.

Cavitation occurs because of stress placed on the frac fluid. Cavitation bubbles are actually vapor bubbles. They are very similar to the same kind that is formed in a pot of boiling water. Water at sea level boils at 212 degrees. As you rise in altitude the atmospheric pressure decreases and water starts boiling at a lower temperature. You put the frac fluid under stress when pulling the fluid, the suction stroke of the plunger, into the compression area faster than the fluid can be supplied. This vacuum effect lowers the boiling point of the fluid by actually duplicating the lowering of atmospheric pressures effect on water. The fluid can be stressed enough to lower the boiling point below 70 degrees. Cavitation or vapor bubbles are easily formed at that temperature. The amount of bubbles formed depends on length of time at stress level and resistance to the free flow of the fluid. If you have lowered the boiling point of the fluid to 70 degrees and are supplying the fluid at 100 degrees a lot more vapor bubbles are formed. The more bubbles that are formed is taking up space instead of the fluid occupying the space in the compression chamber. Less fluid per stroke is the reduction of volume per stoke thus your loss of production. The more bubbles formed the more damage is happening to the surfaces exposed to the imploding cavitation bubbles. The vapor bubble will collapse in on itself as the pressure gets higher. This is called imploding the opposite of exploding. There is a very characteristic round shape to the bubble. The bubble is trying to collapse from all sides, but if the bubble is in contact against a surface, such as the inside metal walls of the pressure chamber, it cannot collapse from that side, so the fluid comes in from the opposite side at very high velocity preceded by a shock wave that causes damage to all the metal that is exposed to the vapor bubbles. As the plunger goes in on the compression stroke the bubbles collapse easily on the pressure stoke and when the fluid becomes whole it offers full resistance to the stroke and this produces a hammering effect that can promote cracking of the metal surfaces and increases noise and vibration levels. This pounding can happen up to five times a second. The higher level of this pounding also contributes to the premature loss of the fluid end. Cavitation bubble collapse also produces shock waves that produce an undesired sound and vibration. All of these effects actually contribute to the noise pollution of the frac site.

The vapor bubbles that are formed migrate to solid metal surfaces. They implode against the metal surface with a force up to 60,000 lbs. This implosion results in an erosion of all metal surfaces in the environment. The more resistance to the draw of the plunger the more cavitation bubbles are formed increasing the amount of erosion.

Though damage from a single bubble collapse is almost immeasurable, the constant accumulation of damage caused by masses of similar collapses over a period of time causes significant removal of material. The highly focused jets of liquid from the imploding bubbles blast away micro-amounts of material. Cavitation erosion weakens the walls of the fluid end which can lead to cracking. Over time, this micro fracturing of the metal surfaces and wearing away of metal eventually results in complete loss of the fluid end. The constant wearing away of the surface keeps fresh material exposed for corrosion to aid in removal of metal. This erosion also causes premature replacement of the valve assembly adding to down time and maintenance cost.

Conventional fluid end manufactures provide different size plungers to offer different flow rates in fluid ends. The posted outputs are mathematically correct. However, in practice, they are not. For example, mathematically, a 4½ "diameter plunger with an 8" stroke displaces 127.2345" or 0.5508 gallons. In practice, however, there can be a loss of 40 to 60% of this volume due to intake flow limitations of the fluid end that cause cavitation when run in a production environment.

Frac fluids consist mostly of water and water is not compressible or expandable. Pumps are positive displacement so when the draw of the plunger out paces the intake source a vacuum is formed that has the effect of lowering the atmospheric pressure and allows vapor bubbles to form, from the liquid that is present, occupying space in the compression area with vapor instead of whole liquid. RPM that the pump is ran at dictates the output of the pump with any given plunger size. Once the ratio of draw vs source is surpassed cavitation bubbles start being formed. Vapor bubbles take up space and make noise. The higher the draw to available source the more vapor bubbles are formed. You run the pump at an acceptable level of cavitation. This means cavitation is controlling the output of the pump costing millions to the industry each year because loss of potential production.

A failure to understand cavitation, costs the industry millions because of either inexperienced workers controlling the pump or a production demand that makes the powers to be think that raising the RPM will result in more production. This usually, results in operators running their pumps too fast producing more cavitation bubbles that cause damage to the fluid ends. Cavitation does control the output of the pump. By reducing cavitation, you receive longer valve life, overall fluid end life, more up time, less maintenance and a higher production rate.

Individually, a single collapse of a vapor bubble produces virtually no damage. But because cavitation is generated constantly in high velocity flows, damage caused by these bubbles compounds over time and can be seen as pitting. The rate of surface erosion accelerates over time as the deteriorated and deformed surface creates more turbulence and, thus, more cavitation. This action is especially pronounced for metals such as iron and steel on which surface degradation is worsened by a tag-team effect of corrosion.

Frac fluids are mainly sand and water. Concentrations of sand to water can run as high as 16%. Frac sand is very costly and is graded and sold by size of grain. Cavitation bubbles are drawn to solid surfaces. Sand has solid surfaces. When the formed cavitation bubbles implode against the sand they are reducing the grain size the company paid for and forming a new grain size. Sand is brittle and the implosion can do more damage to the sand than the metal given the same exposure.

A constant premixed solution of frac fluid is supplied to the suction manifold 165. When the plunger 65 is pulled on the suction stroke frac fluid is pulled from the intake manifold 165 into intake side of the fluid end through an adjoining tube 167, into the entry of the intake side of the fluid end 112. Frac fluid is pulled into the fluid end through the intake valve assembly 141,143 into the compression chamber 67. When the plunger 65 hits the end of the intake stroke it begins the compression stroke. As the plunger 65 moves into the compression stroke the intake valve 141 closes and the pressure valve 87 opens exposing the frac fluid to the line pressure. As the plunger 65 moves forward the frac fluid in the pressure chamber 67 is pushed out of the compression chamber 67 through the pressure valve assembly 87, 89 into the exit path 113 of the fluid end. This process is repeated whatever RPM the frac pump is set to run at. The smaller the plunger 65, the faster the RPM of the pump. As the plunger 65 size increases the RPM goes down because the opening in the valve assembly 143, 141 is constant but the demand to fill the compression chamber 67 increases to the point that if the RPM is not slowed, cavitation will increase beyond operational limits. That is why cavitation always controls RPM of the frac pump. At the end of the compression stroke the pressure valve 87 closes and the plunger 65 begins the same cycle over again. Fluid pushed into the exit stream 113 travels through high pressure lines to the gas well being fracked.

The valve seat 143 is the largest restriction. The valve seat inside diameter, for plunger sizes 3½" thru 5" in ½" increments, is 3.20". The most common used diameter plunger is 4½" and 5". The suction pull of the plunger 65 is what opens the valve 141 and pulls frac fluid into the compression chamber. The ratio of valve seat 141 inside diameter to plunger 65 diameter is far off. You can overcome the volume allowed easily through the valve seat 143 by increasing the speed of the stroke, raising the RPM of the frac pump. Once you start to overcome the inside diameter of the valve seat 143 a low-pressure event starts occurring and vapor bubbles start to form. The faster the pull through the valve seat 143 restriction the lower the pressure drops and the cavitation bubbles really start multiplying. Space is also taken up in valve seat 143 inside diameter with the valve guide 88. This also cuts down on volume allowed through the valve seat 143. The flat angle of the valve 141 itself also adds to the restriction through the intake path 7 of the frac fluid. As the fluid is pulled into the compression chamber 67, the fluid follows the plunger and has to make a sharp turn. This causes a shearing action to the frac fluid which causes a low-pressure event producing vapor bubbles that add to the cavitation.

What is needed is a frac pump that can operate efficiently with a reduced amount of cavitation.

BRIEF DESCRIPTION OF THE DRAWINGS

Figure 8:
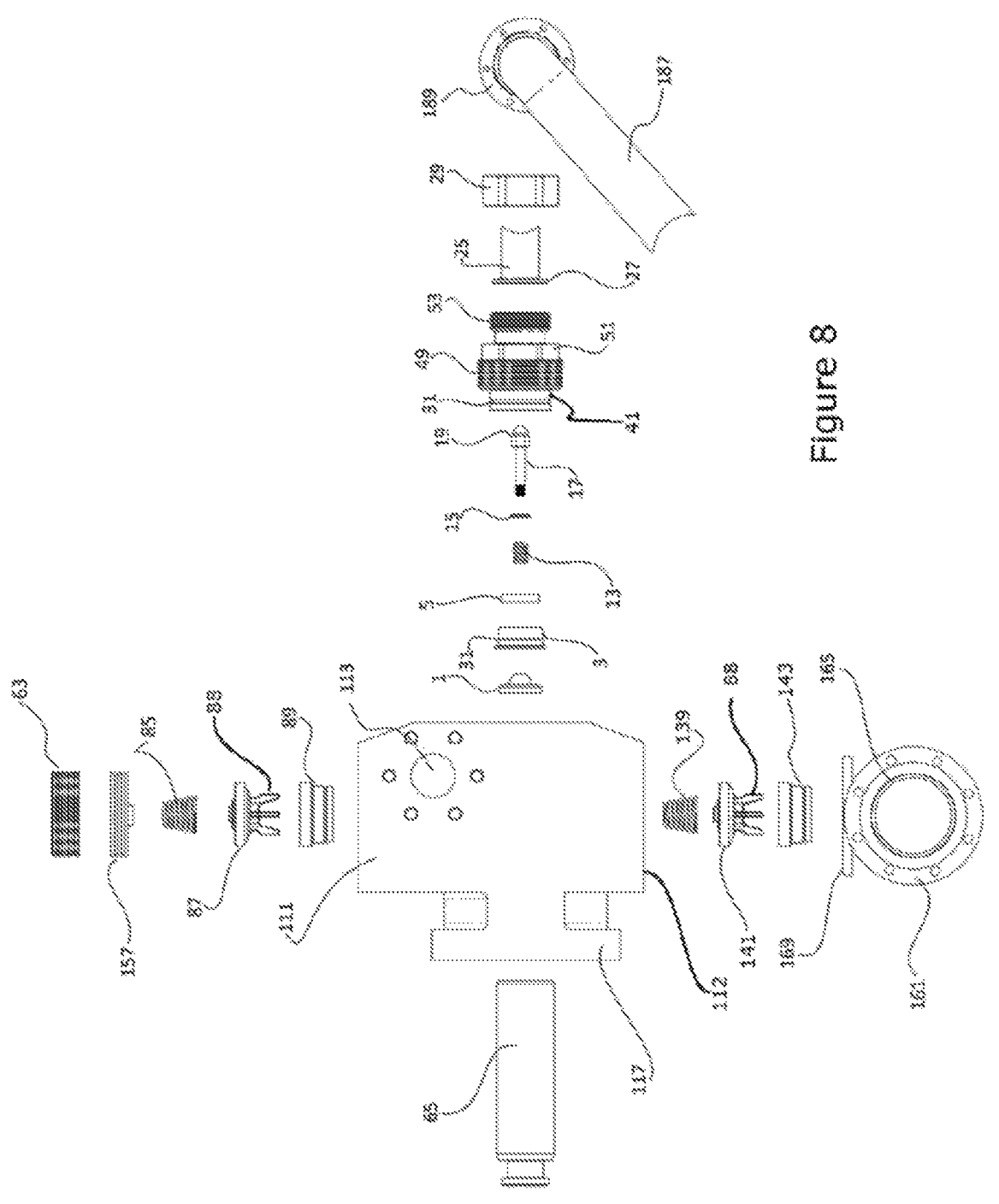

FIG. 8 is an exploded elevation view of the modified mono block fluid end of FIG. 6.

FIG. 11 is an isometric view of a prior art segmented fluid end.

FIG. 12 is an isometric view of a segment of the prior art segmented fluid end.

FIG. 13 is an exploded isometric view of a modified segmented fluid end, in accordance with a preferred embodiment.

DETAILED DESCRIPTION OF PREFERRED EMBODIMENTS

Figure 1:
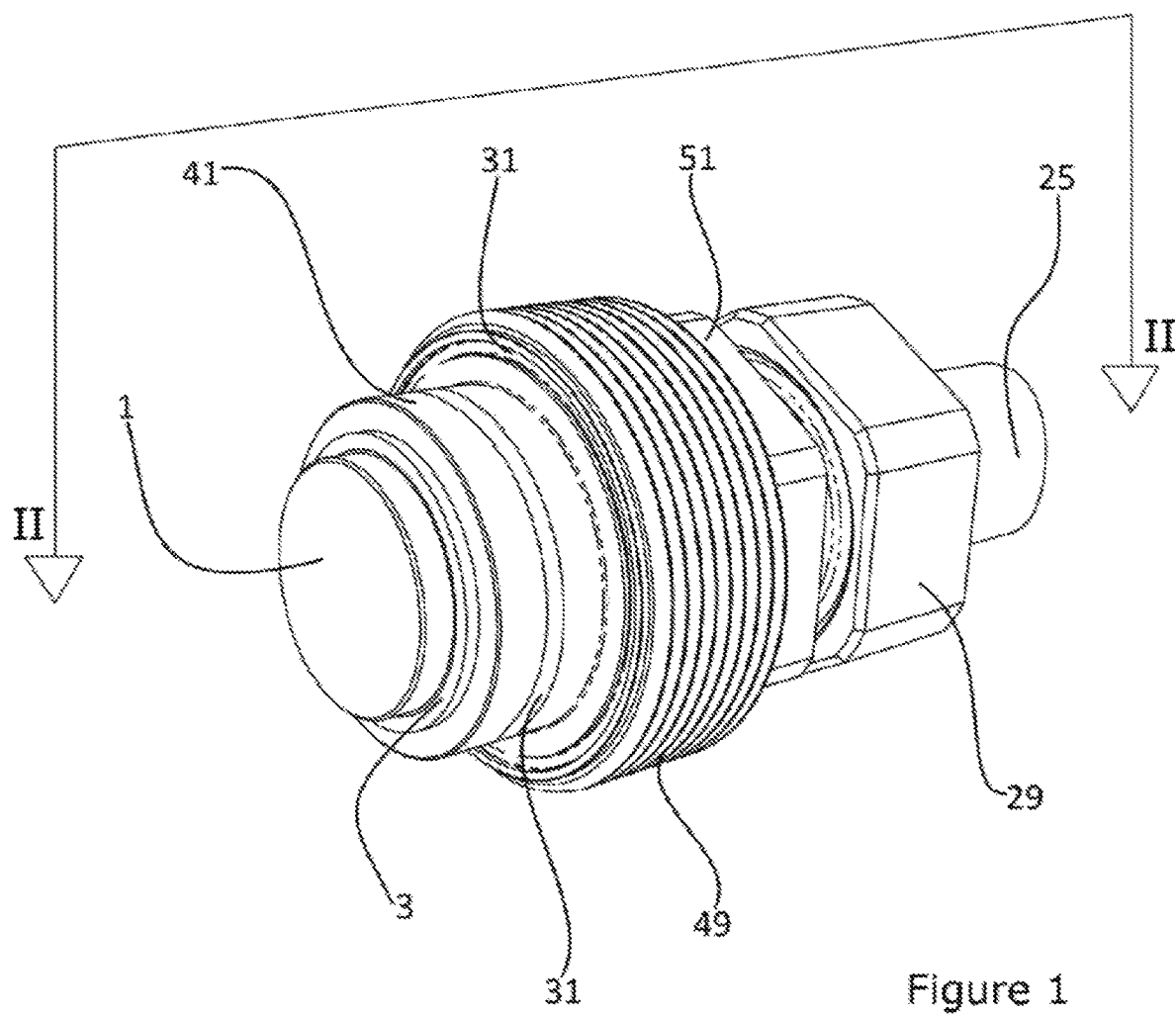
FIG. 1 is an isometric view of an anti-cavitation device, in accordance with a preferred embodiment.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of Elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation.

In preferred embodiments, a conventional fluid end threaded hole/access opening 107 is modified. In conventional fluid ends, this threaded hole 107 is used only for valve 141 and plunger 65 access. With embodiments of the present invention, the threaded hole is modified so as to permit the fluid end to have greater fluid intake.

In other embodiments, a fluid end comprises a plurality of intake valves and other features as described more fully below.

Methods of modifying fluid ends are also provided. In one embodiment of the method of the present invention, a conventional fluid end comprising a threaded hole/access opening 107 is modified to comprise an ACD assembly as described herein. The method generally comprises the steps of providing a fluid end comprising a threaded hole; using the existing threaded hole/access opening 107, installing an ACD assembly within the threaded hole.

In other embodiments of the method, the assembly can comprise several configurations as described herein.

In other embodiments of the method, an ACD assembly is installed in a fluid end that does not comprise a threaded hole/access opening 107.

In certain embodiments of the invention, a modified manifold is provided to supply fluid to the ACD assembly.

With the present invention, greater fluid volume demanded by the suction pull of the plunger 65 may be accessed. Plunger size 3½" thru 5" are the plungers used for the highest-pressure applications of the fluid end. This pressure demands more material around the pressure areas of the fluid ends. This material requirement limits the size of a valve assembly 139,141,143 due to fixed center distances of the cylinders. With conventional fluid ends, a larger valve 141 cannot be installed when running the 3½" thru 5" plunger 65. The high-pressure operation of the fluid end requires a certain mass of material in order to maintain strength requirements of the cylinder.

In preferred embodiments, the modified fluid end comprises a one-piece ACD housing 41 comprising a valve assembly 1, 3, 5, 13, 15, 19. This valve housing 41 is positioned, with no flange screws, into an existing hole 107 of the fluid end. The one-piece seals to the same extent as the parts 93, 109 that it is replacing. There is a cost saving in not having to buy the parts 93, 109 the one-piece ACD is replacing—a suction housing 109 and retainer nut 93. There is a modified valve assembly 1, 3, 5, 13, 15, 19 installed in the one-piece ACD housing 41. Different size valves can be installed in the one-piece ACD housing 41. The ACD housing 41 changes the way the fluid moves and fills the area the suction cover 109 fills. This access hole 107 weakens the fluid end by increasing the surface area inside of the cylinder pressure chamber 67. This increases the overall pressure the fluid end sees on the compression stroke due to the extra exposed square inches. The housing 41 and pressure face of the valve 1 effectively block off this area, blocking several square inches, lowering the overall internal pressure the fluid end cylinder sees. The valve 1 is heat treated such that its surface is much harder than the fluid end, thus, exposing a very good wear surface to the cycling action of the pump.

The ACD housing 41 has its own intake manifold 193. This intake manifold 193 can get its supply of frac fluid from either the same source as the main intake manifold 185,187 as illustrated or an independent supply. When the intake manifold is charged with frac fluid the ACD 1 works the same as the regular intake valve 141. When the plunger 65 goes on the suction or intake stroke it pulls fluid through the ACD 1 the same as through the original intake valve 141. Since the area of supply has increased through the additional frac fluid supply of the ACD the vapor threshold is raised cutting the amount of cavitation down greatly. The extra supply helps fill up the compression chamber 67 more fully effectively increasing the efficiency of the fluid end. The fill rate will change from 40 to 60 percent full to 70 to 90+percent. Since the point that cavitation starts has been raised, the RPM may be raised to increase the output of the pump.

Conventional fluid ends are not designed to be free flowing. This lack of free flow through the intake valve assembly is one of the aspects addressed with this invention. With the modified fluid end, the fluid enters the compression chamber 67 in the same plane that the plunger 65 works in. This eliminates sharp turns and reduces the cavitation produced when compared to the sharp angle the fluid has to follow with flow from the regular intake valve 141.

Having a freer intake flow which cuts down on cavitation doing damage to the fluid end and filling the compression area more fully the invention will increase the life and output of the fluid end. Valve assembly 1, 3, 5, 13, 15, 19 and parts are very easy to install or remove.

One-Piece ACD with and without Flange

In this embodiment, the valve 45 is designed to work with fluid ends that do not have a back access 107 such as the Y Type 125 and multi piece segmented fluid end 80. These fluid ends have to be modified to accept the ACD 1. These units are in the minority in the field but this design will bring all the benefits of the ACD 1 to these users with this low-cost modification. The flange built into the ACD housing 45 controls the depth that the housing is fastened into the fluid end.

All benefits and design between the one-piece ACD 41 and the ACD with flange 45 is the same except on how the depth of insertion is handled. The flanged ACD 45 uses the same intake manifold 165 as the intake manifold 165 used with the ACD housing 41. The valve assembly and parts are very easy to install or remove.

Two-Piece ACD

In this embodiment, the valve assembly comprises a two-piece design 199, 202. It is intended to be positioned in the same location on fluid end and uses the same intake manifold 165 as the two above units. The unit 202 that attaches to the head can be modified to fit any fluid end. The first piece 202 has the bottle bore 205 that is needed for fluid to pass around the valve 1. Since the bottle bore 205 and reduction of bore 211 to enter head will have the highest wear when in operation easy replacement of just this piece 202 will save end user money. If the first part 202 wears out, replacement does not affect the second part 199. Since this design is external to the head its size is not dictated by center distance of the fluid end. A larger valve can be installed which gives all the benefits of the ACD 1 to the larger size plungers, 5½" thru 7½". This design could be used to increase the ACD 1 size to further help reduce cavitation for the 3½" thru 5" plungers. The second half 199 holds the valve assembly 1, 3, 5, 13, 15, 19. When replacement is needed, it does not affect the other piece 202. Valve assembly 1, 3, 5, 13, 15, 19 and parts 199, 202 are very easy to install or remove.

Built In ACD

In this embodiment, the fluid end 80 itself serves as the housing for the ACD assembly. This valve assembly uses the same intake manifold 193 as all the other versions. Connection of the intake supply 25 of frac fluid to the body 79 of the fluid end holding the valve assembly 1, 3, 5, 13, 15, 19 can have a bolt on flange 27 as illustrated or a screw in connection tube. This design is designed to be used with fluid ends with no back access 80,125. The valve assembly 1, 3, 5, 13, 15, 19 is the same design as in the other versions. The operation and benefits of the ACD 1 are the same as the other versions.

Detailed Explanation of Components

Referring to FIGS. 1-3, 7-9, 13, 15-18, 22-23, 27-28, 30-31, 35-37, and 43-45, an ACD head 1 of valve assembly is shown. The valve head 1 face is exposed to the pressure chamber. The valve head 1 is heat treated for wear resistance. The valve head 1 back face seals against the seal plate. This action seals against the pressure created by the pressure stroke of the plunger. When closed, the valve head 1, also seals against loss of prime. The valve head 1 is pulled open by the suction created by plunger pulling out in the pressure chamber. This allows additional fluid to be pulled into the pressure chamber.

Referring to FIGS. 1-3, 7-9, 13, 15-18, 22-23, 27-28, 31, 35-37, and 43-45, an ACD valve seat 3 is shown. This seat 3 is offered in may sizes. ACFE (discussed below) requires a larger valve and seat than conventional designs allow to bring the benefit of replacing two valves with one valve.

Referring to FIGS. 2-3, 7-9, 13, 15, 17-18, 22-23, 27-28, 30-31, 35-37, 43, and 44-45 an ACD spring retainer 5 is shown. The spring retainer 5 helps keep the valve spring contained in a compressed or charged state to help close the valve when the valve has been opened. It also designed to permit fracking fluid to pass through it. It is also designed with a pilot hole to hold in place and guide the valve stem. This could be designed different ways.

Referring to FIGS. 2-3, 7-9, 13, 15, 17-18, 22-23, 27-28, 30-31, 35-37, and 43-45, there is shown an ACD retainer fluid path 7. This path 7 through the valve spring retainer offers a path that frac fluid can pass through to enter the compression chamber. It is desirable to have as free of flow as is possible.

Referring to FIGS. 2, 3, 9, 13, 15, 18, 31, 37, and 44-45, an ACD valve stem guide through spring retainer 11 is shown. This guide 11 is a hole in the valve spring retainer that guides the valve stem to keep the valve head aligned. This is one of several ways to guide and locate the valve. This is a heat treated part in most embodiments.

Referring to FIGS. 2, 3, 9, 13, 15, 18, 31, 37, and 44-45, there is an ACD spring 13. This spring 13, when enclosed between the retainer and the spring stop, keeps the valve in the closed position until the suction pull of the plunger overcomes the spring tension and opens the valve. As the suction stops, the spring closes the valve. A straight version is illustrated but it can be tapered as depicted in elements 85 and 139.

Referring to FIGS. 2, 3, 7-9, 13, 15, 17, 23, 27-28, 30-31, 35-37, and 44-45, an ACD spring stop 15 is shown. Illustrated is a hardened washer that keeps the spring from wearing against the valve stem head. Working with the valve spring retainer, this keeps the valve spring retained in a compressed state.

Referring to FIGS. 2-3, 8, 9, 13, 15, 17-18, 23, 27-28, 30-31, 36-37, and 44-45, there is depicted an ACD alignment stem 17. This ACD alignment stem 17 comprises a hardened rod that guides the valve. One end is attached to the valve head and a stop on the other. An end connected to the valve can be pressed, welded, screwed, or many other ways known in the art for connecting the stem to the valve head. The end opposite the valve can have a fixed head or be manufactured for valve keepers as is known in the art.

Referring to FIGS. 2-3, 7, 8, 9, 13, 15, 17-18, 23, 27-28, 30-31, 35-37, and 43-45, an ACD stem head 19 is illustrated. This stem head 19 acts as a valve stem retainer and is positioned opposite the valve head on the alignment stem. It can be manufactured as fixed, screwed on or as valve spring keepers.

Figure 47:
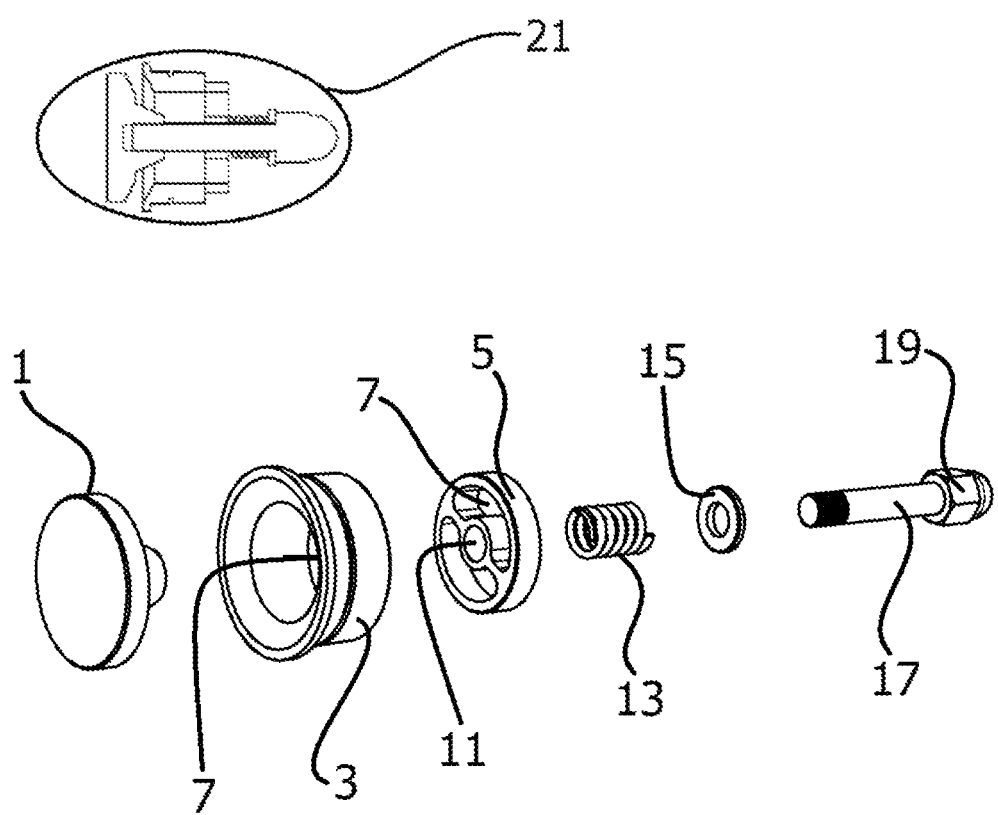
FIG. 47 is an isometric exploded view of an anti-cavitation device, in accordance with a preferred embodiment.

Referring to FIG. 47, an ACD assembly 21 is shown. The ACD assembly 21 is installed by fixing the valve seat in place in the different size housings. This assembly 21 may be easily installed and removed as a unit for convenience.

Referring to FIGS. 1-3, 6-9, 13, 15-18, 21-23, 26-31, and 34-46, an ACD intake manifold feeder tube 25 allows the extra flow of fracking fluid through the ACD on the demand of the suction pull of the plunger. This tube 25 is a transition tube that allows the extra flow of fracking fluid thru the ACD on the demand of the suction pull of the plunger. The tube 25 gets its supply of fracking fluids from the ACD main feed tube. It is attached to the ACD main feed tube on one end and has a flange attached on the other that seals against the ACD housing. These actions can be accomplished in different ways.

Referring to FIGS. 2, 3, 8-9, 13, 15, 17-18, 23, 28, 30-31, 36-37, and 42-46, an ACD intake manifold feeder tube sealing flange 27 is connected to the transition tube and is used to seal either against the ACD housing or against the body of the plunger manifold on the internal ACD assembly. This flange 27 can be round, square, flat or threaded or other configurations. This flange 27 incorporates a type of sealing gland, usually an O ring, and seal to stop leakage between the intake manifold and fluid end.

Referring to FIGS. 43-46, an ACD intake manifold feeder tube bolt on sealing flange 28 is connected to the transition tube and is used to seal against the body of the plunger manifold or could be timed to bolt to a modified ACD housing. It can be round, square, flat or threaded or other configurations. It will incorporate a type of sealing gland, usually an O ring, and seal to stop leakage between the intake manifold and fluid end.

Referring to FIGS. 1-3, 6-10, 13, 15-18, 21-22, and 26-38, an ACD manifold attachment cap 29, is captured between the main feed tube and the sealing flange. There are many ways to attach the suction manifold to the ACD such as shown in element 301. When tightened onto the ACD main housing, this cap 29 captures the sealing flange between itself and the main housing and seals against the flow of fracking fluid. It can be tightened by wrench or hammer wings.

Referring to FIGS. 1-3, 5, 8-9, 13, 15-18, 20, 22, 27, 28, and 30, preferred embodiments comprise sealing glands 31 which incorporate several different types of seals such as, but not limited to, O ring, D ring and poly pak.

Figure 2:
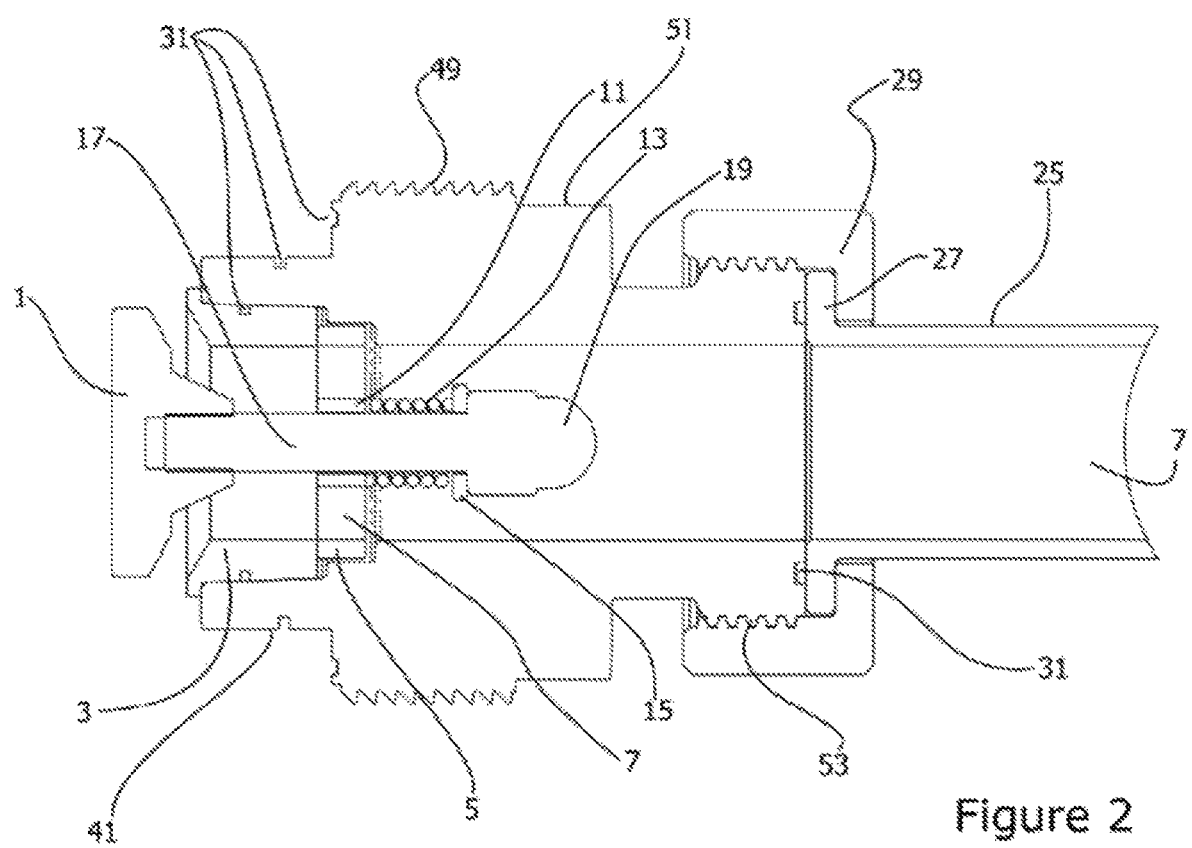
FIG. 2 is a sectional view of the anti-cavitation device of FIG. 1, cut along the line II-II of FIG. 1.
Figure 3:
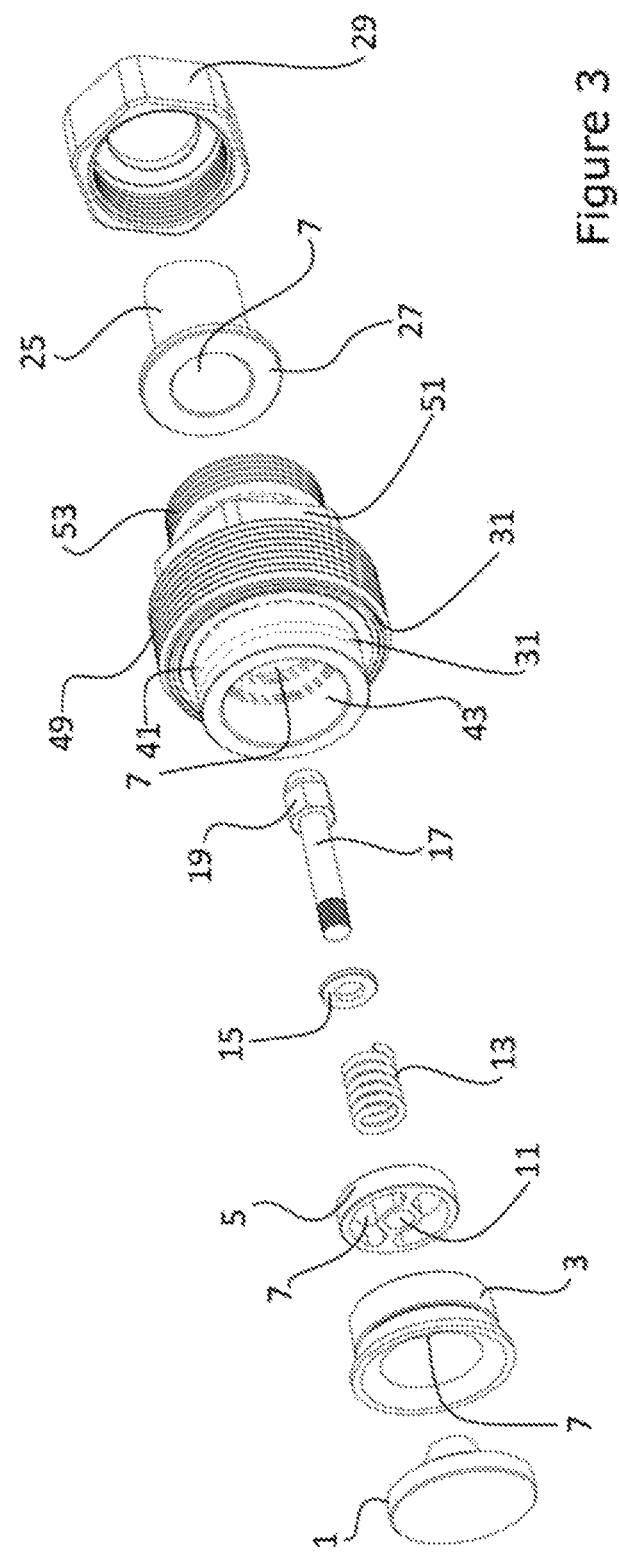
FIG. 3 is an exploded view of the anti-cavitation device of FIG. 1.
Figure 4:
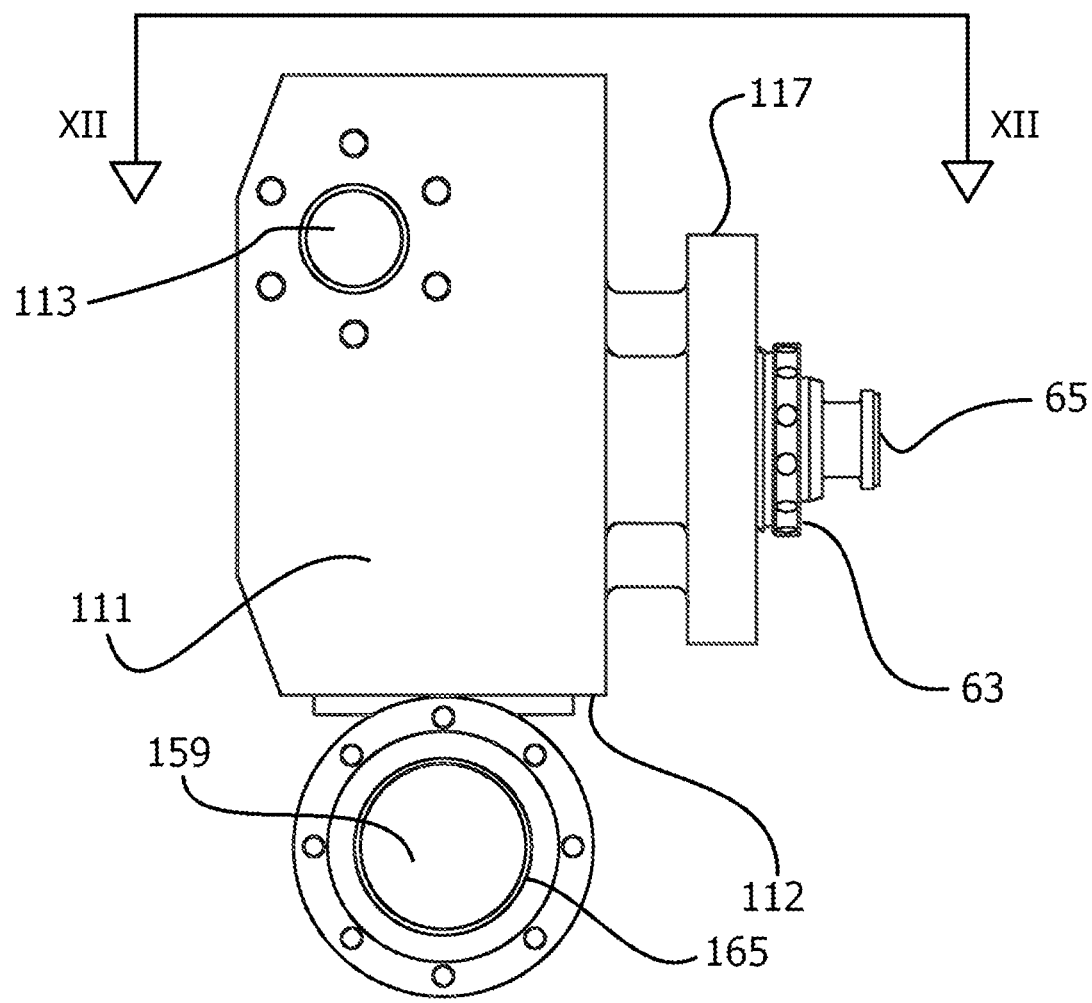
FIG. 4 is an elevation view of a prior art mono block fluid end.

Referring to FIGS. 1-3, Element 39 a one piece ACD assembly 39 may be incorporated in the most common fluid ends (95%+). The assembly 39 will fit and seal in the existing valve access holes 107 in the back of the fluid end. The assembly 39 can be attached to and used without any modification to the existing fluid end. The threads that attach the ACD housing to the fluid end may be different depending on the fluid end manufacture. The design and function of the assembly 39 are generally the same no matter how the ACD housing attaches.

Referring to FIGS. 1-3, 6-9, 13, and 15, an ACD one-piece adapter housing without flange 41 houses the ACD assembly 39. The adapter housing 41 is threaded into the opening in which the retainer nut is screwed into valve access holes 107 in most fluid ends. This access hole 107 in the back of most fluid ends normally has a suction cover and seal installed with a retainer nut installed to seal up the fluid end. The normal purpose of this access hole 107 is to provide an access point to the intake valve for valve changes and can also aid in plunger replacement. Different manufactures provide different types of threads in this access hole 107. The ACD's housing 41 retaining threads can be manufactured to match all manufacture's frac pump fluid ends and can generally be used without modification of the different manufacture's fluid ends. The ACD housing 41 seals and blocks the access hole 107 to the same extent as the stock suction cover and retaining nut. The housing 41 does not interfere with normal operation of the fluid end and gives the same access to the fluid end for valve and plunger changes. The ACD assembly housing 41 may be torqued to the same values as the stock retaining nut or to different values depending on the desires of the user. The housing 41 can be tightened either by wrench or hammer unions.

Referring to FIG. 3, an ACD adapter housing valve seat 43, a hardened steel valve seat 43, is configured to be pressed into place in the ACD housing 41 and provides a holding mechanism for the valve assembly, a seal area for the valve to seal against the pressure created on the pressure stroke and to help the fluid end keep its prime. The seat 43 has a flow path through its center for the frac fluid supply to pass. There are different ways to hold the valve seat in place without pressing into place. A pressed fit is the most common.

Referring to FIGS. 16-18, 21-23, and 27-28, an ACD adapter shoulder stop 45 is shown. This is a flange 45 built onto the ACD housing assembly to control the depth the ACD housing assembly is inserted into a fluid end that does not normally have the back access hole 107 in the type fluid end such as the Y Type fluid end and the multi segment segmented fluid end. Such fluid ends are modified to accept the ACD assembly. Its function and way of tightening of the housing to the fluid end is generally the same as the most common one-piece housing.

Figure 16:
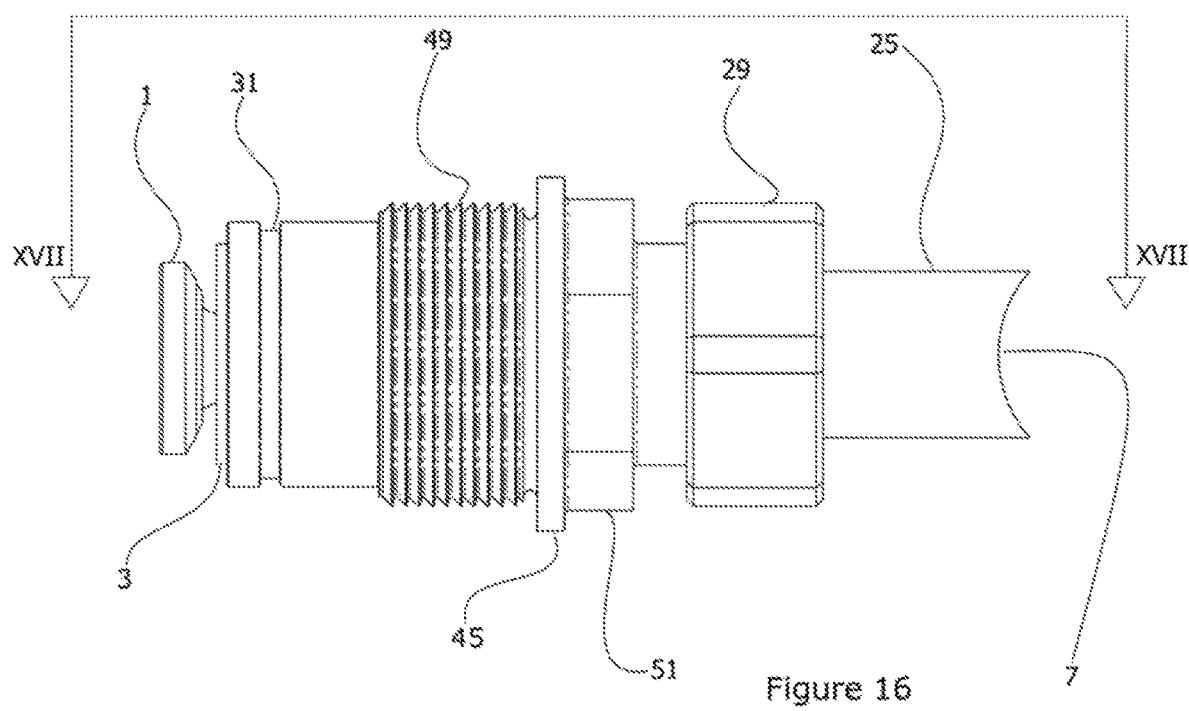
FIG. 16 is an elevation view of an anti-cavitation device, in accordance with another preferred embodiment.
Figure 17:
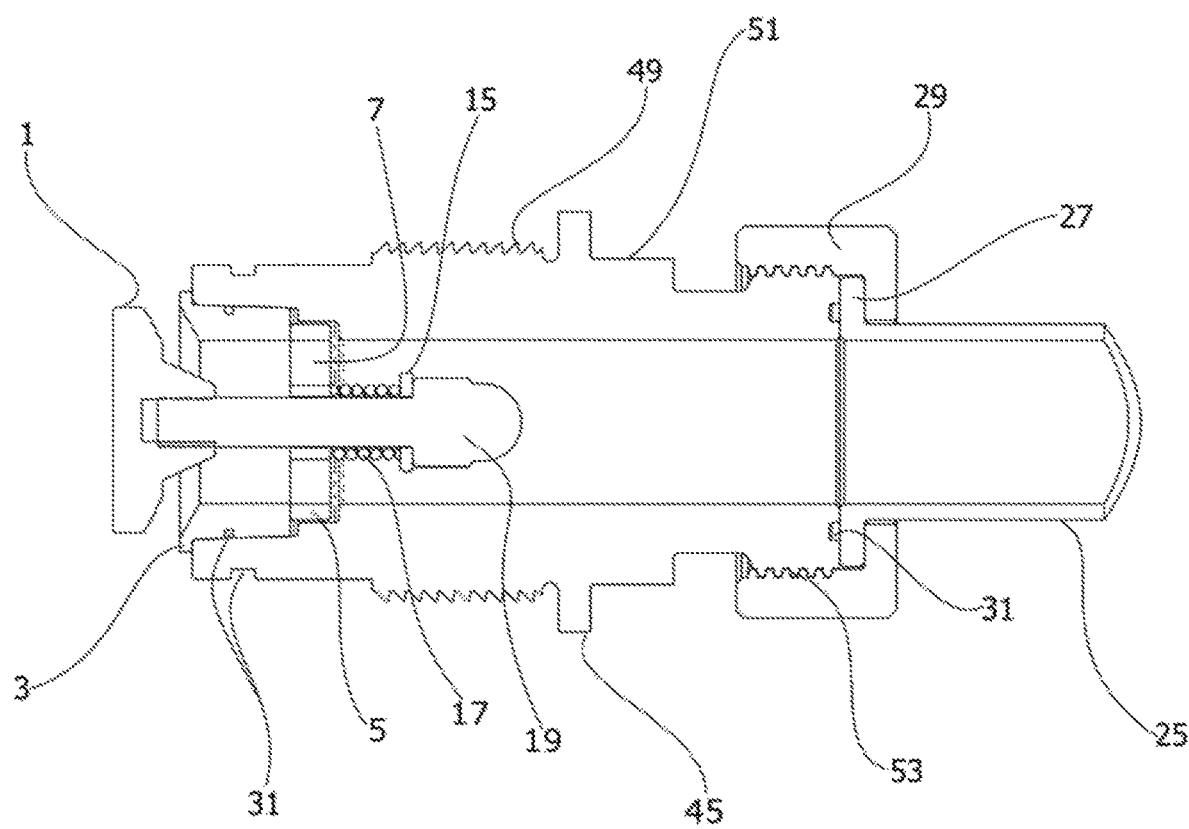
FIG. 17 is a sectional view of the anti-cavitation device of FIG. 16, cut along the line XVII-XVII.
Figure 18:
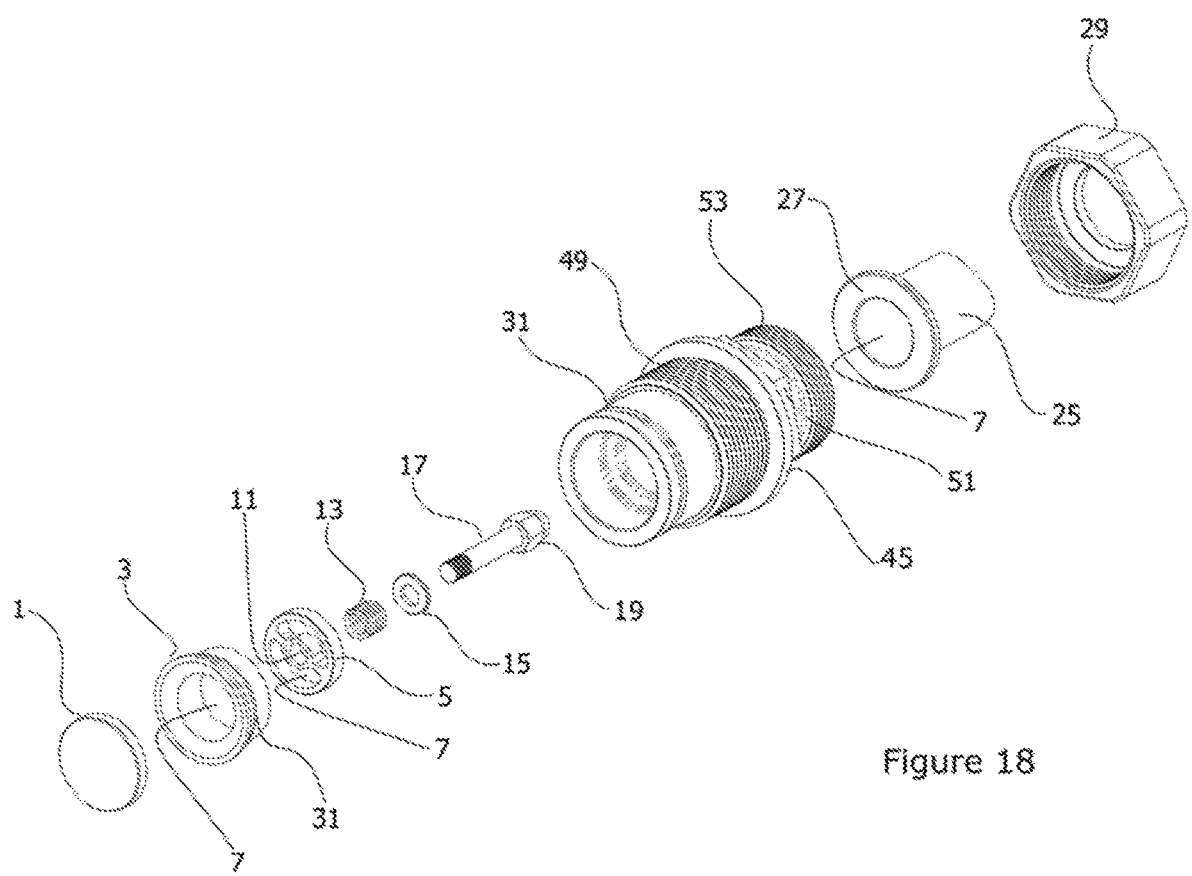
FIG. 18 is an exploded view of the anti-cavitation device of FIG. 16.
Figure 19:
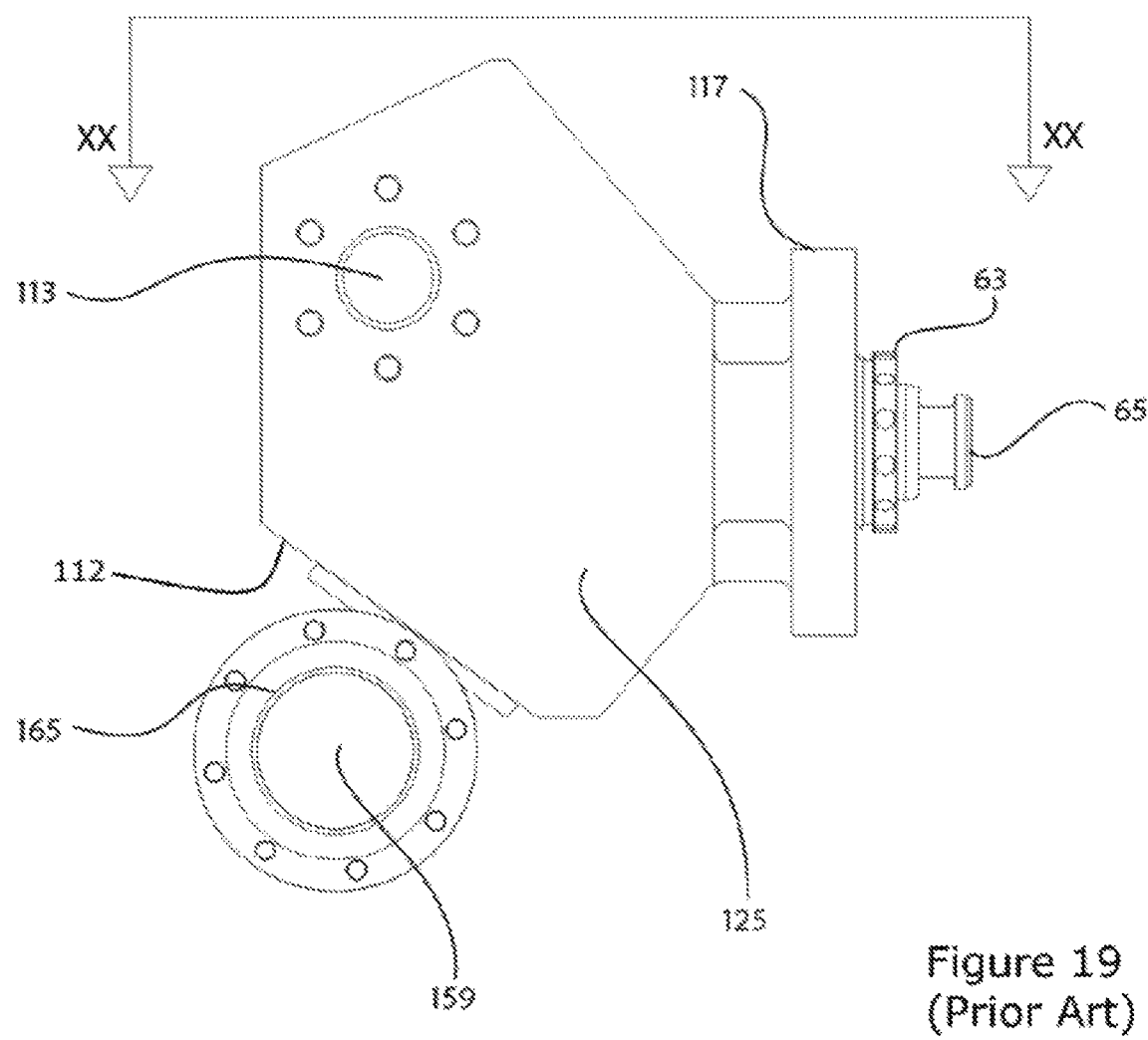
FIG. 19 is an elevation view of a prior art Y-Type fluid end.

Referring to FIGS. 16-18, a one piece ACD assembly 47 with flange stop 45 is shown. This assembly 47 uses the same style ACD assembly as the other housing versions. Its function and way of tightening of the housing to the fluid end is the same as the most common one-piece housing.

Referring to FIGS. 1-3, 8-9, 13, 15-18, 22, 23, and 28, ACD adapter housing retaining threads 49 hold the ACD housing in place. The retaining threads 49 shape and size can be modified to fit any frac pump fluid end. Its function and way of tightening of the housing to the fluid end is the same as any external ACD housing.

Referring to FIGS. 1-3, 6-10, 13, 15-18, 21-23, 26, and 28, an ACD wrenching portion 51 is used to tighten or loosen the ACD assembly housing in the fluid end. Illustrated is a hex nut design 51 that would be mated to a proper wrench for loosening or tightening the housing. There are many other ways to accomplish the tightening or loosening of the ACD assembly housing.

Referring to FIGS. 2, 3, 8-9, 13, 15, 17-18, 23, 28, 30-31, 36, and 37, an ACD suction manifold attachment area 53 is shown. Since the threads in the different manufacture's fluid ends do not have the same starting location in each access hole 107 and the starting point of the threads in the different fluid ends will vary from fluid end to fluid end, making a fixed attachment to the intake manifold not possible. The ACD assemblies of the present invention comprise housings that require no fixed orientation. This area 53 is threaded to accept the intake manifold attachment cap making orientation not a factor.

Figure 5:
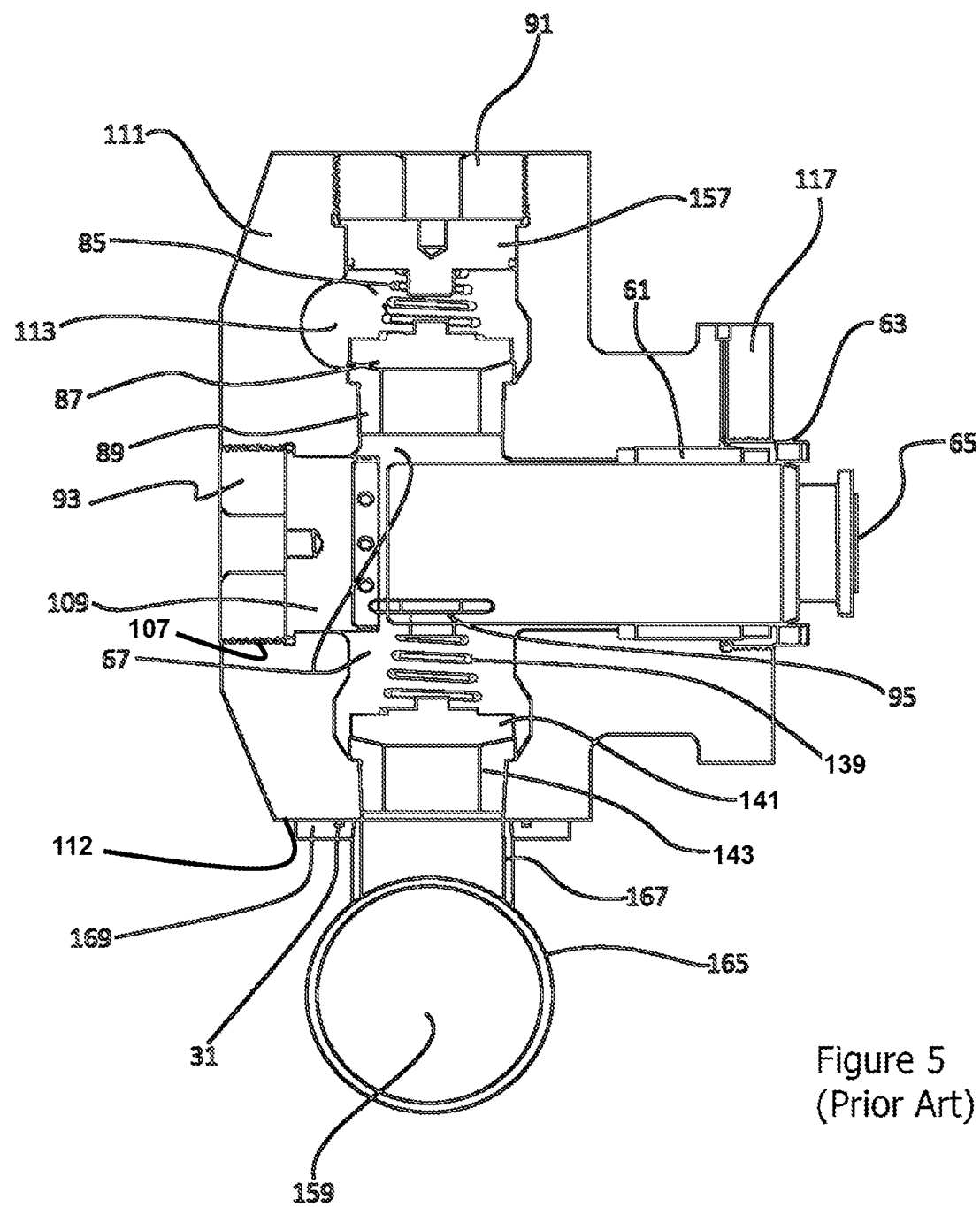
FIG. 5 is a sectional view of the prior art mono block fluid end of FIG. 4.
Figure 6:
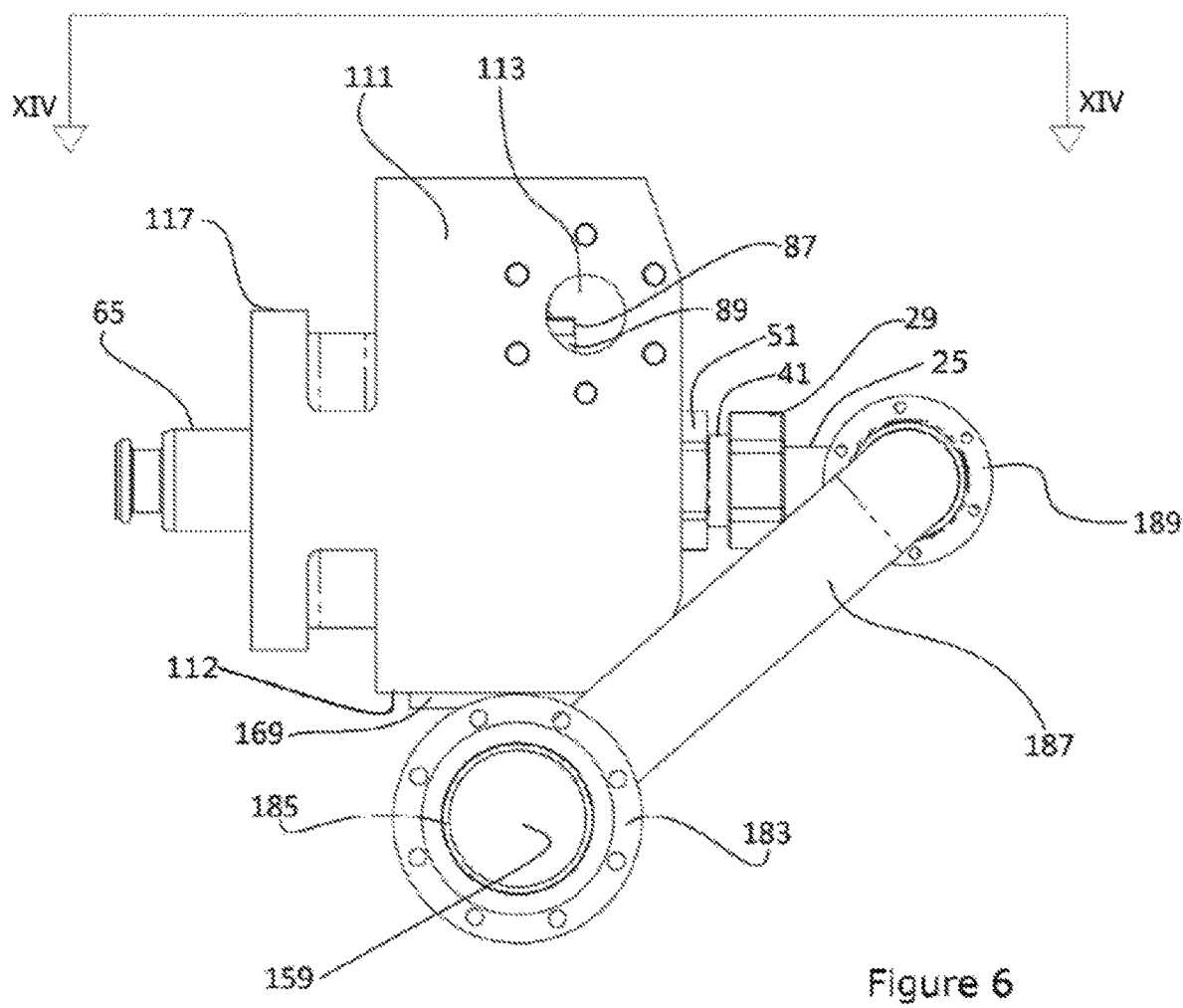
FIG. 6 is an elevation view of a modified mono block fluid end, in accordance with a preferred embodiment.
Figure 7:
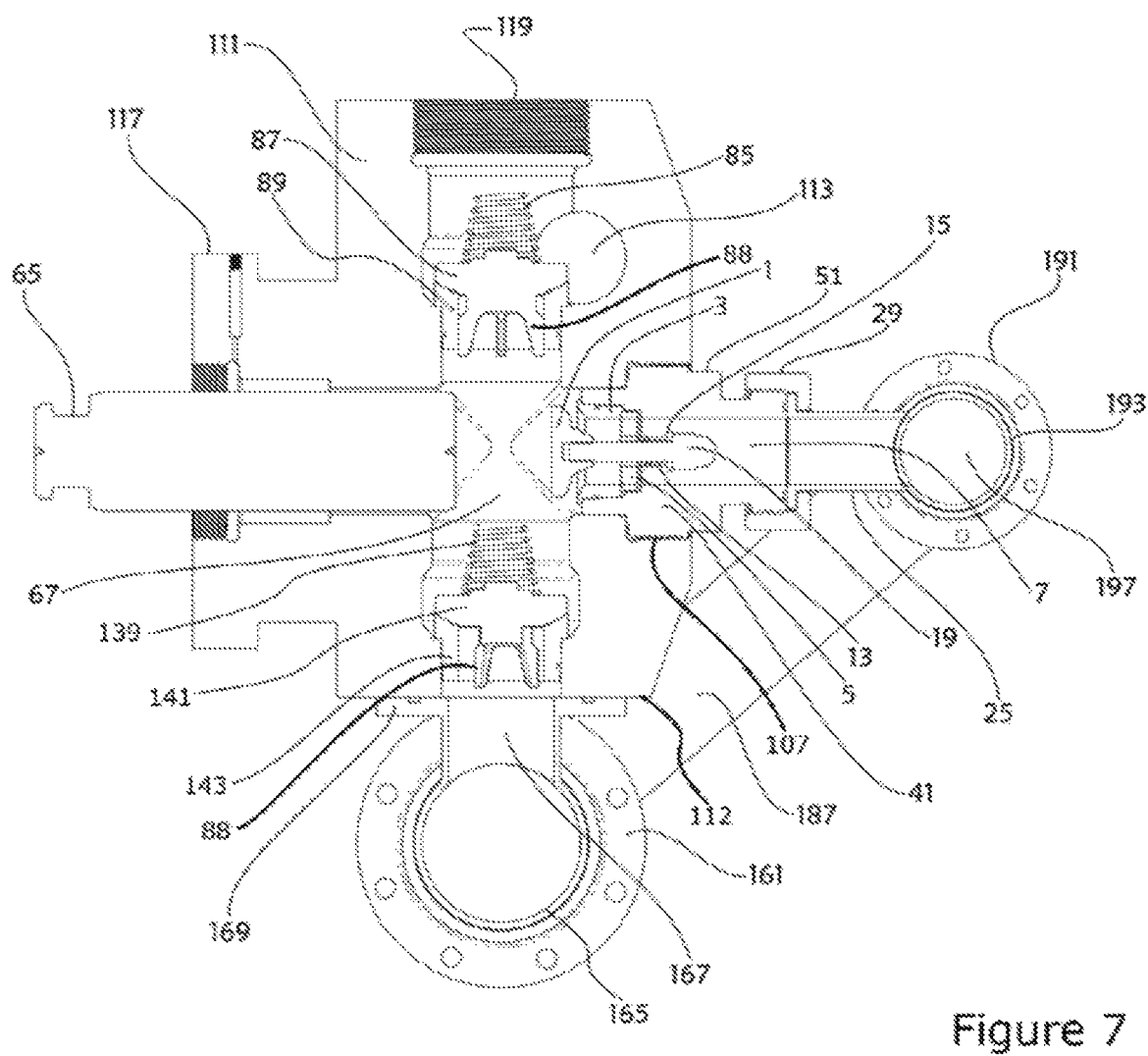
FIG. 7 is a sectional view of the modified mono block fluid end of FIG. 7.

Referring to FIG. 5, conventional packing 61, a multi-piece high pressure packing, is used to seal the fluid end housing to the plunger and to keep the fluid end from leaking frac fluids during the in and out pumping movement of the plunger. The packing seal is lubricated to cut down on friction and wear against the plunger. The packing is changed frequently.

Referring to FIGS. 4, 5, 8, 9, 19-28, 32-36, and 39-45, a conventional packing nut. 63 captures the packing between itself and the shoulder inside the plunger bore of the fluid end. With the packing and plunger installed tightening of the packing nut squeezes the packing making the packing swell and seal off between the packing bore and the plunger.

Referring to FIGS. 4-9, 19-28, 32-36, and 39-46, there is shown a conventional plunger 65 which is a machined hard coated metal rod offering different diameters that give different volumes of frac fluids on the in and out of the pumping action of the plunger. Travel is linear. Fluid is pulled into the fluid end on the out stroke and is compressed and pushed out of the fluid head on the in stroke. Stroke depths vary.

Referring to FIGS. 5, 7, 20, 22, 25, 27, 33, 35, 41, and 43, a compression chamber 67 is shown. This compression chamber 67 is an open area inside the fluid end chamber. A plunger is installed with the pressure end of the plunger inside the pressure chamber. Also, an intake and exhaust valve is installed allowing fluids to be pulled into the pressure chamber on the plunger out stroke and compressed and pushed out of the compression chamber on the in stroke. Also, in the back of the compression chamber, at the side opposite the plunger, is the large opening that contains a suction cover and is sealed off to leakage with the retaining nut. This opening is used for valve and plunger changes. On the out-stroke of the plunger, the intake valve opens and allows frac fluid to be pulled into the compression chamber. During the fill of the compression chamber, the pressure valve is closed. On the in-stroke of the plunger in intake valve closes and the pressure valve opens allowing the frac fluid to be pushed out of the compression chamber and to the pressurized exit of the fluid end. The pressure can be as high as 20,000 psi.

Referring to FIGS. 22, 25, 27, 35, 43, a modification 70 to fluid ends that have no back access is shown. A fluid end with no back access has to be modified to accept ACD. Only fluid ends that have no back access have to have this modification made.

Referring to FIGS. 24-28, 32-42, and 44-46, the segmented fluid end plunger manifold 79 is the compression segment of a multi segmented fluid end. It houses the plunger and attachment areas for the separate pressure and intake heads. The plunger manifold can be modified to accept an internal ACD assembly or external ACD assembly. The plunger manifold pumps the same as the mono block fluid end.

Referring to FIGS. 24, 26, 32, 34-35, 37, 39, and 42, there is shown a segmented fluid end assembly 80 which is currently offered in a three and five cylinder version.

Referring to FIGS. 24-28, 32, 33-44, and 45-46, a segmented fluid end pressure head 81 houses the pressure valve and has common attachment areas for exit of pressurized frac fluid out the discharge of the pressure head. On the plunger in-stroke the frac fluid travels from the plunger manifold into the pressure head and forces open the pressure valve into the exit path machined inside the pressure head. The pressure head can be removed and replaced.

Referring to FIGS. 25, 27, 33, 35, 41, 43, and 48, there is shown a flow diverter combo spring retainer 83. This diverter 83 directs the flow of fluid above the spring and allows an even flow of fluid around the valve. Most all fluid end designs send the fluid from one cylinder to the next through the spring and retainer and do not allow an even flow of fluid around the valve because of the flow. This unit 83 also acts as the spring retainer.

Referring to FIGS. 5, 7-9, 20, 22, 25, 27-28, 33, 35, 41, 43, and 45, valve springs 85 are used in both the intake and pressure valve assemblies. The springs help close the valves. They are in a compressed state at rest. The springs are exposed to the flow of the frac fluids. In frac pump fluid ends they are usually cone shaped as illustrated. They wear and have to be replaced often.

Referring to FIGS. 5, 7, 8, 9, 20, 22, 25, 27, 28, 33, 35, 41, 43, and 45, a conventional valve 87 is shown. The valve is the part in the head that allows frac fluids to enter and exit the fluid end. The valve is usually case hardened to extend wear. They open and close either by pressure or suction applied by the plunger traveling in or out. All valves see pressure. Usually the valves are the same for both intake and exhaust.

Referring to FIGS. 7-9, 33, 35, 41, and 45, a valve guide 88 ensures the valve tracks properly in its travels. There are many types. All take up volume space of frac fluid allowed into the compression chamber on the in-stroke adding to cavitation. They offer resistance to the pressurized frac fluid being pumped through the pressure valve. The high acceleration and pressure of the frac fluid really multiplies wears to the valve guides.

Referring to FIGS. 5-9, 20, 22, 25, 27-28, 33, 35, 41, 43, and 45, a conventional valve seat 89 provides the mating surface for the valve to seal against the pressure created in the in and out strokes of the fluid end. This allows pressure to be built up in the compression chamber. In the most common method of installation, the seat is pressed into position in the fluid end. The valve seat sees wear due to the abrasive contents of the frac fluids.

Referring to FIGS. 25, 27, 33, 35, 41, 43, and 45, a conventional retainer nut 91 holds the discharge cover in place over the pressure valve. When removed gives access to the intake valve seat for removal and the pressure valve seat, pressure spring and pressure valve.

Referring to FIGS. 5, 11, 12, 14, and 22, a conventional intake valve, valve seat, spring and plunger access nut 93, when removed, provides access to the intake valve seat, spring, valve and spring retainer for installation and removal. It uses the suction cover to seal against leakage. It is present in all frac pump fluid ends but the Y Type fluid end.

Referring to FIG. 5, a conventional intake spring retainer 95 holds the intake valve in a compressed state and in location. It is usually a heat-treated part and has to be replaced often. It is usually retained in a set of grooves located in the fluid end above the intake valve.

Referring to FIGS. 25-28, 32-37, and 39-46, a segmented intake head 101 is shown. The segmented intake head 101 attaches to the plunger manifold and holds the intake valve. No rear retainer nut access is required for valve changes. The segmented intake head 101 can be replaced individually.

Referring to FIGS. 5, 7, and 11-15, an existing back threaded access hole 107 is present in all fluid ends except the Y TYPE and multi segmented fluid ends. This access hole 107 allows access for intake valve assembly for installation and removal. The plunger can be removed and installed through this access. This access hole weakens the fluid ends.

Referring to FIG. 5, a conventional suction cover 109 is a cover for the back access retaining nut and allows sealing against the walls of the intake valve access hole to prevent leakage. The suction cover offers some protection against wear in the sides of the rear access hole.

Referring to FIGS. 4-10, a conventional stay rod type mono block fluid end 111, a one-piece frac pump fluid end, is shown. The stay rod type mono block fluid end 111 is the most common and used fluid end in the industry. It is currently offered in a three and five cylinder version. The mono block fluid end 111 referred to is held in position to the power frame with stay rods. Mono blocks are also held in place with studs in component frac pumps. The conventional stay rod type mono block fluid end 111 is currently offered in a three and five cylinder version.

Referring to FIGS. 4-9, 11-15, and 19-23, an intake side of fluid end 112 is the side of the fluid end that the intake manifold attaches to. The entry into the head is in this end 112.

Referring to FIGS. 4-15, 19-28, 32-36, and 39-46, a conventional pressurized fluid exit 113 is a pressurized exit hole that extends all the way through the mono block fluid end and is located in conjunction with the pressure valve. When the frac pump is pumping pressurized fluid travels down this exit path to the outside of the fluid end to pass through the attached casing down the drilled hole to frac the well.

Referring to FIGS. 9-13, a conventional flange stay rod attachment openings 115 are access holes to attach the fluid end to the power end with the use of stay rods. The stay rods are aligned and inserted through these openings and when bottomed out against the shoulder on the stay rod tighten the nuts on the stay rods to pinch the flange of the fluid end to hold the fluid end in position.

Referring to FIGS. 4-13, and 19-23, a conventional stay rod mounting flange 117 is shown. This is the stay rod style support flange built into the mono block and one-piece segmented fluid end. The stay rods pass through the access holes in the outer edges. The packing nut and plunger also pass through the flange at the center of each cylinder. The flange offers support for the fluid end and takes the load of the pumping action.

Figure 10:
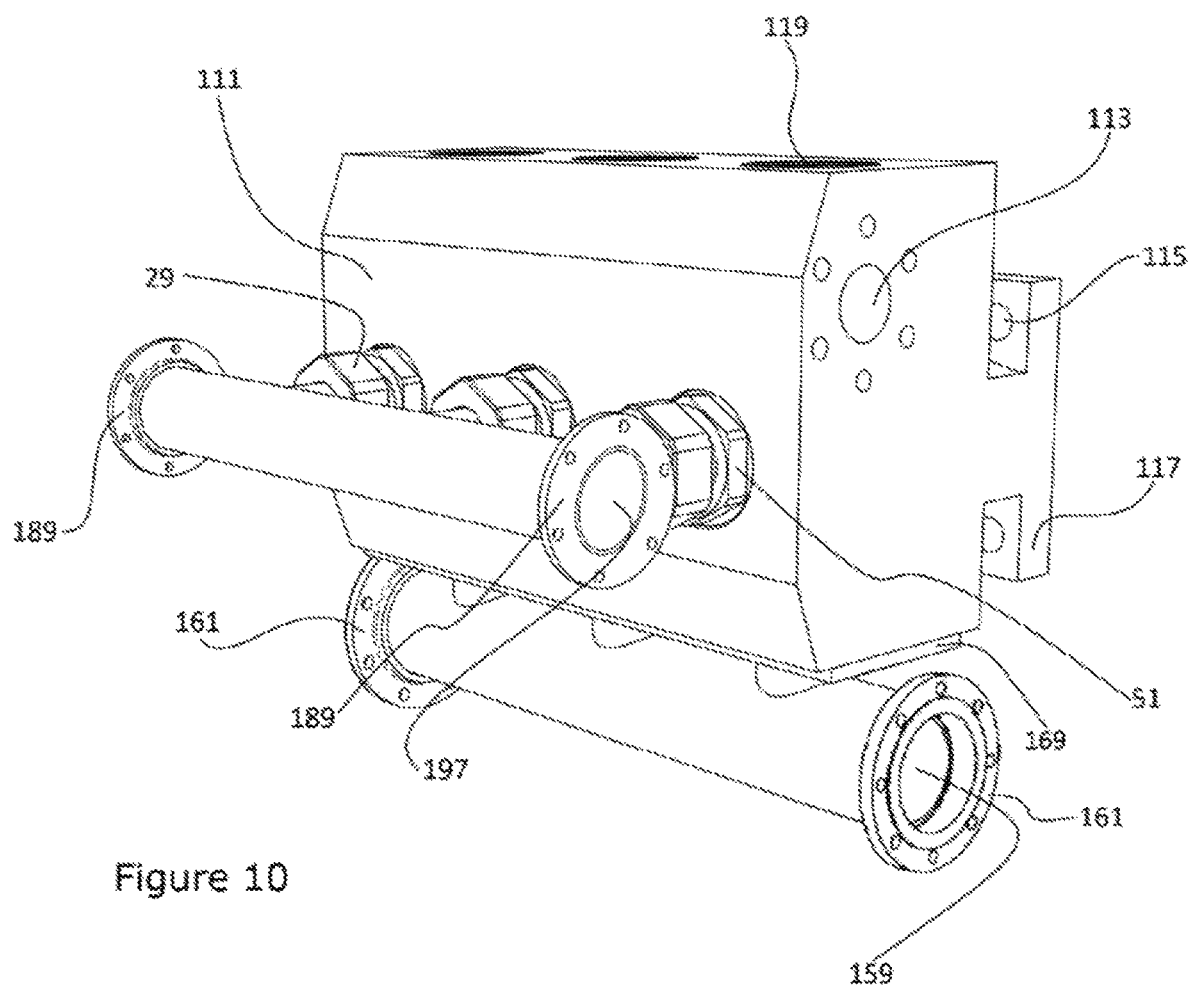
FIG. 10 is an isometric view of a modified mono block fluid end, in accordance with a preferred embodiment.

Referring to FIG. 10, a conventional valve access point 119, a large opening in the top of most mono blocks and one piece segmented fluid ends that give access for pulling the intake valve seat and for removal and replacement of the pressure valve, valve seat and valve spring. The discharge cover and retaining nut fit this opening and seal it off during operation.

Figure 14:
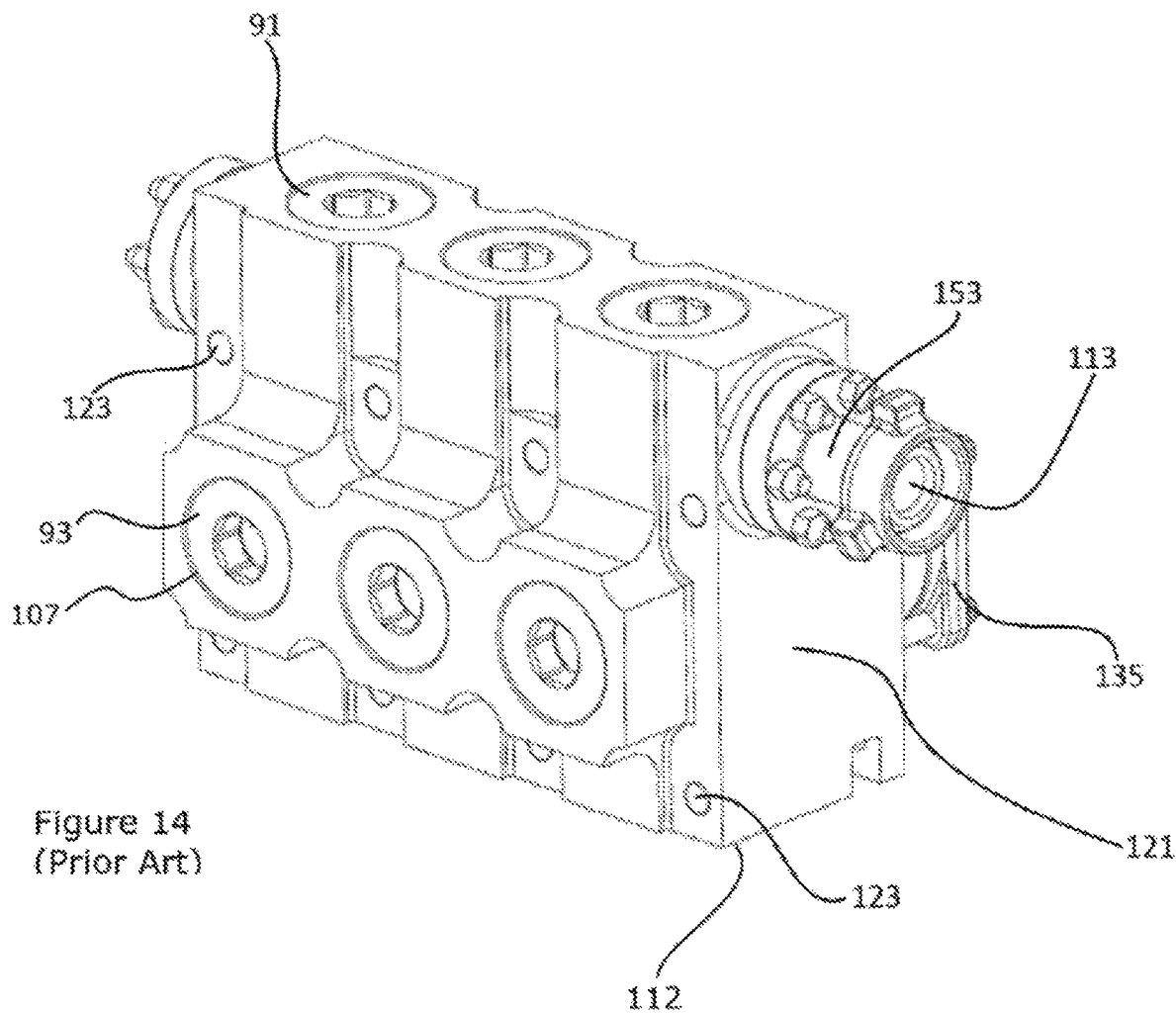
FIG. 14 is an isometric view of a prior art component style fluid end.
Figure 15:
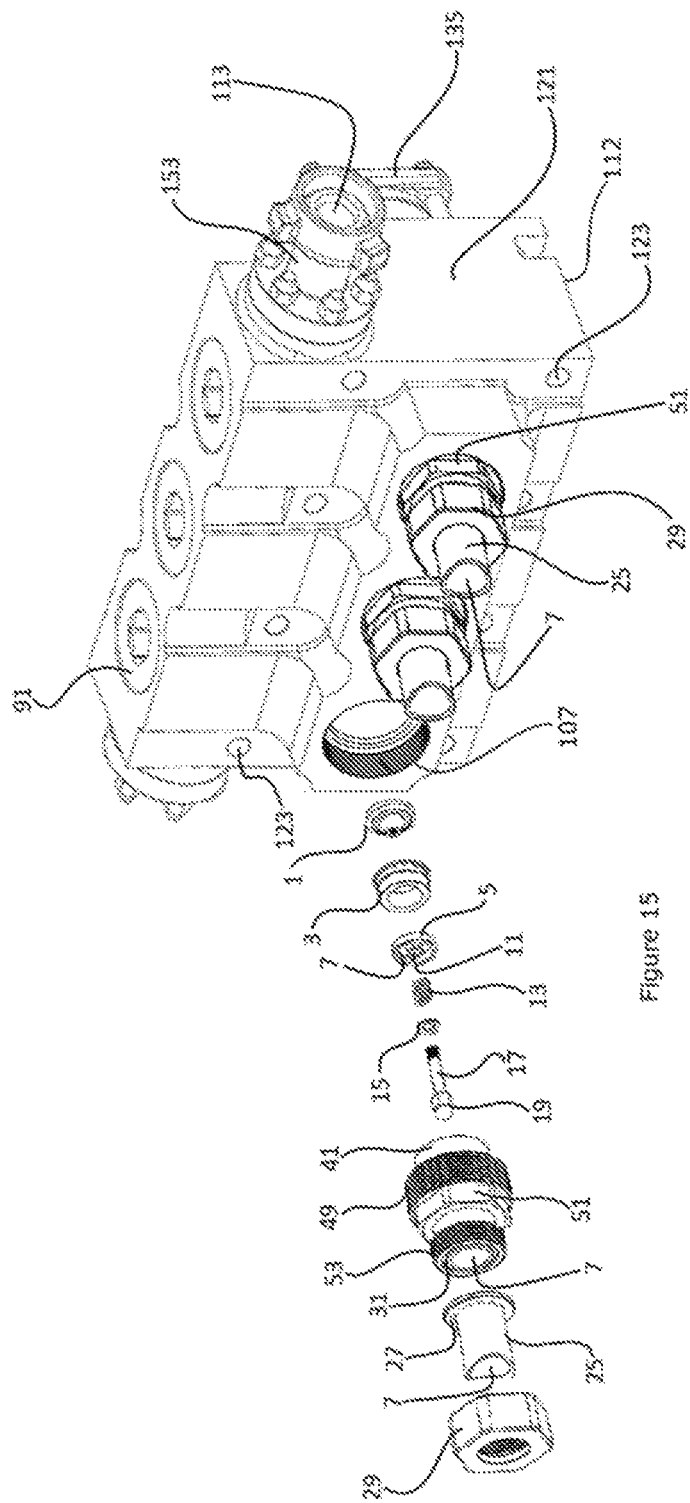
FIG. 15 is an exploded isometric view of a component style fluid end, in accordance with a preferred embodiment.

Referring to FIGS. 14-15, a conventional component stud style fluid end 121 is shown. This is the stud style mono block fluid end. It has the same back access holes that have the same function as all fluid ends with a back access. The main difference between the stay rod style fluid end and the component stud style fluid end is how it mounts to the power frame. Their function and how they operate is the same. The top and rear access hole serves the same purpose as in the stay rod style fluid end. It is currently offered in a three and five cylinder version.

Referring to FIGS. 14-15, there is shown a conventional component fluid end stud access opening 123. Component style frac pumps have different sections sandwiched together over long studs. The mono block fluid end is the last part of the sandwich. The fluid end stud access openings are lined up with the studs and the fluid end is inserted over the studs. Large nuts are screwed onto the studs and are tightly torqued securing all pieces together.

Referring to FIGS. 19-23, Element 125 is a conventional Y style mono block fluid end, the only frac pump fluid end that does not have the rear access hole. Where the hole would normally be located is a blank wall. The intake valves are accessed through the intake bore. With the exception of this rear access, the operation and function are the same as the stay rod and component stud style fluid end. The Y Type mono block mounting flange is the same as the stay rod mounting flange. Each is completely interchangeable with any stay rod style fluid end. It is currently offered in a 3 And 5 cylinder version.

Figure 22:
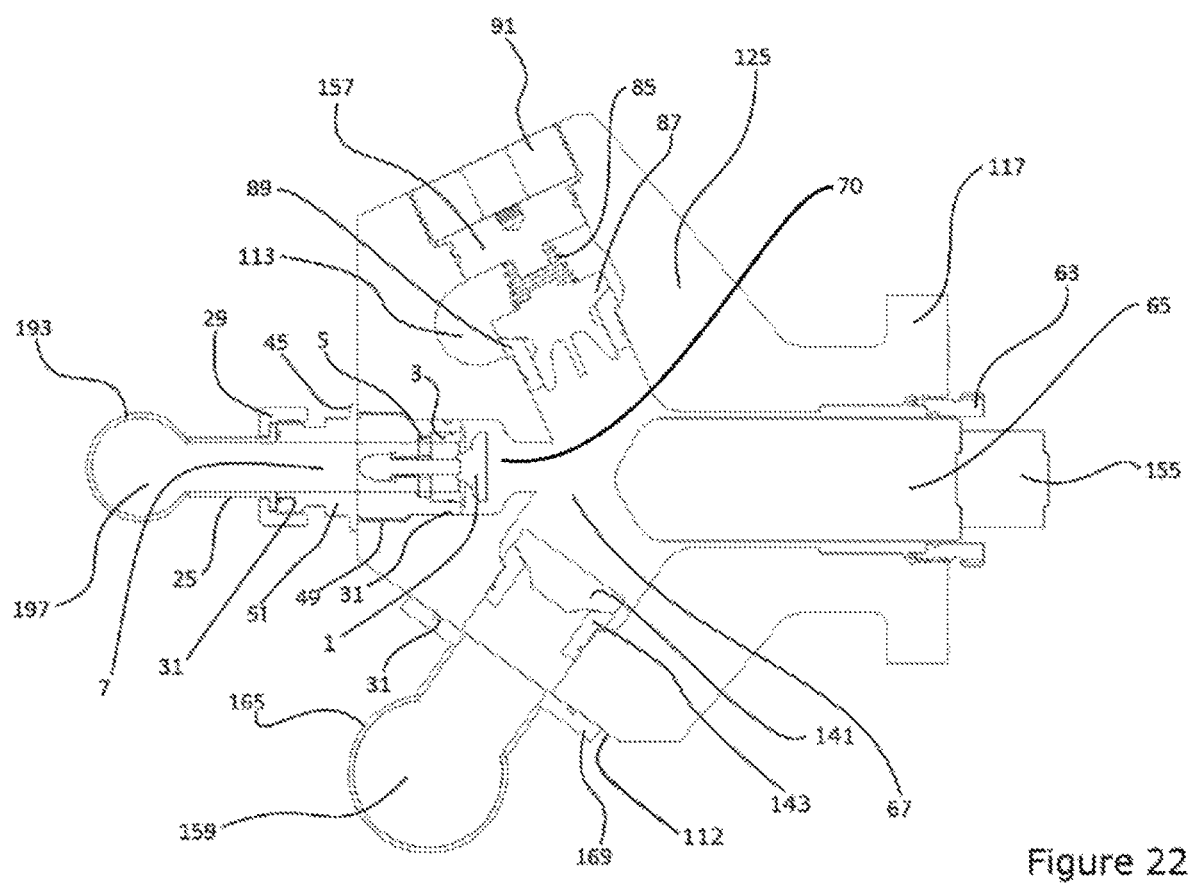
FIG. 22 is a sectional view of the modified Y-Type fluid end of FIG. 21, cut along the line XXII-XXII.
Figure 23:
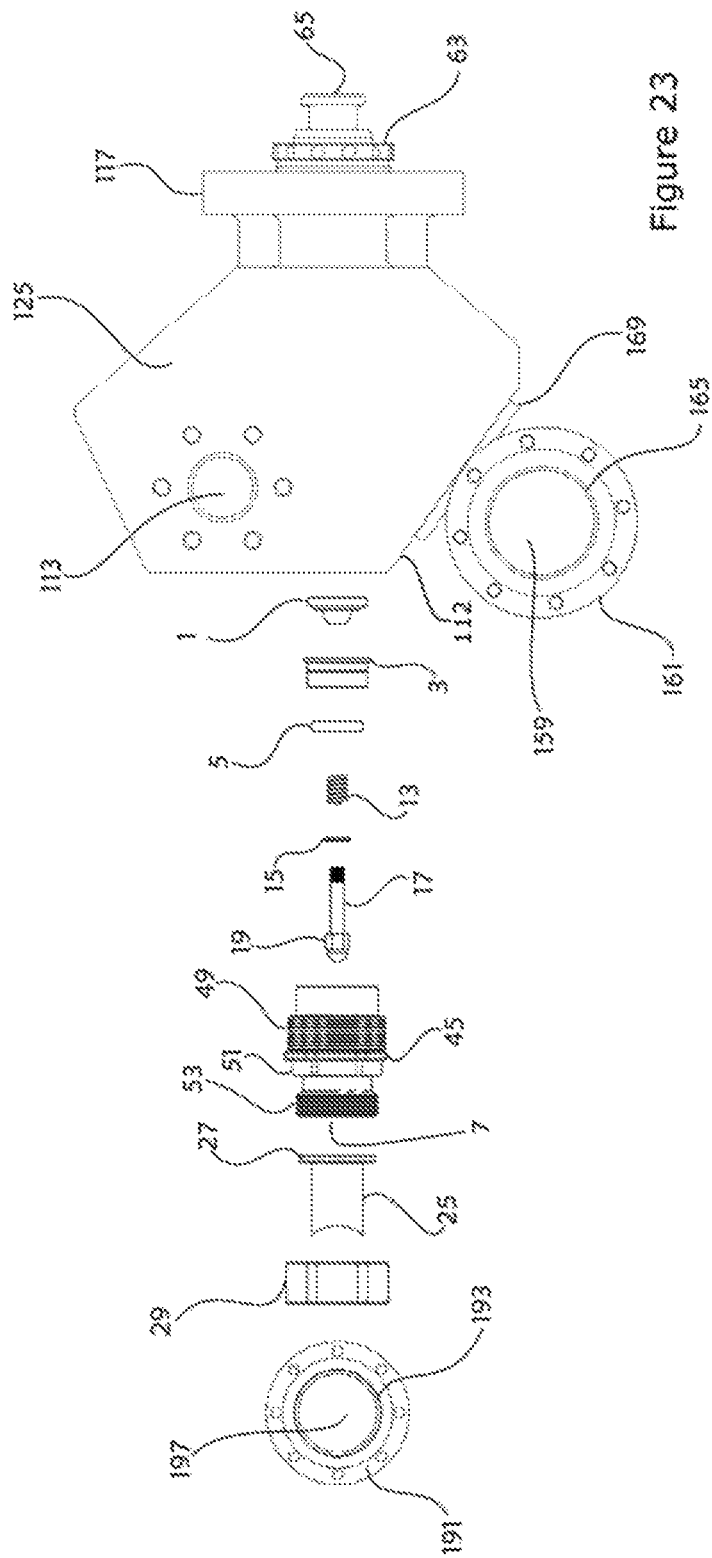
FIG. 23 is an exploded view of the modified Y-Type fluid end of FIG. 21.

Referring to FIG. 22, a modified path 126 machined into a Y Type fluid end to accept the ACD housing is shown. This access does not exist in the stock version. The access hole could be easily machined into the fluid end. Once modified for the ACD assembly, the system works as any installed in other frac pump fluid ends.

Referring to FIGS. 11 and 13, a conventional assembled one-piece segmented fluid end is shown 127. This fluid end 127 illustrated is assembled as a tri-plex fluid end made up of three one-piece segments. It is currently offered in three and five cylinder versions. The assembled fluid end has the same mounting flange as the stay rod and Y Type fluid ends. All three are interchangeable with each other. Their operation and function are the same. All valve changes are performed the same as in the stay rod and component style fluid ends. All one piece segments are held together with long studs.

Referring to FIG. 12, Element 128 is a conventional one-piece fluid end segment. This is a one-piece segment that, when assembled with other segments, makes a complete fluid end. The function and operation of the segment is no different than that of a single cylinder of the mono block fluid. All valve changes are performed the same as in the stay rod and component style fluid ends. They currently mount either three or five together to make a fluid end.

Referring to FIGS. 12-13, conventional one-piece tie together access openings 129 are common to all pieces of the one piece segmented head that studs are passed through to hold the separate segments together.

Referring to FIGS. 11 and 13, conventional one-piece tie-together studs 131 hold either a three or five one-piece segmented fluid end together.

Referring to FIG. 11, conventional one-piece tie-together fasteners 133 are the nuts that screw onto the studs that, when tightened, hold the one-piece segments together.

Referring to FIGS. 14, and 15, Element 135 is a conventional stuffing box. This is a removable box that holds the plunger, packing and packing nut to the component stud mounted fluid end.

Referring to FIGS. 5, 7-9, 25, 27-28, 33, 35, 41-43, and 45, a conventional intake valve spring 139 holds and locates the intake valve in place.

Referring to FIGS. 5, 7-9, 20, 22, 25, 27-28, 33, 35, 41, 43, and 45, there is shown a conventional intake valve 141.

Referring to FIGS. 5, 7-9, 20, 22, 25, 27-28, 33, 35, 41, 43, and 45, there is shown is a conventional intake valve seat 143.

Referring to FIGS. 11, 14, and 15, a conventional discharge flange 153 is shown.

Figure 20:
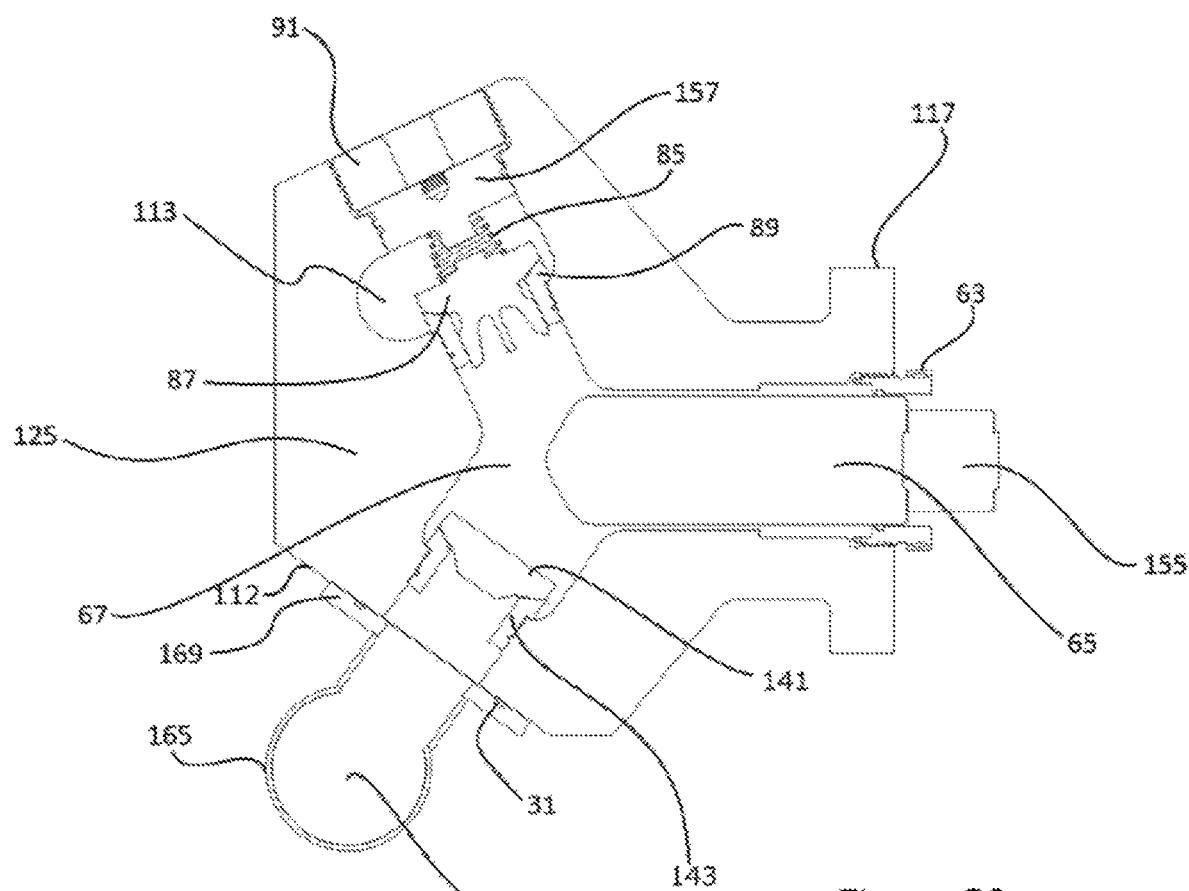
FIG. 20 is a sectional view of the prior art Y-Type fluid end of FIG. 19, cut along the line XX-XX.
Figure 21:
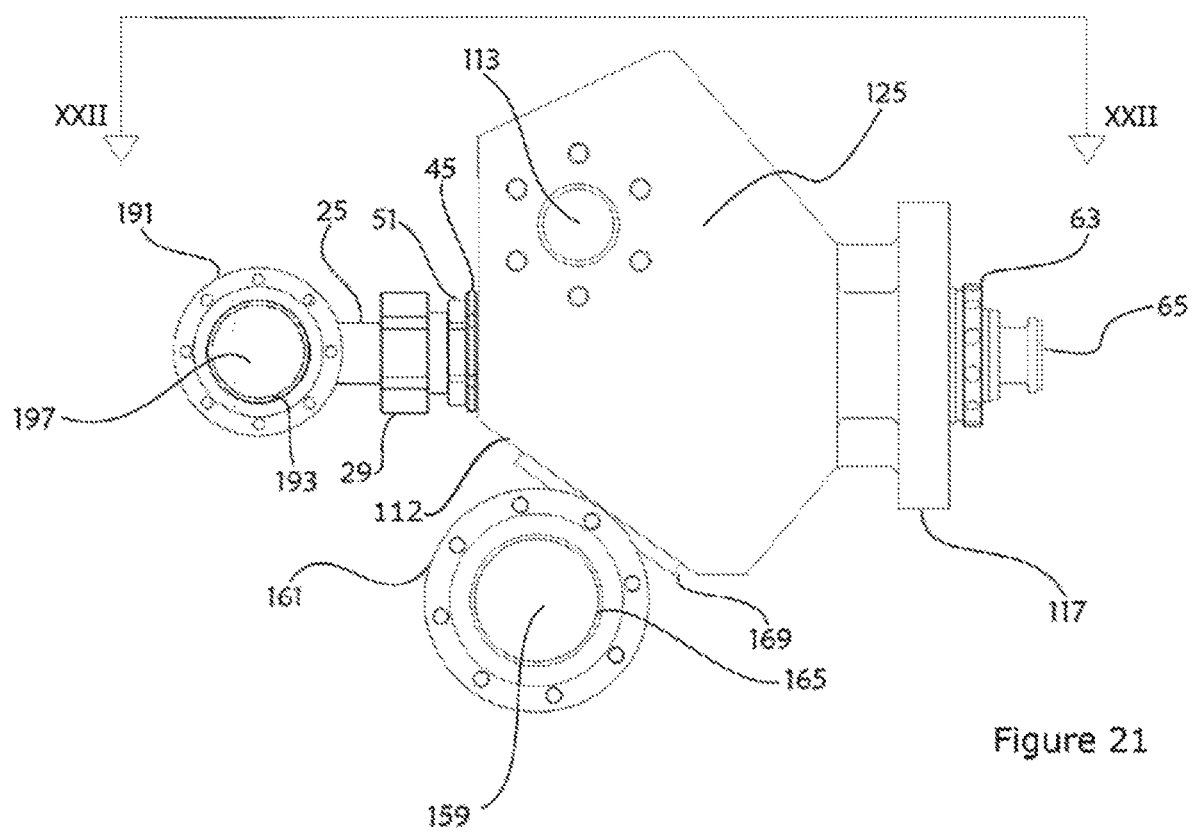
FIG. 21 is an elevation view of a modified Y-Type fluid end, in accordance with a preferred embodiment.
Figure 24:
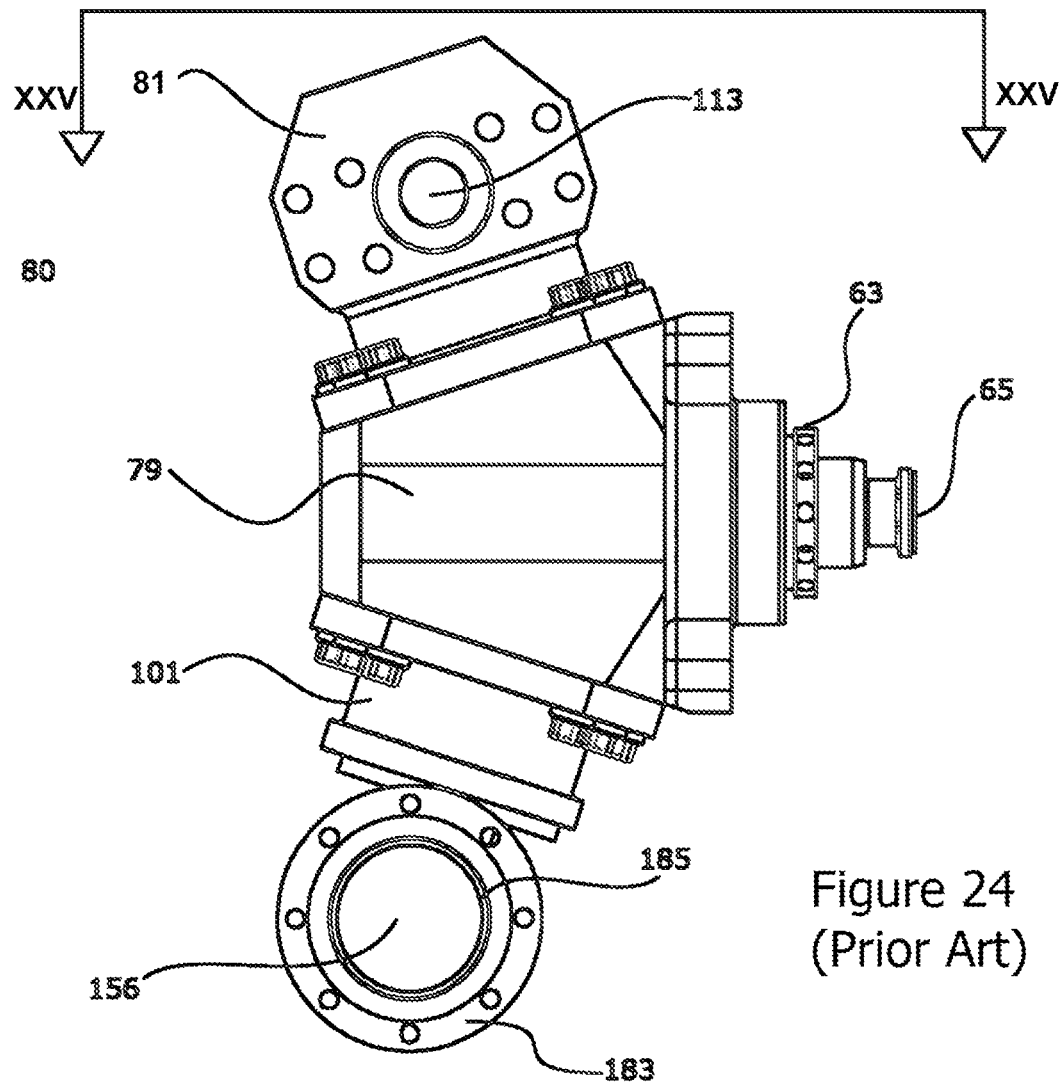
FIG. 24 is an elevation view of a prior art fluid end.
Figure 25:
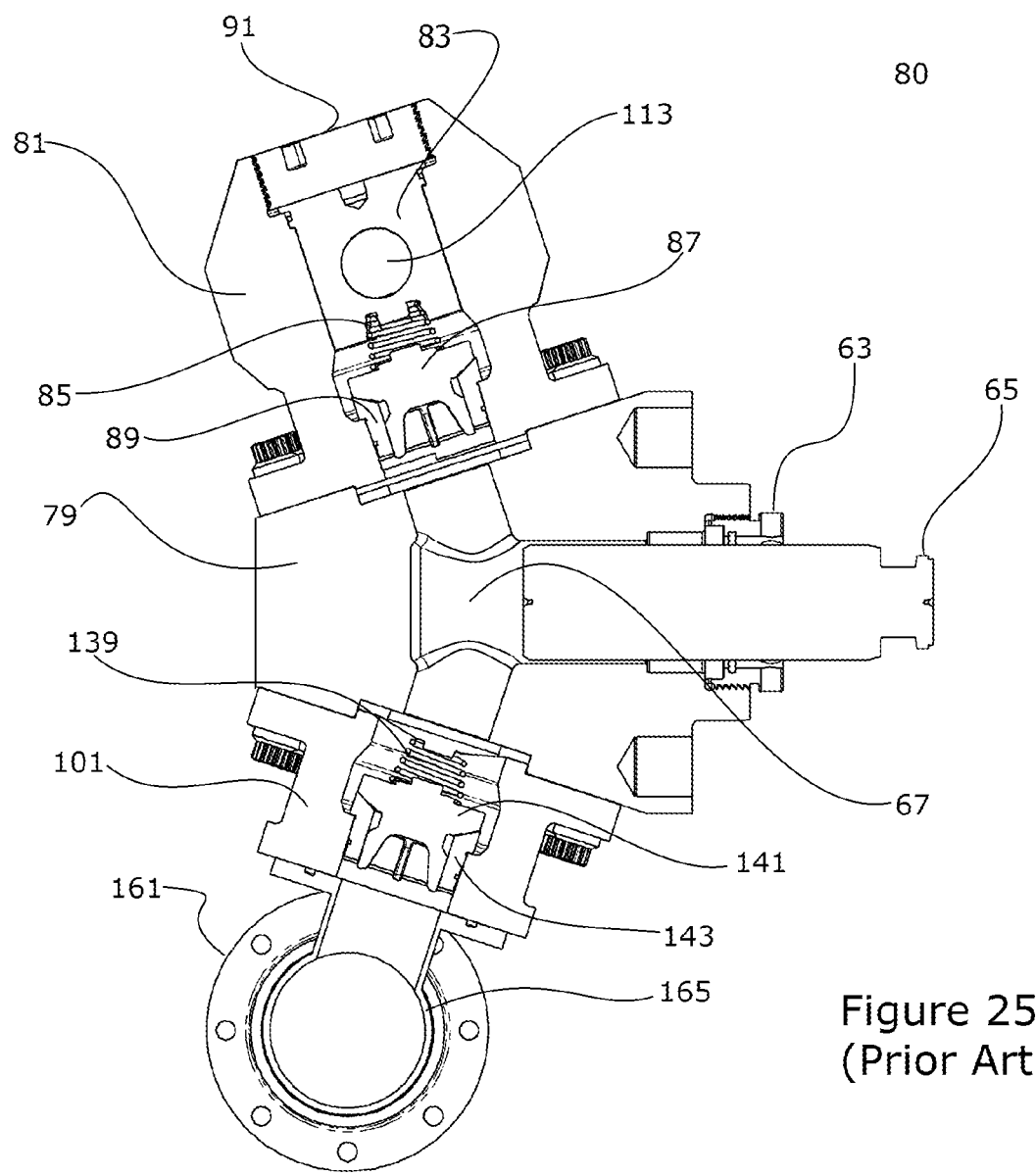
FIG. 25 is a sectional view of fluid end of FIG. 24, cut along the line XXV-XXV.
Figure 26:
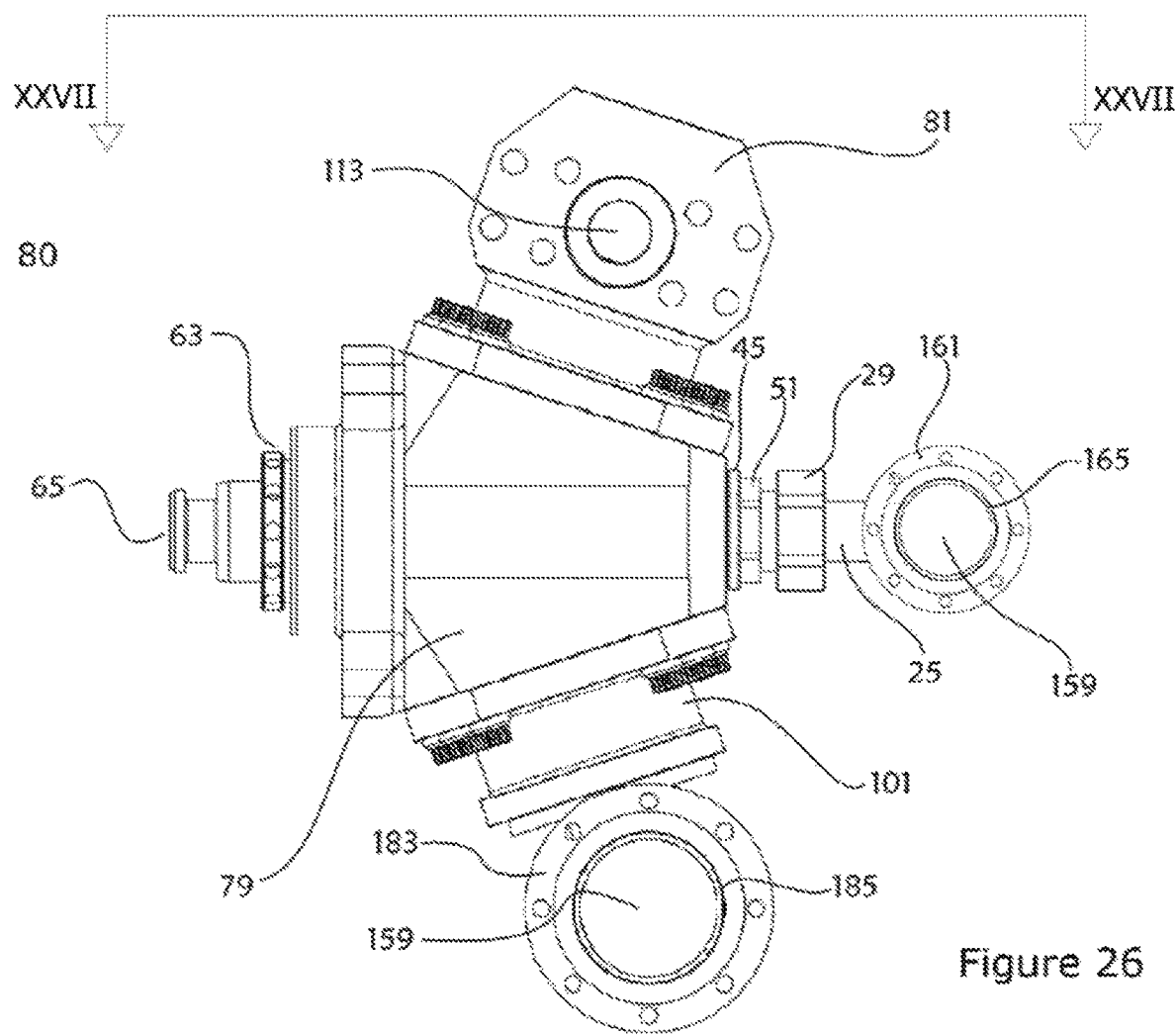
FIG. 26 is an elevation view of the fluid end of FIGS. 24 and 25 as modified in accordance with a preferred embodiment.
Figure 27:
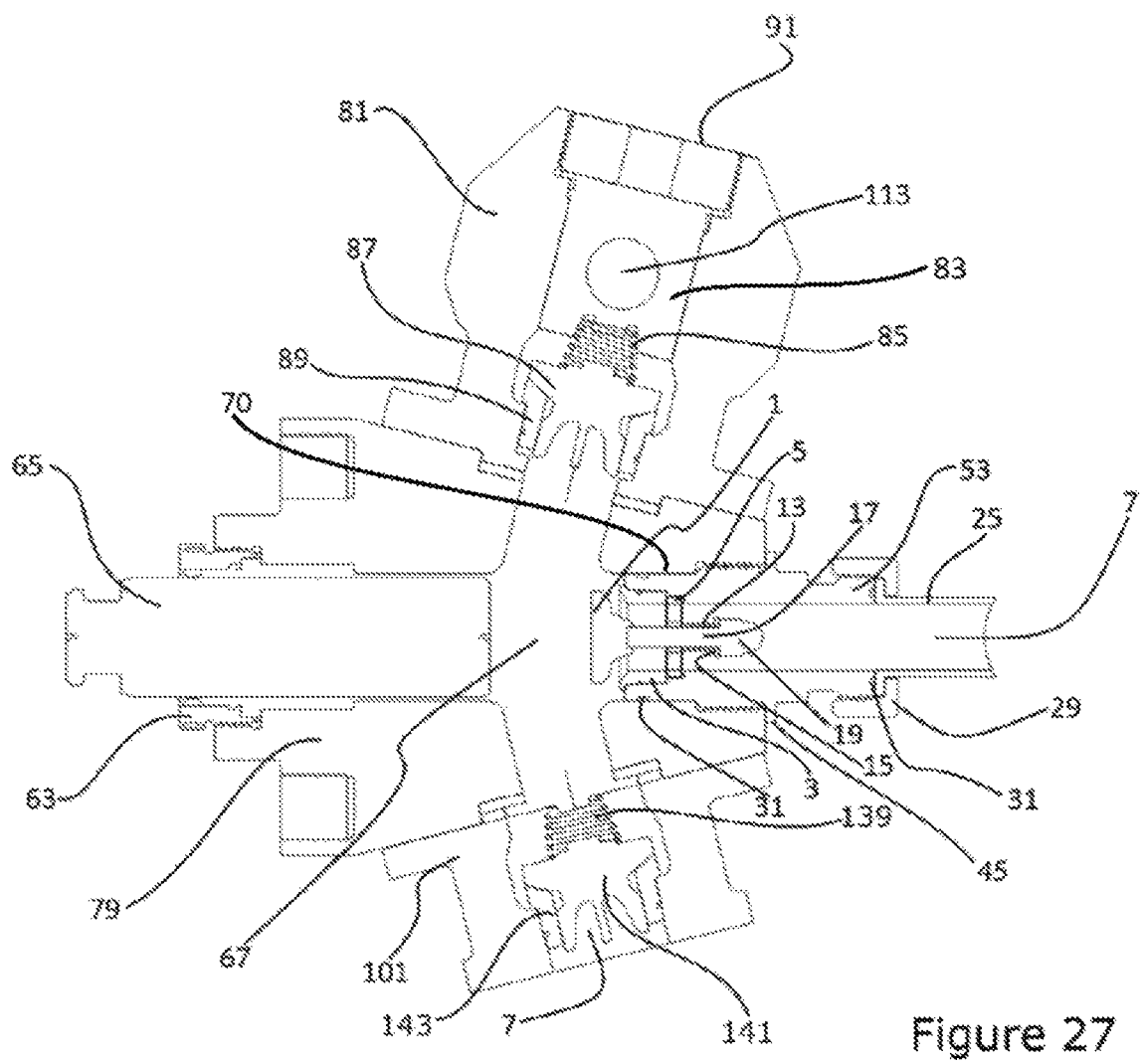
FIG. 27 is a sectional elevation view of the modified segmented fluid end of FIG. 26, cut along the line XXVII-XXVII.
Figure 28:
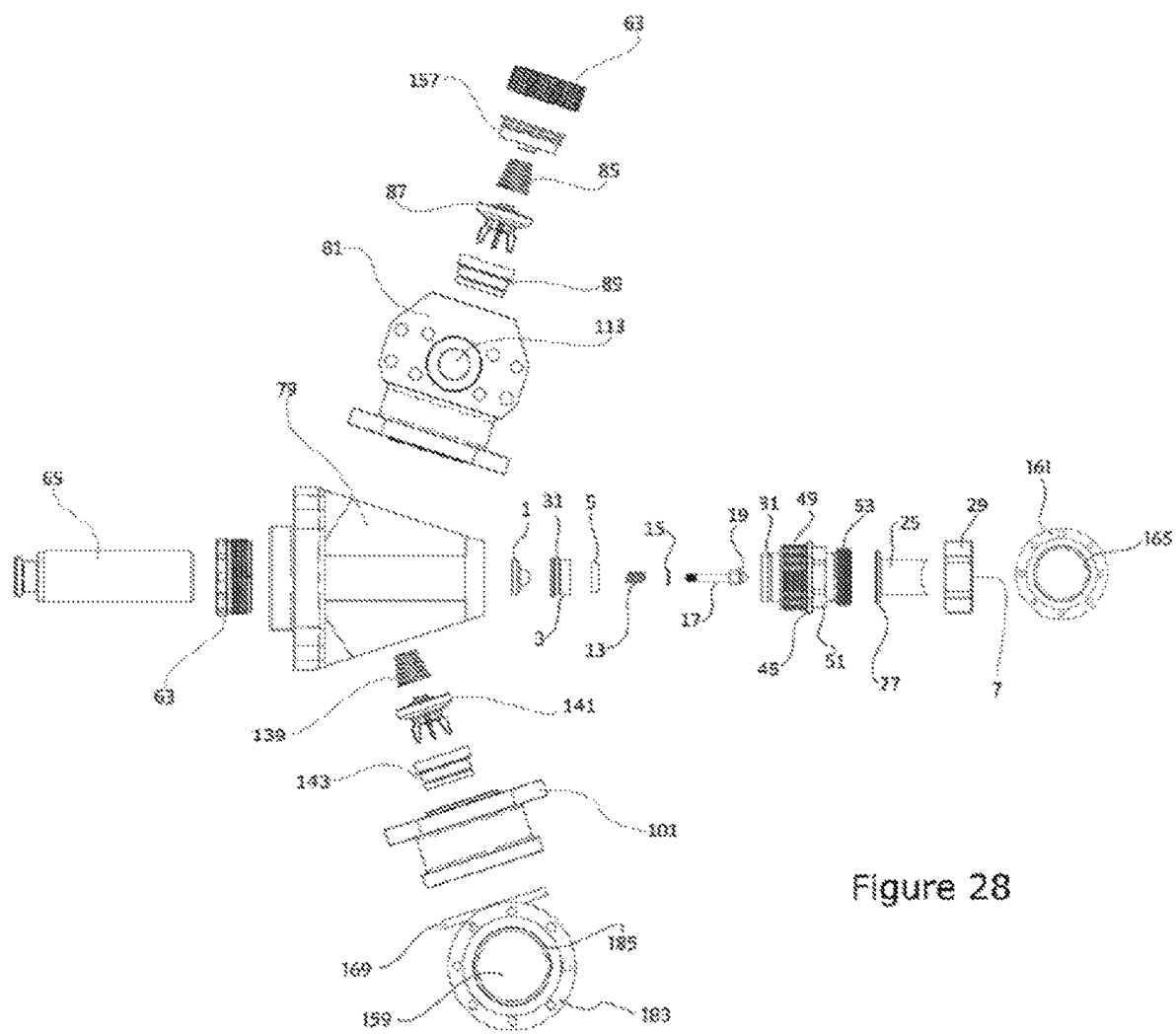
FIG. 28 is an exploded elevation view of the modified segmented fluid end of FIG. 25.
Figure 29:
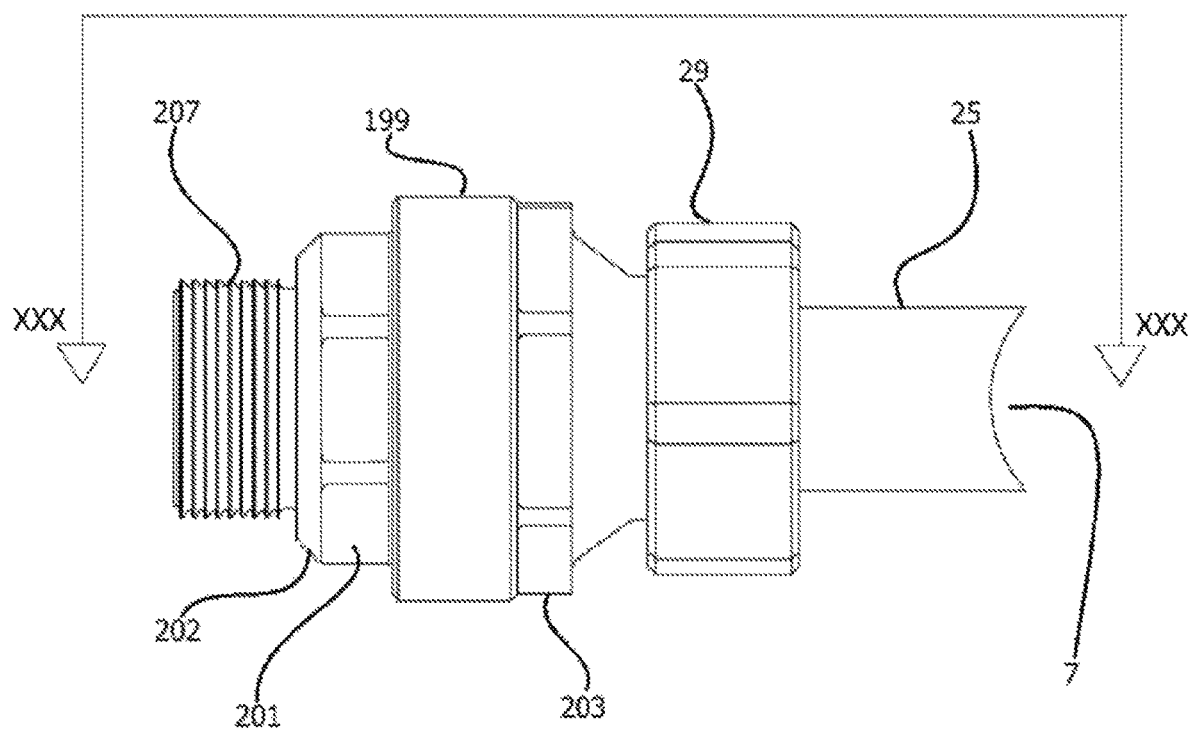
FIG. 29 is an elevation view of an anti-cavitation device, in accordance with another preferred embodiment.

Referring to FIGS. 20, 22, and 24, there is shown a conventional plunger to pony rod bolt on style clamp 155.

Referring to FIGS. 5, 7, 8, 13, 15, 22, 27, and 28, there is shown a conventional discharge cover and spring retainer 157.

Referring to FIGS. 4-6, 9-10, 19-23, 26, 28, 32, 39-40, 42, and 43, Element 159 is a conventional main feed supply inlet.

Referring to FIGS. 7-10, 21, 23, 25-26, 28, 33, 39, 41, 43, and 46, Element 161 is a conventional intake manifold flange.

Figure 9:
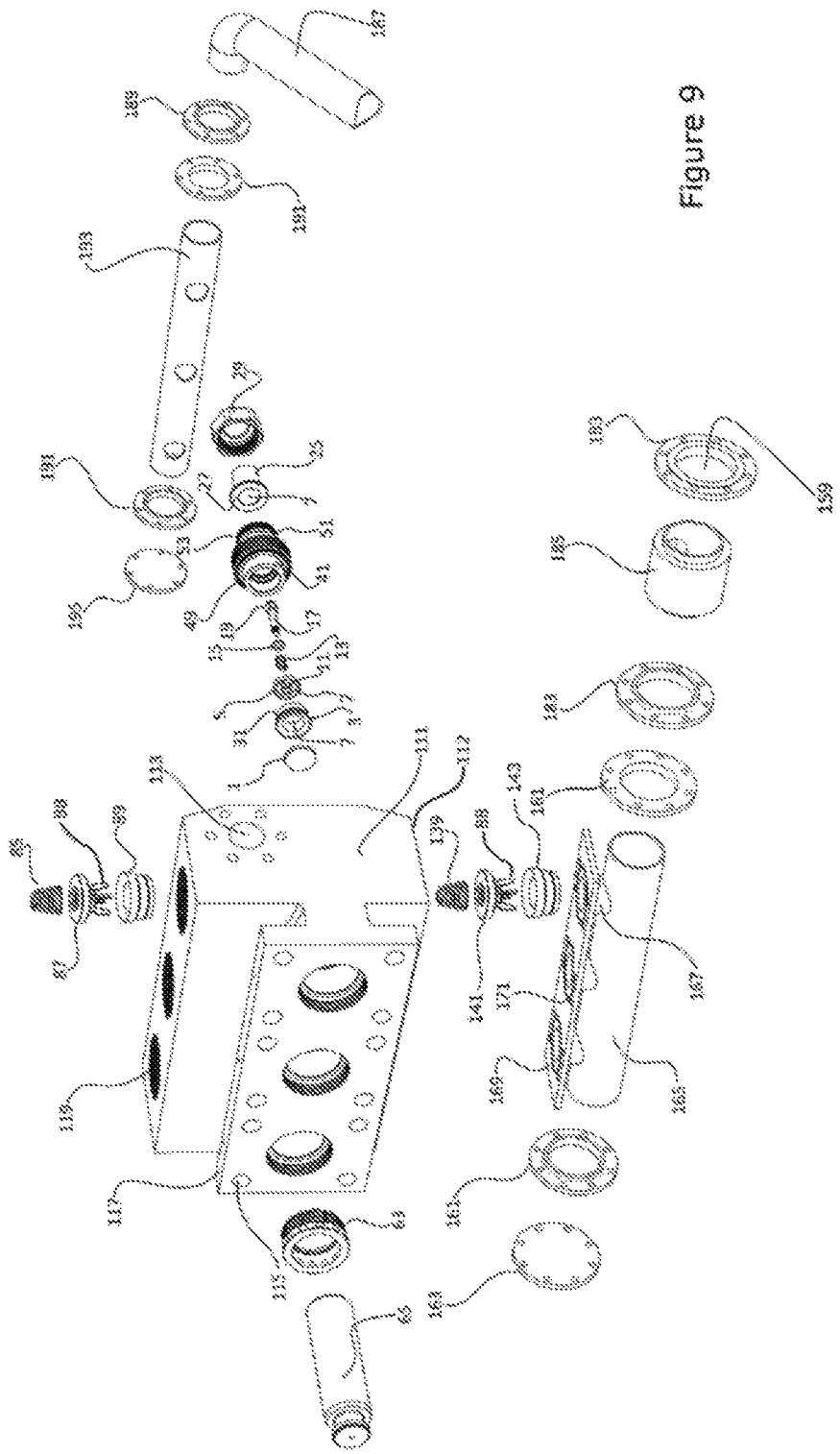
FIG. 9 is an exploded isometric view of the modified mono block fluid end of FIG. 6.
Figure 46:
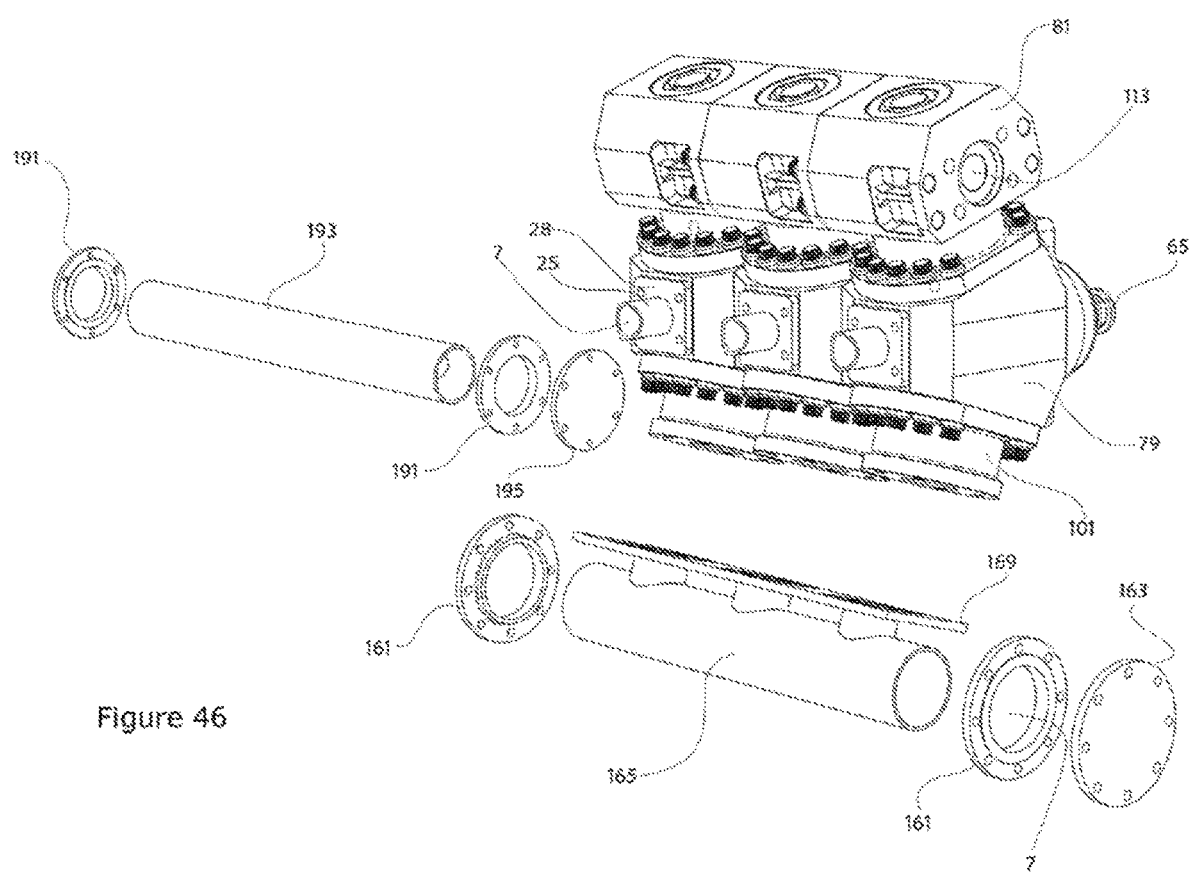
FIG. 46 is a partially exploded isometric view of a modified segmented fluid end, in accordance with a preferred embodiment.

Referring to FIGS. 9 and 46, Element 163 is a conventional intake manifold end cap.

Referring to FIGS. 4-5, 7-8, 19-28, 33, 39, 41, 43, and 46, Element 165 is a conventional intake manifold main supply tube.

Referring to FIGS. 5, 7, 9, and 43, Element 167 is a conventional intake manifold feeder tube.

Referring to FIGS. 5-10, 20-23, 28, 39, 43, and 46, Element 169 is a conventional intake manifold mounting flange.

Referring to FIG. 9, Element 171 is a conventional intake manifold mounting flange seal gland.

Referring to FIGS. 6, 9, 24, 26, 28, 32, 40, and 42, ACD pull out feeder adapter tube flanges 183 are connected to the ACD pullout feeder tube. One end is connected to the main supply feed and the other is connected to the intake manifold. This type flange is just one way of attaching to the ACD intake manifold.

Referring to FIGS. 6, 9, 24, 26, 28, 32, 40, and 42, there is shown an ACD pull out feeder adapter tube 185. This manifold 185 serves a couple of purposes. When it is desired to pull a supply feed to the ACD intake manifold off of the supply feed to the main intake manifold this manifold is installed. One benefit of doing this that it does not require modification to the main intake manifold allowing hookup to any manufacture's intakes. One could be used to each side of the ACD intake manifold. Feeding both sides of the ACD intake manifold might be beneficial to either the higher fluid demands of the quint or a larger diameter plunger. It also has a larger diameter than the main intake manifold so that when the ACD intake manifold demands soppy of frac fluid it does not interfere with the main intake manifold supply of frac fluid. Its use is for when using a common supply feed for both intakes.

Referring to FIGS. 6, 7, 8, 9, and 42, an ACD extension feeder tube 187 is the transition tube from the main supply feed to the ACD intake manifold. Its use is for when using a common supply feed for both intakes. One could be used to each side of the ACD intake manifold. Feeding both sides of the ACD intake manifold might be beneficial to either the higher fluid demands of the quint or a larger diameter plunger.

Referring to FIGS. 6, 8, 9, 10, and 42, an ACD extension feeder tube flange 189 allows easy replacement or removal of the ACD extension feeder tube. This type of flange is just one way of attaching to the ACD intake manifold.

Referring to FIGS. 6, 8, 9, 10, and 42, an ACD intake manifold flange 191 is connected to either end of the ACD intake manifold. It allows attachment of a sealing cap, the ACD extension feeder tube or can be connected to its own separate supply feed. This type flange is just one way of attaching to the ACD intake manifold.

Referring to FIGS. 7, 9, 22, 23, 34, 35, 36, 37, 38, and 46, an ACD suction manifold tube 193 is the main intake manifold to the ACD assemblies. It can be hooked up to the supply feed in several ways. It can be manufactured to supply frac fluids to any amount of ACD assemblies or any diameter plunger.

Referring to FIGS. 49, 51, 53, 54, 55, and 57, an ACD suction manifold 194 is shown. This is the complete ACD suction manifold 194 with two-piece clamps fit to ACD. This can be many shapes and sizes depending on fluid demand.

Referring to FIGS. 9, and 46, an ACD intake manifold end cap 195 is a sealing cap used when only one side of the ACD intake manifold is used to supply frac fluid to the fluid end.

Referring to FIGS. 7, 10, 21, 22, and 23, an ACD main intake fluid path 197 is the path of frac fluid entering the ACD intake manifold.

Referring to FIGS. 29-31, and 34-38, an ACD two-piece assembly 198 is shown. Since the valve is not inside the fluid end it can be manufactured to accept larger valves that would allow higher rpm and keep cavitation down or allow a larger plunger to operate more efficiently.

Figure 51:
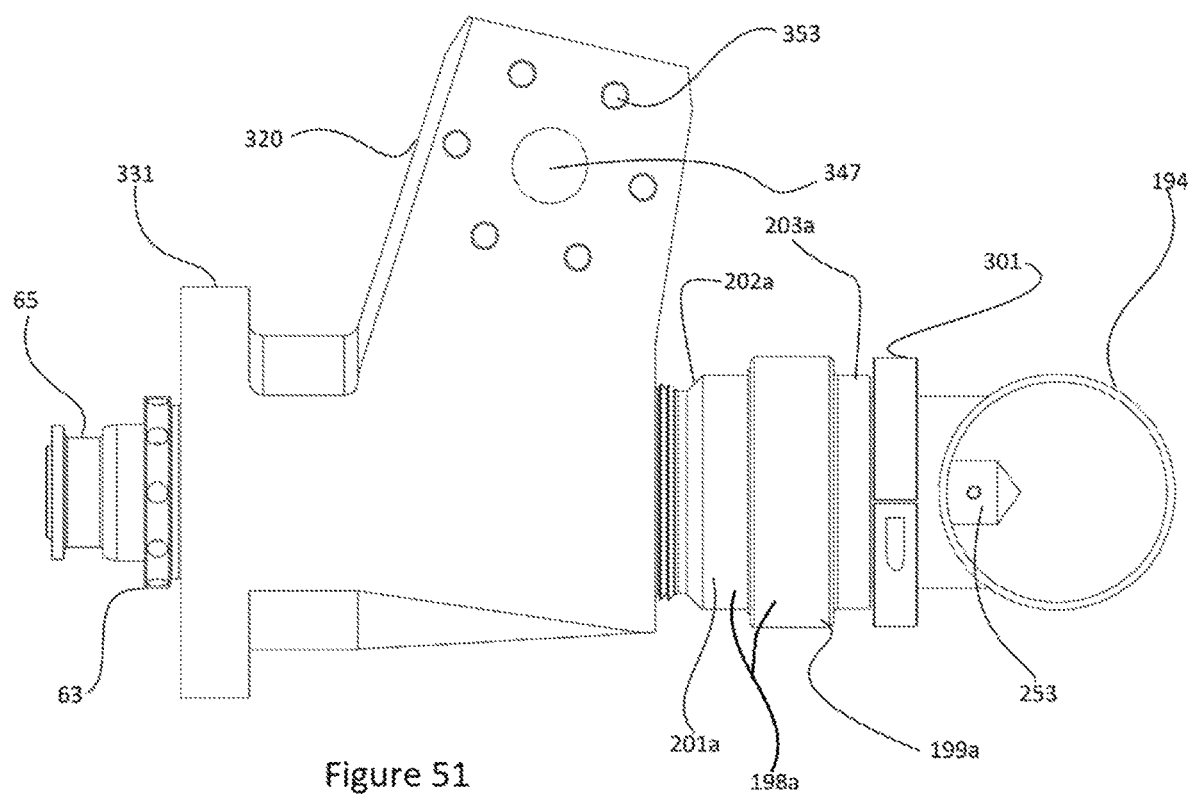
FIG. 51 is a side elevation view of the anti-cavitation fluid end of FIG. 48.

Referring to FIG. 51, an extra-large two-piece ACD 198a is shown. This figure is showing the larger complete two-piece assembly. It is not retrofittable to any current CFE. It allows a larger valve and bottle bore. If a larger valve is required to keep cavitation down, you would move to the bolt-on version.

Referring to FIGS. 29-31, and 34-38, ACD external two piece assembly valve housing 199 is shown. This section of the two-piece assembly holds the valve assembly and attachment area that connects to the intake manifold.

Referring to FIGS. 48, 49, 50, and 51, an ACD screw on valve housing 199a of two-piece design is shown. This contains the valve assembly. This section of the two-piece assembly holds the valve assembly and attachment area that connects to the intake manifold. This design is the same as ACD external two-piece assembly valve housing 199 but is larger for the ACFE design discussed below. This size will not fit existing fluid ends.

Referring to FIGS. 29-38, ACD external two-piece assembly main adapter housing torque area 201 is the area used to torque or tighten the adapter housing to the fluid end.

Figure 48:
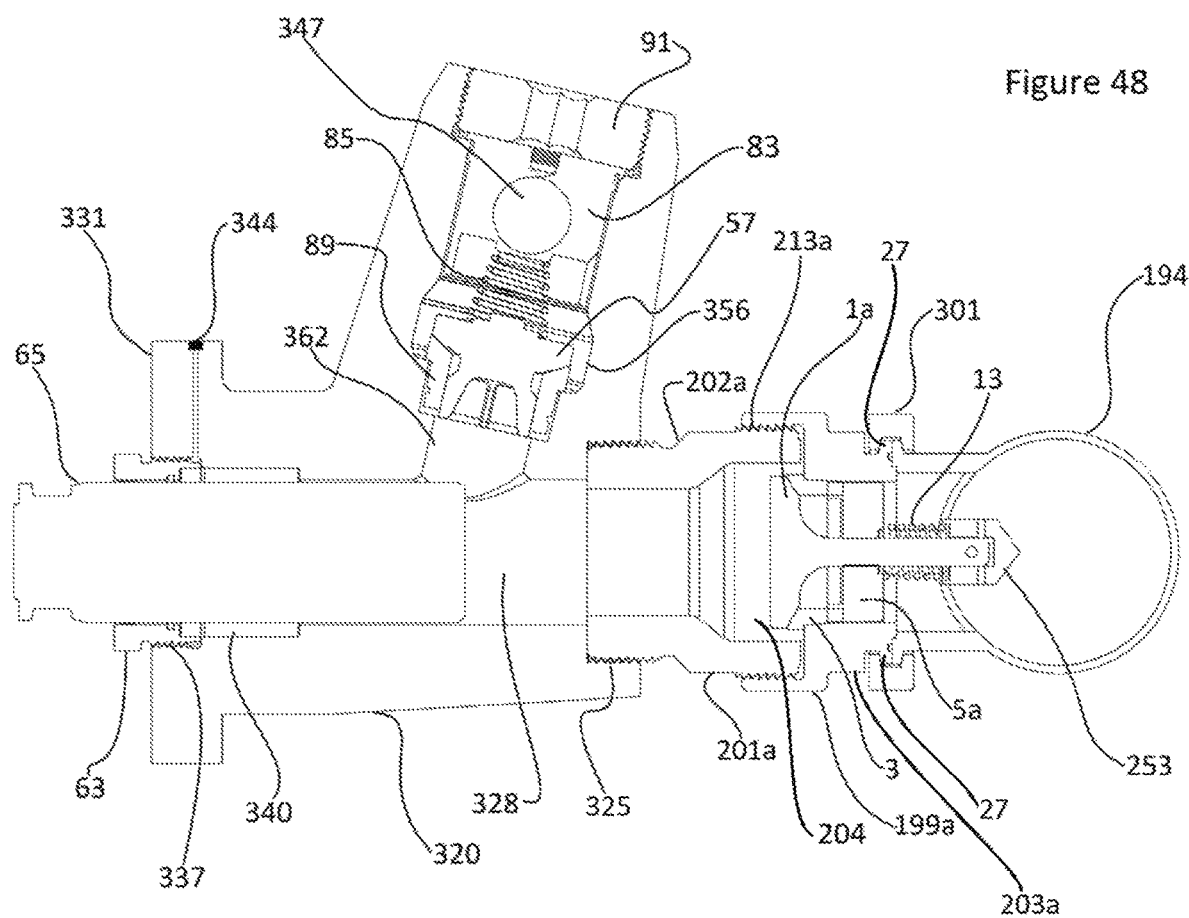
FIG. 48 is a side elevation sectional view of an anti-cavitation fluid end in accordance with a preferred embodiment.
Figure 50:
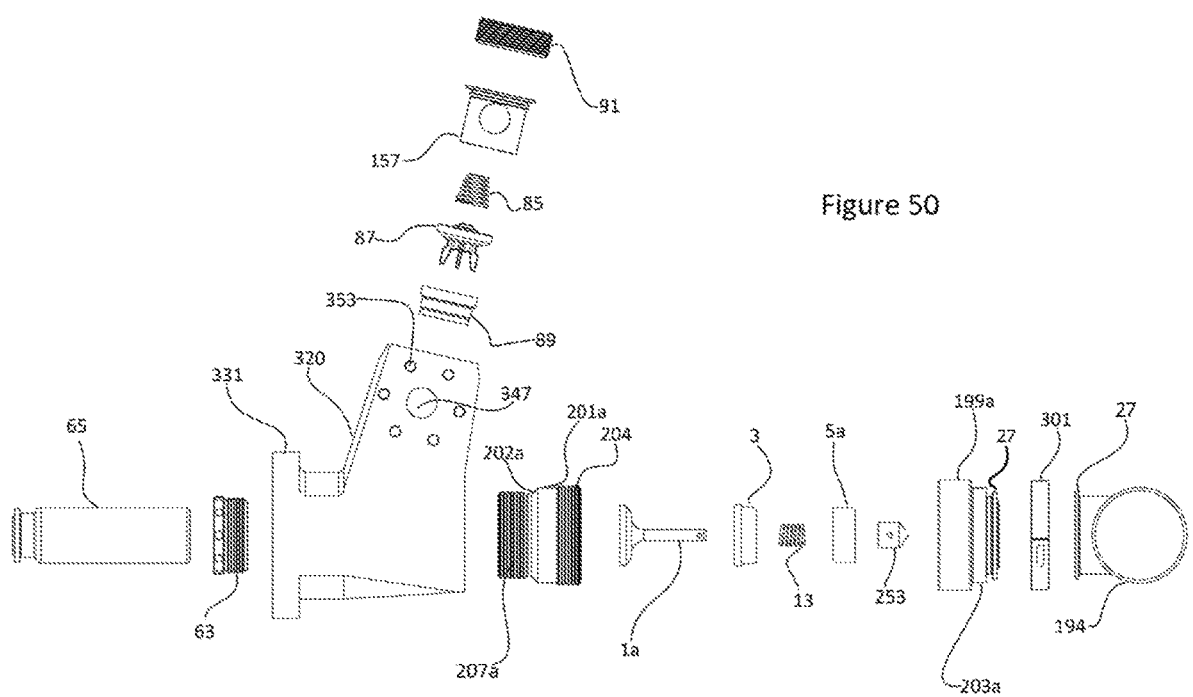
FIG. 50 is a side elevation exploded view of the anti-cavitation fluid end of FIG. 48.

Referring to FIGS. 48, 50, 51, a larger ACD external two-piece assembly main adapter housing torque area 201a is the area that is used to torque or tighten the adapter housing to the fluid end. This torqueing of the ACD unit can be accomplished with just the hex nut shown. This design is not compatible with current fluid ends without modification.

Referring to FIGS. 29-30, and 34-36, an ACD bottle bore housing 202 of the two piece unit that screws into existing fluid ends is shown. This is a section of the two-piece assembly that attaches to the fluid end and valve assembly section. This section holds the bottle bore required to get enough clearance for the frac fluid to pass around the valve. This is the highest wear section and the most economical section to be easily replaced.

Referring to FIGS. 48, 49, 50, and 51, a larger ACD bottle bore housing 202a of the two-piece unit that screws into existing fluid ends is shown and is the same as ACD bottle bore housing 202 but larger. This larger design is not compatible with current fluid ends without modification. This larger design 202a allows a new version fluid end that will produce much less cavitation. It being located in-line with the plunger stroke also cuts down on cavitation compared to the standard design. The fluid does not have to make a 90-degree turn on the suction pull.

Referring to FIGS. 29, 30, 31, 34, 35, 36, 37, and 38, an ACD external two-piece torque area 203 is used to torque or tighten the valve assembly housing to the main adapter housing.

Referring to FIGS. 29-31, and 34-38, a larger ACD external two-piece torque area 203a is used to torque or tighten the valve assembly housing to the main adapter housing. This torqueing of the ACD unit can be accomplished with just the hex nut shown.

Figure 30:
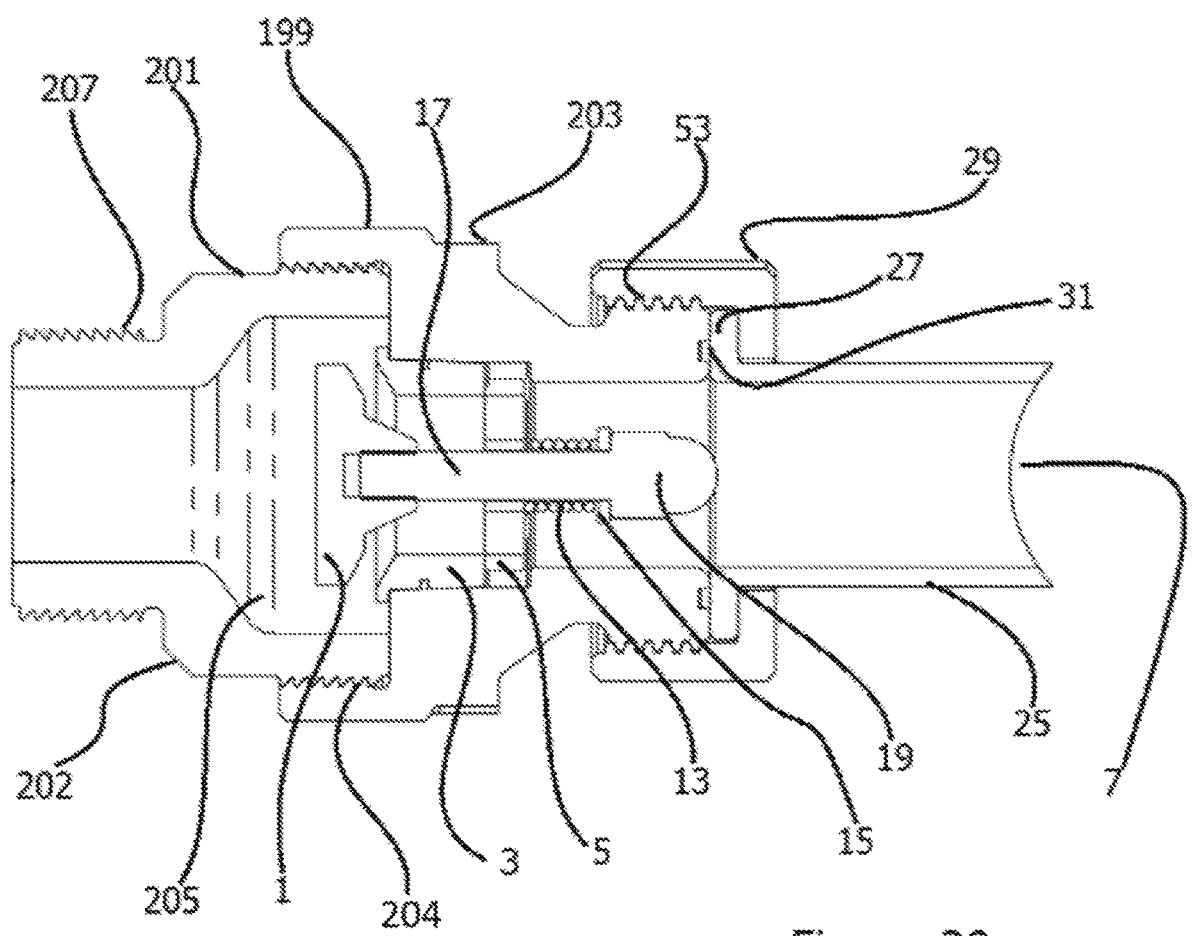
FIG. 30 is a sectional view of the anti-cavitation device of FIG. 29, cut along the line XXX-XXX.
Figure 35:
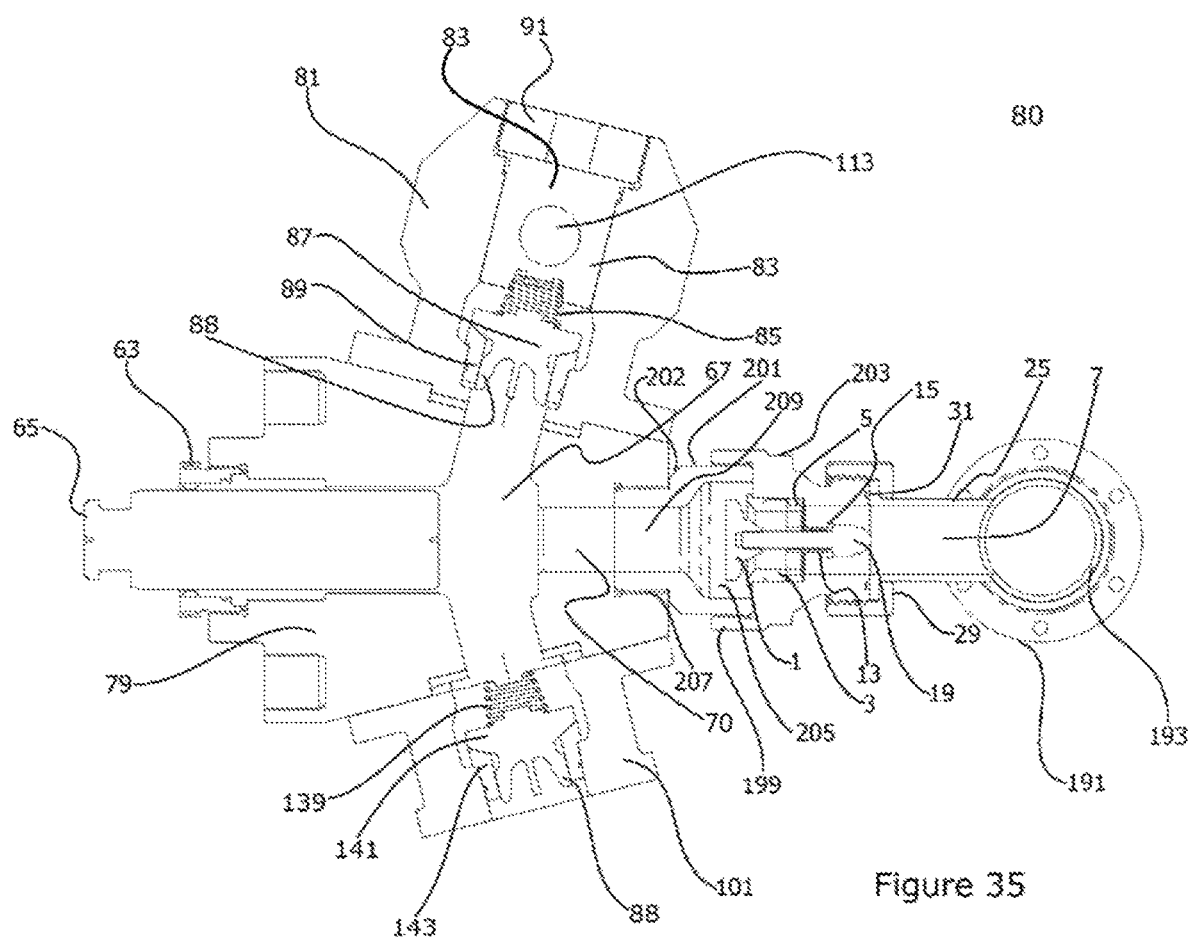
FIG. 35 is a sectional elevation view of the modified segmented fluid end of FIG. 34, cut along the line XXXV-XXXV.
Figure 36:
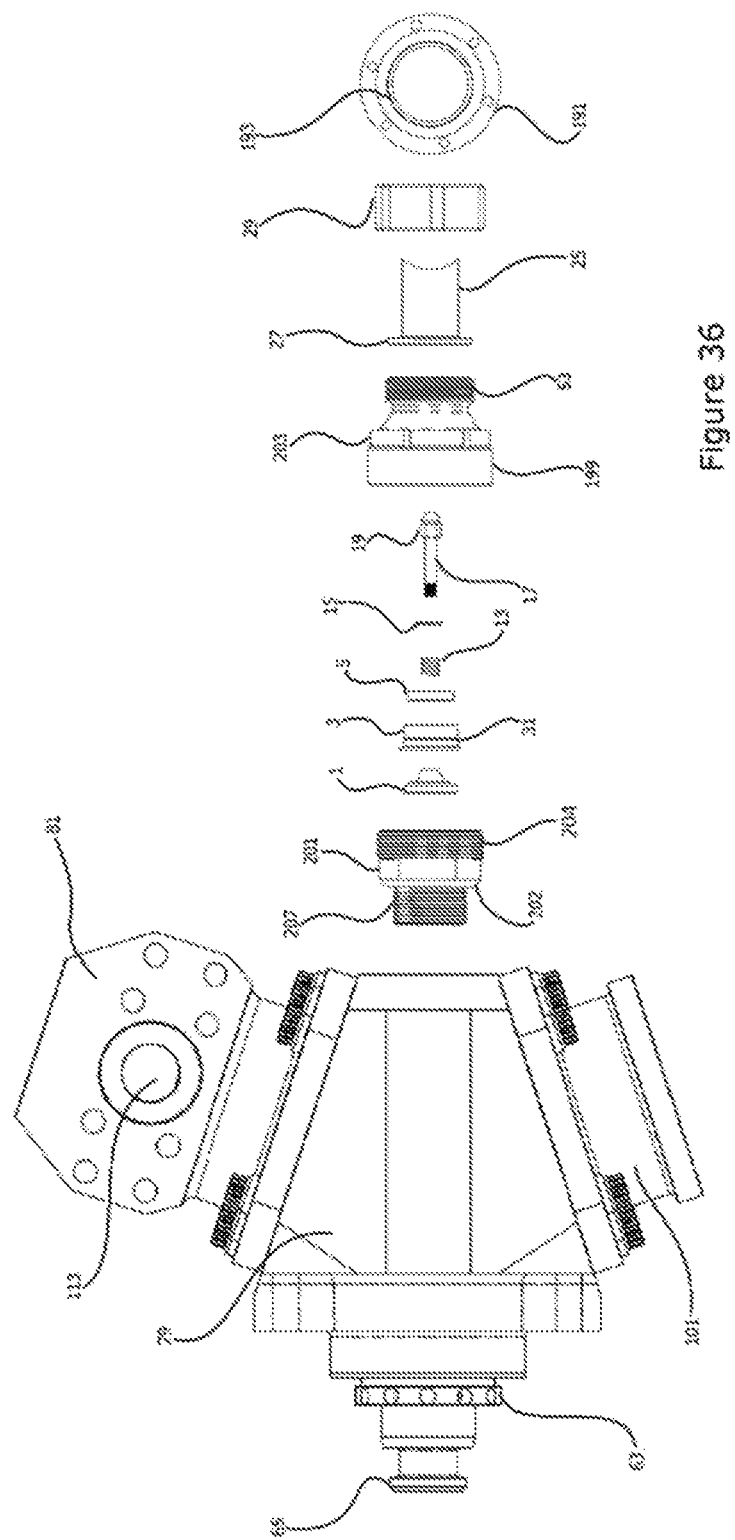
FIG. 36 is an exploded elevation view of the modified segmented fluid end of FIG. 35.

Referring to FIGS. 30, and 35, an ACD external two-piece assembly bottle bore 205 allows frac fluid to pass around the valve. This design allows this high wear area to be easily replaced.

Referring to FIGS. 29-31, and 35-37, ACD external two-piece assembly main adapter housing attachment threads 207 attach the housing to the fluid end. These are the attachment threads that attach the two-piece housing to fluid ends. The threads can be manufactured to attach to any existing back valve access hole or to a fluid end that is modified for ACD usage.

Figure 49:
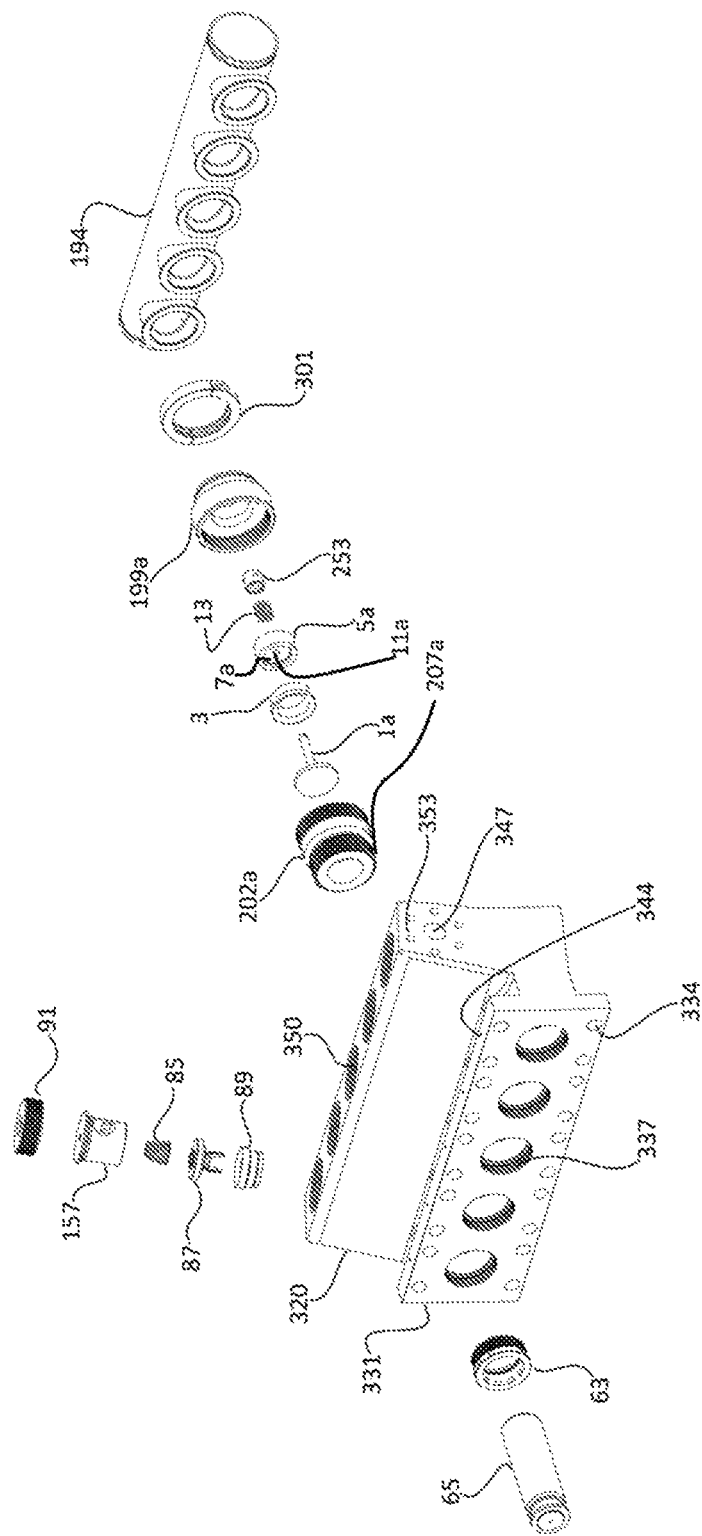
FIG. 49 is an isometric exploded view of the anti-cavitation fluid end of FIG. 48.

Referring to FIGS. 48, 49, and 50, larger ACD external two-piece assembly main adapter housing attachment threads 207a attach the housing to the fluid end. These are the attachment threads that attach the two-piece housing to fluid ends. The threads can be manufactured to attach to any existing back valve access hole or to a fluid end that is modified for ACD usage. This design is not compatible with current fluid ends without modification.

Referring to FIG. 35, an ACD external two piece assembly entry path 209 is a path from the bottle bore through the attachment threads from the compression area of the fluid end that allows frac fluid to pass through the two piece assembly main adapter housing.

Referring to FIGS. 30-31, and 35-37, a path bore through the back of a fluid head without a back access hole 211 is the fluid path bored into a fluid head that does not have a back access. The hole can be bored to allow any demand of extra frac fluid from the two piece ACD housing.

Figure 31:
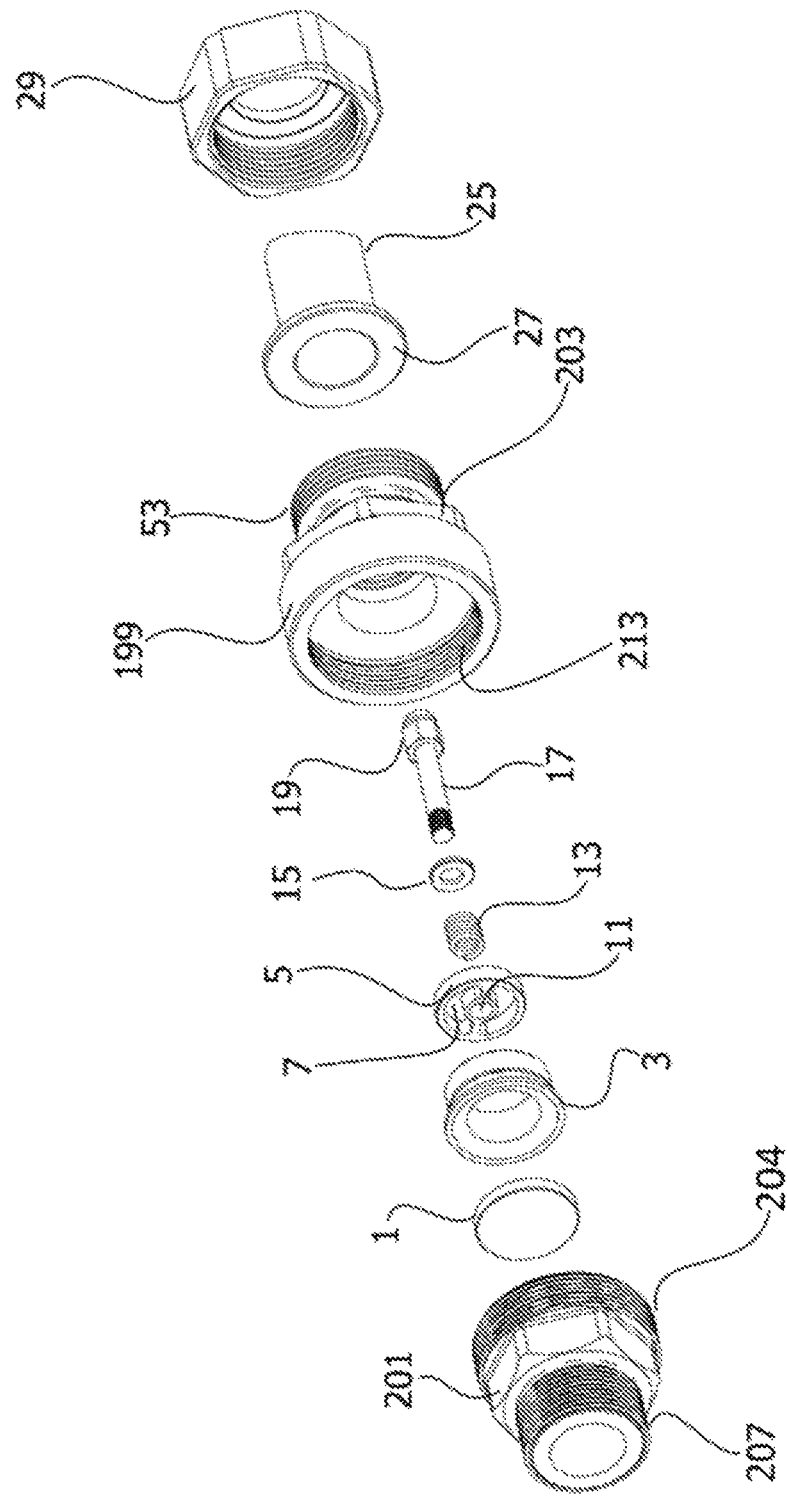
FIG. 31 is an exploded view of the anti-cavitation device of FIG. 29.
Figure 32:
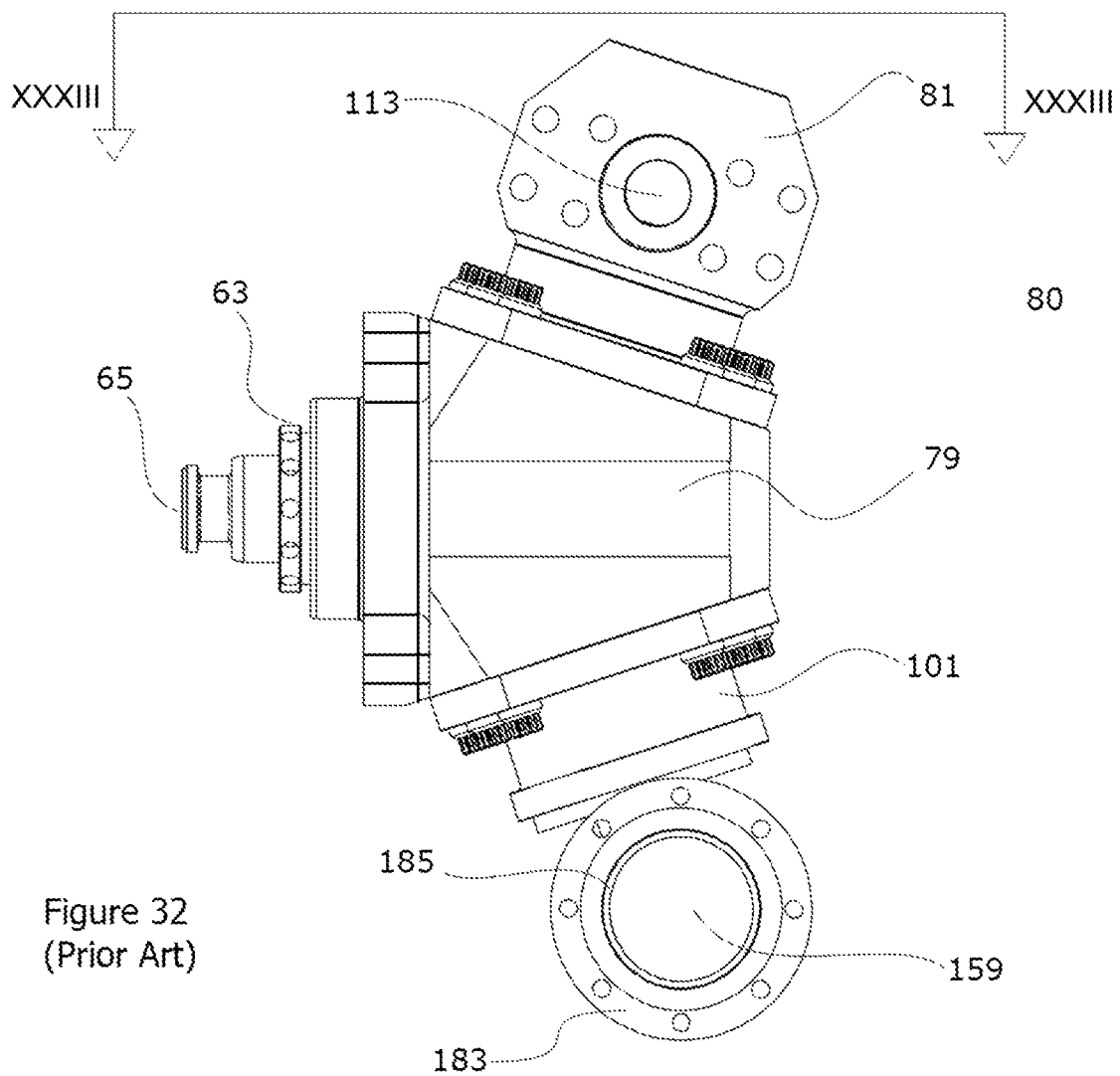
FIG. 32 is an elevation view of a segmented fluid end.
Figure 33:
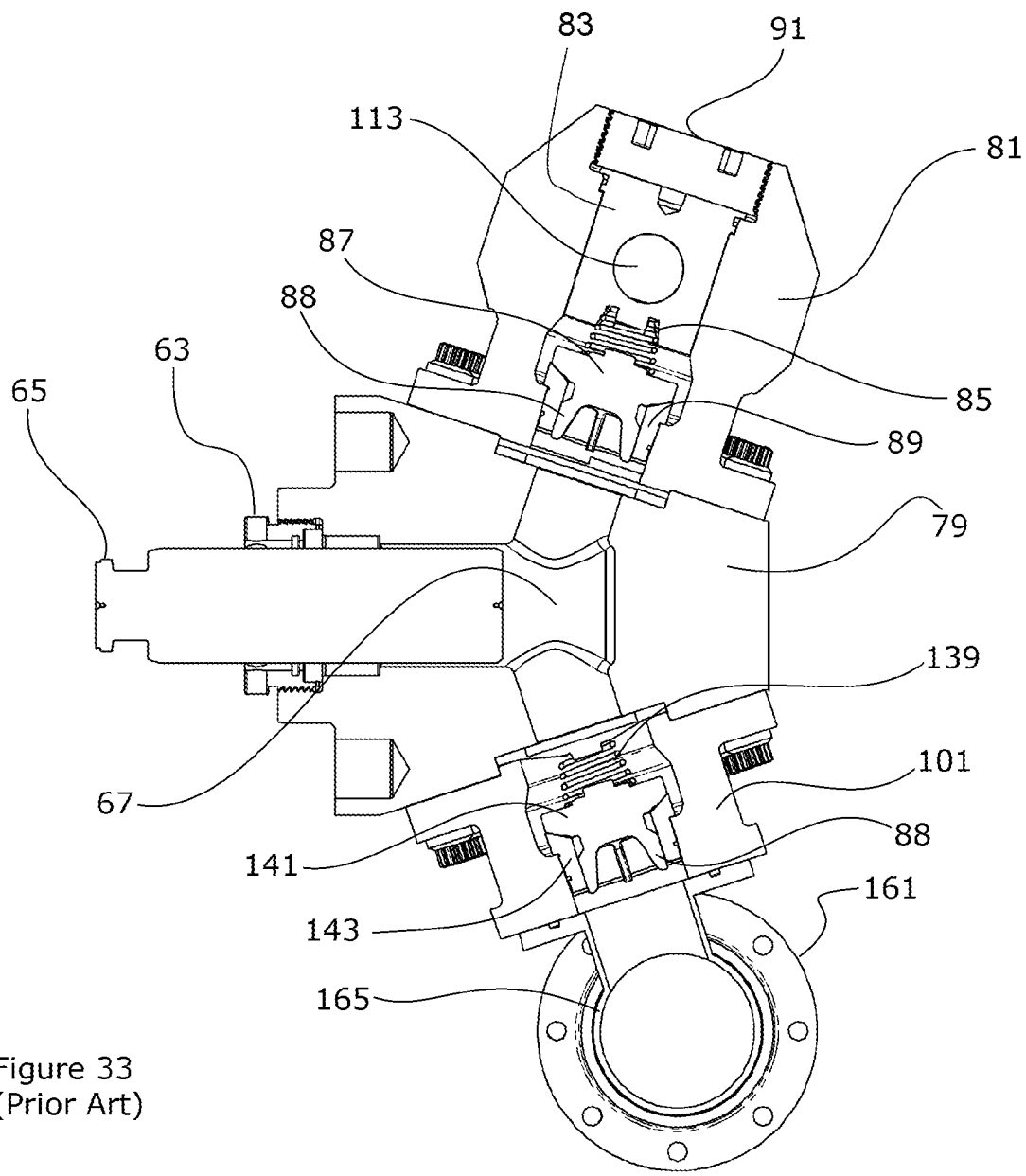
FIG. 33 is a sectional elevation view of the segmented fluid end of section FIG. 32, cut along the line XXXII-XXXII.
Figure 34:
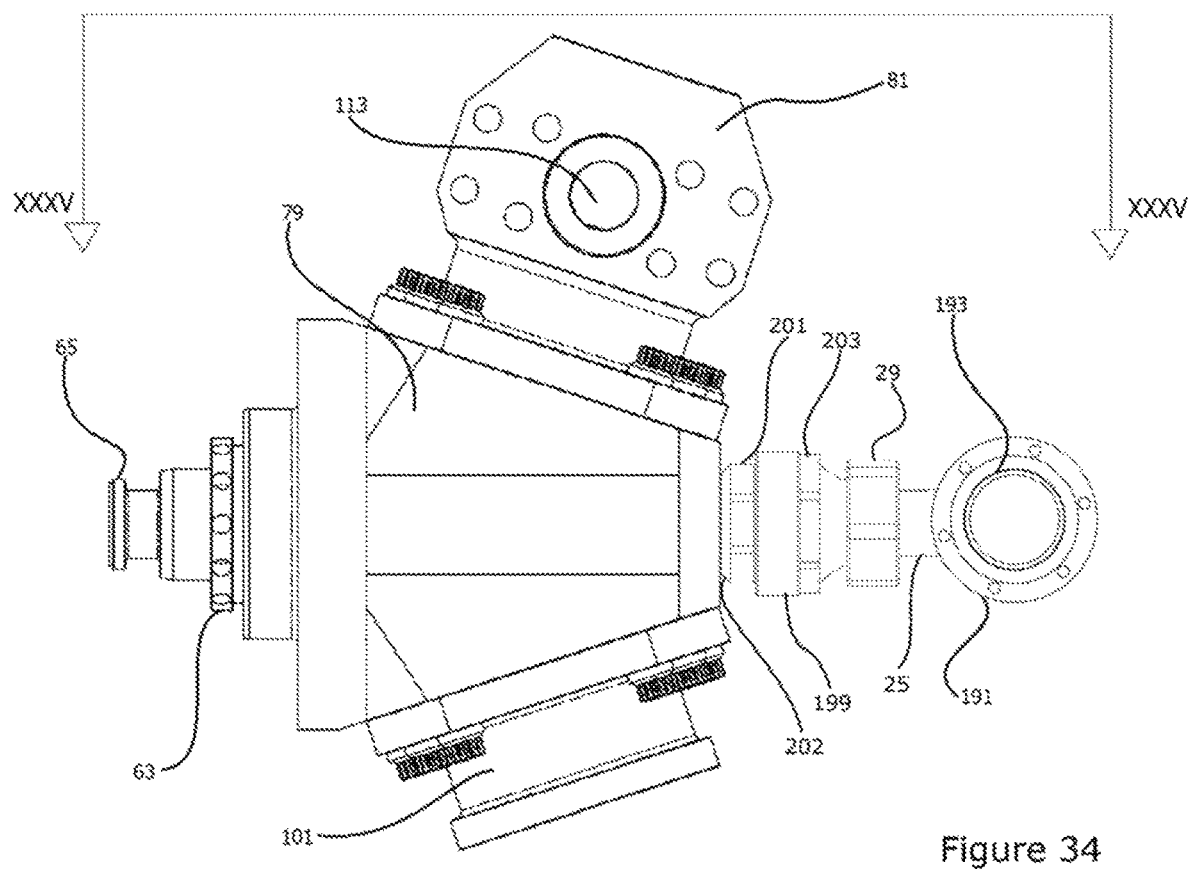
FIG. 34 is a side elevation view of a modified segmented fluid end, in accordance with a preferred embodiment.
Figure 37:
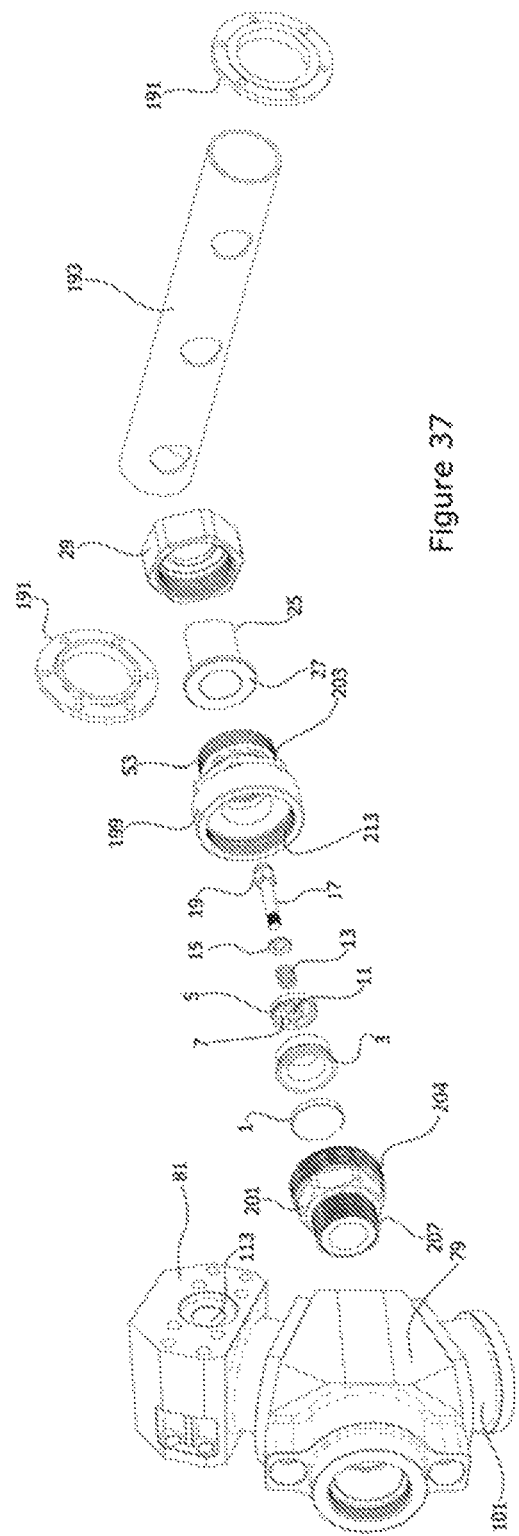
FIG. 37 is an exploded isometric view of the modified segmented fluid end of FIG. 35.
Figure 38:
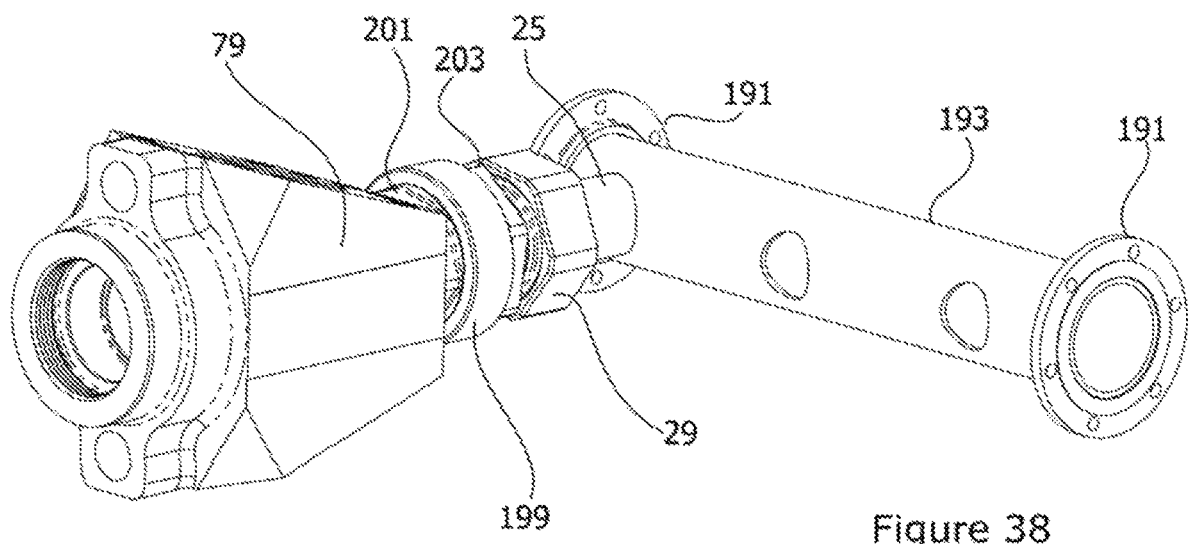
FIG. 38 is an assembled isometric view of the modified segmented fluid end of FIG. 35.
Figure 39:
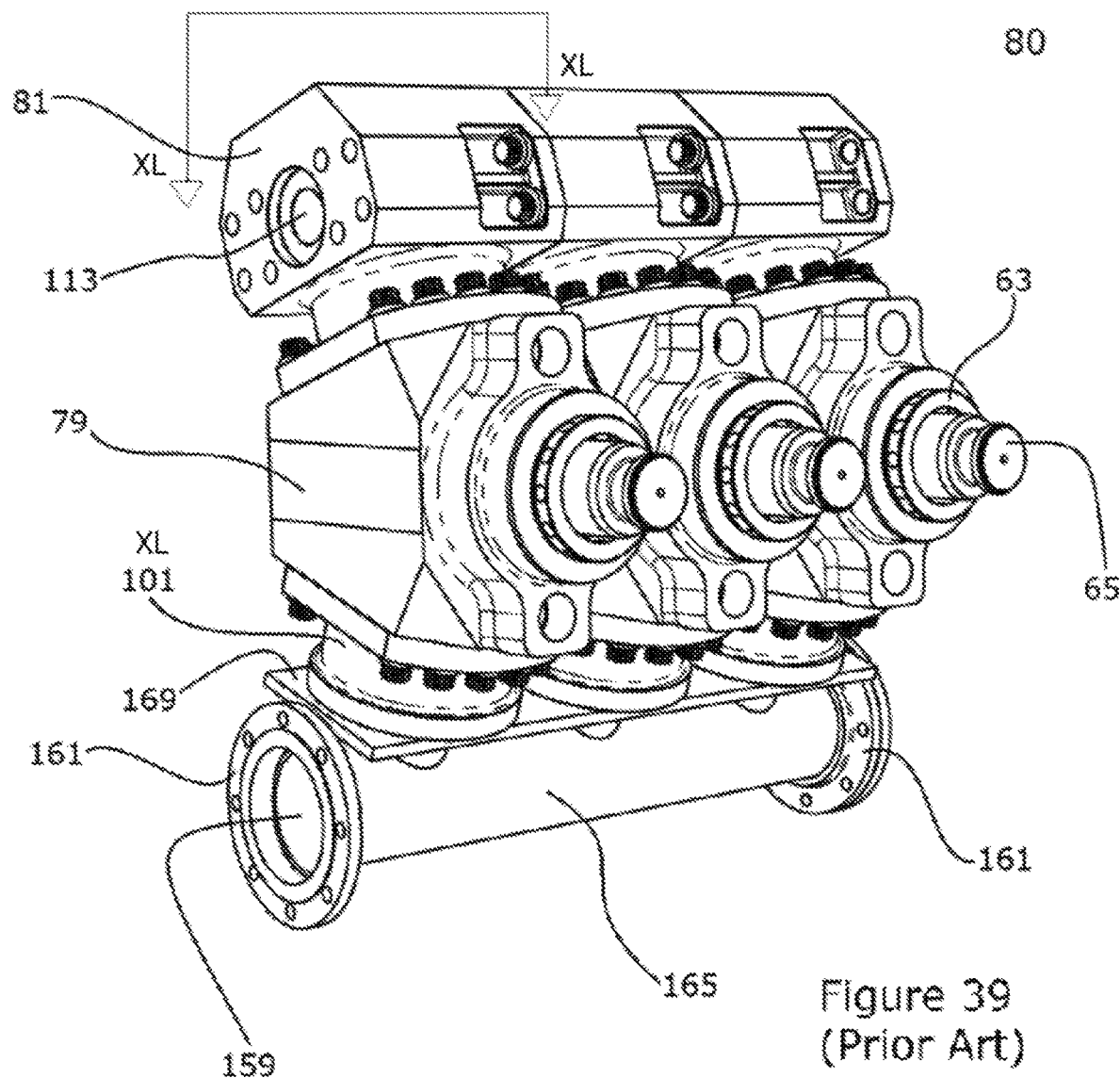
FIG. 39 is an isometric view of a segmented fluid end.
Figure 40:
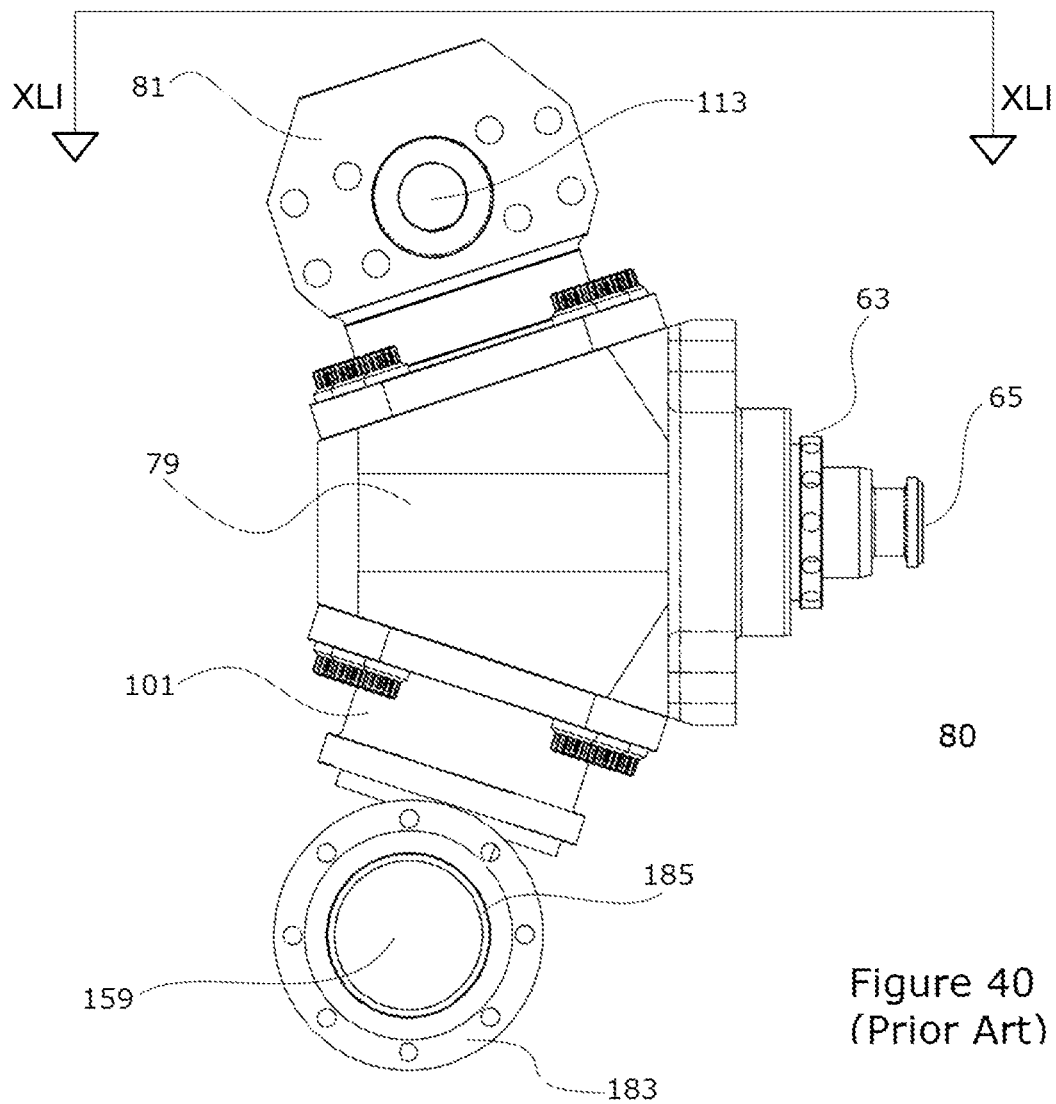
FIG. 40 is an elevation view of the segmented fluid end of FIG. 39, cut along the line XL-XL.
Figure 41:
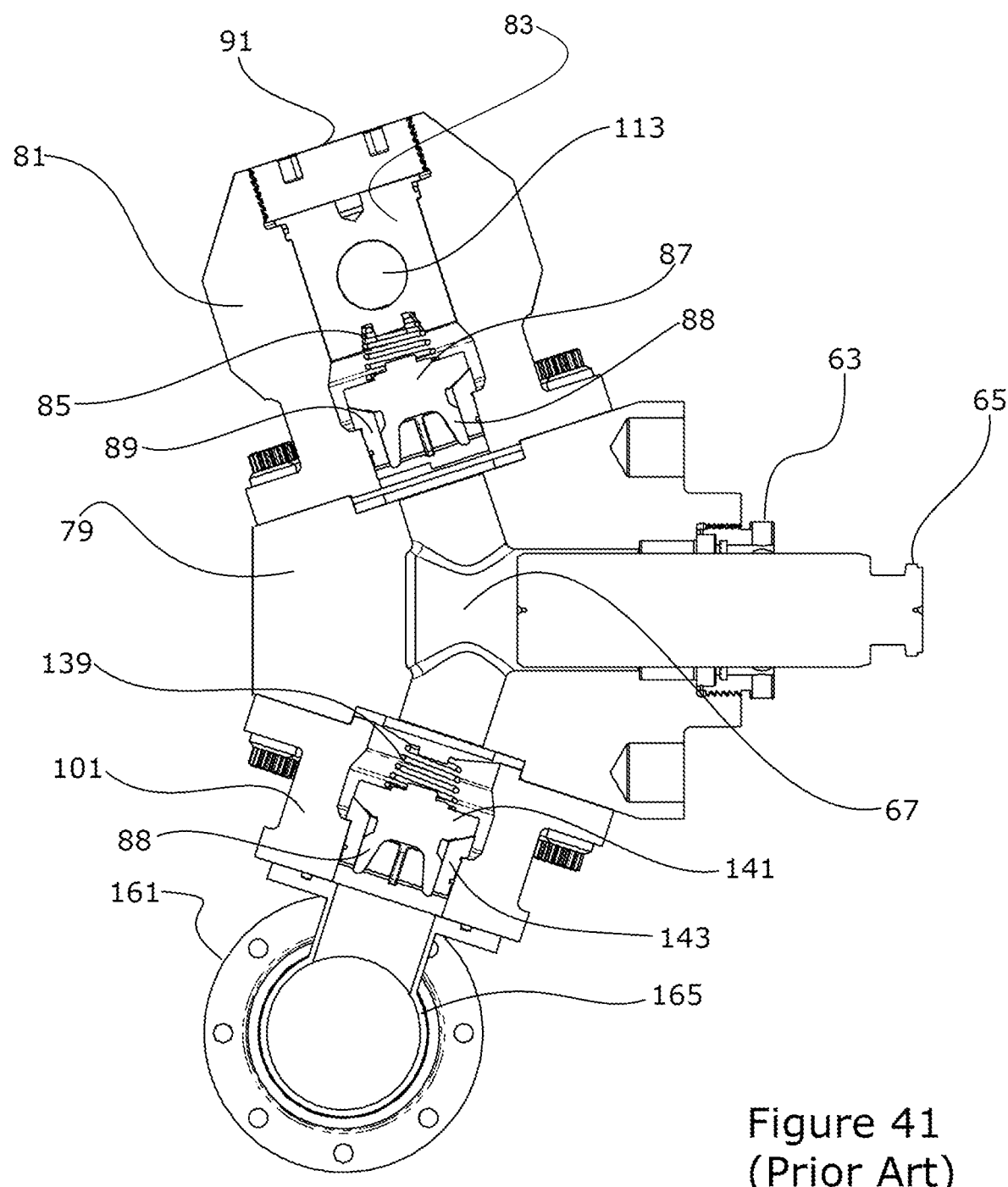
FIG. 41 is a sectional elevation view of the segmented fluid end of FIG. 40, cut along the line XLI-XLI.
Figure 42:
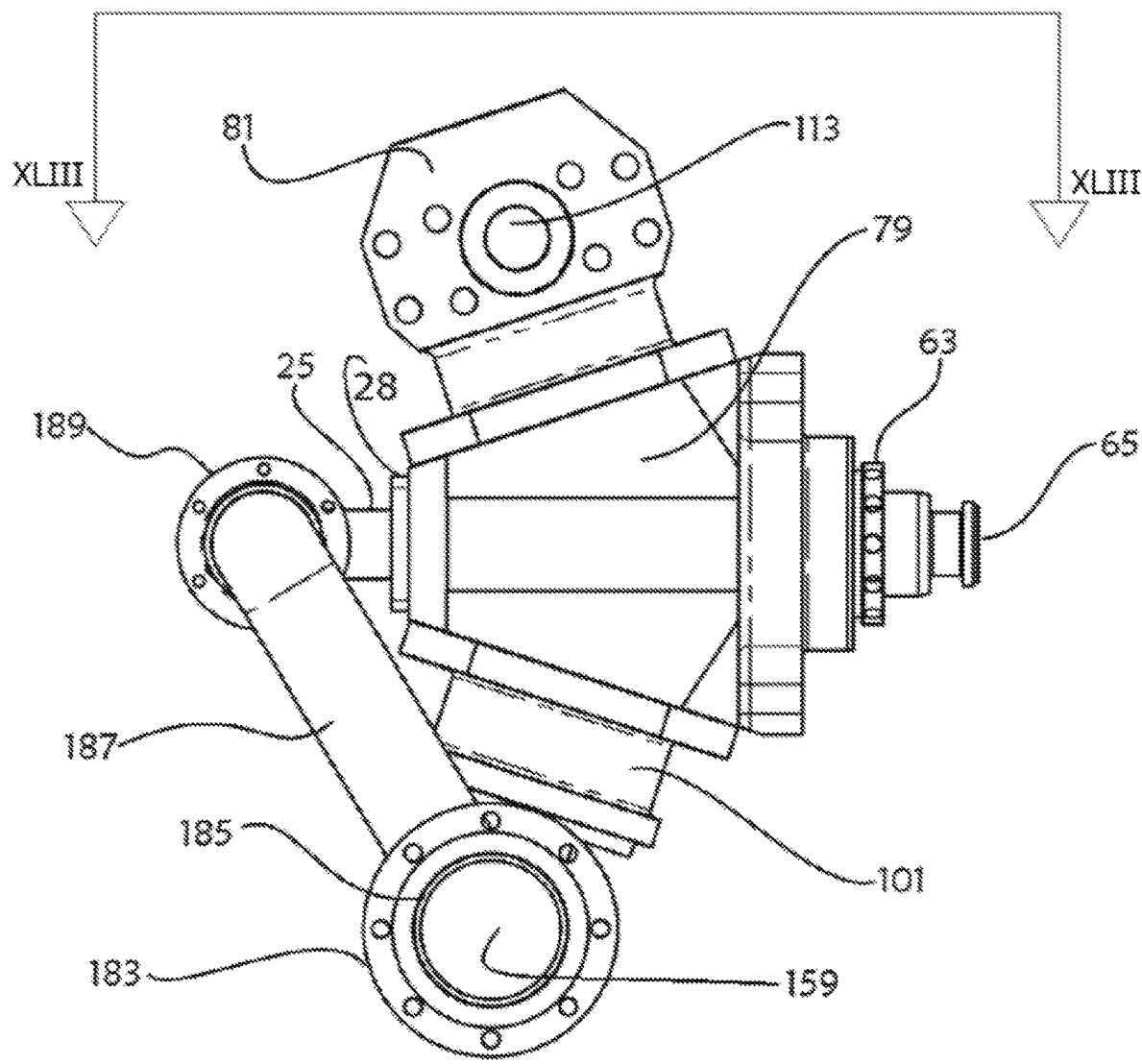
FIG. 42 is an elevation view of a modified segmented fluid end, in accordance with another preferred embodiment.
Figure 43:
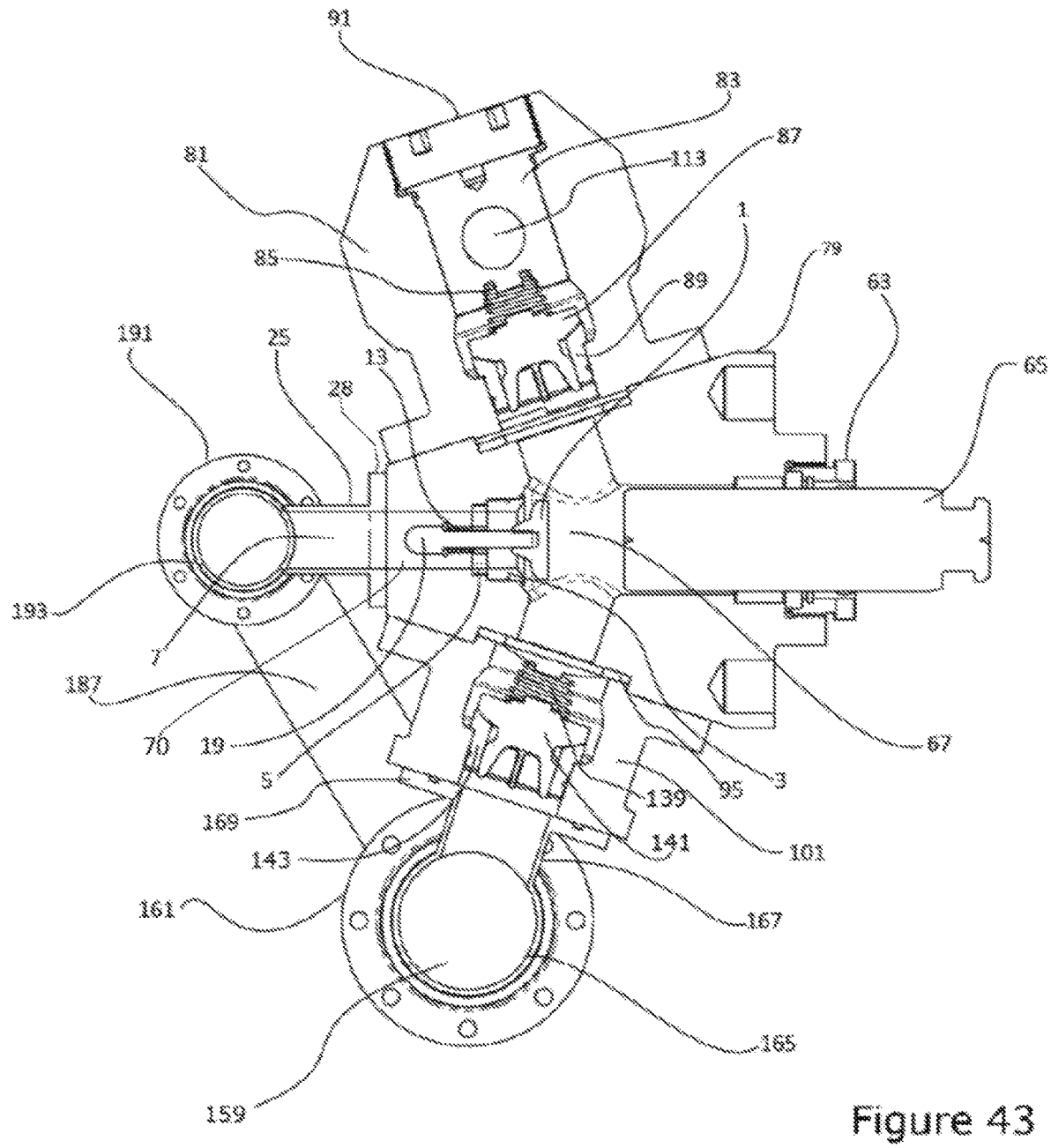
FIG. 43 is a sectional elevation view of the modified segmented fluid end of FIG. 42, cut along the line XLII-XLII.
Figure 44:
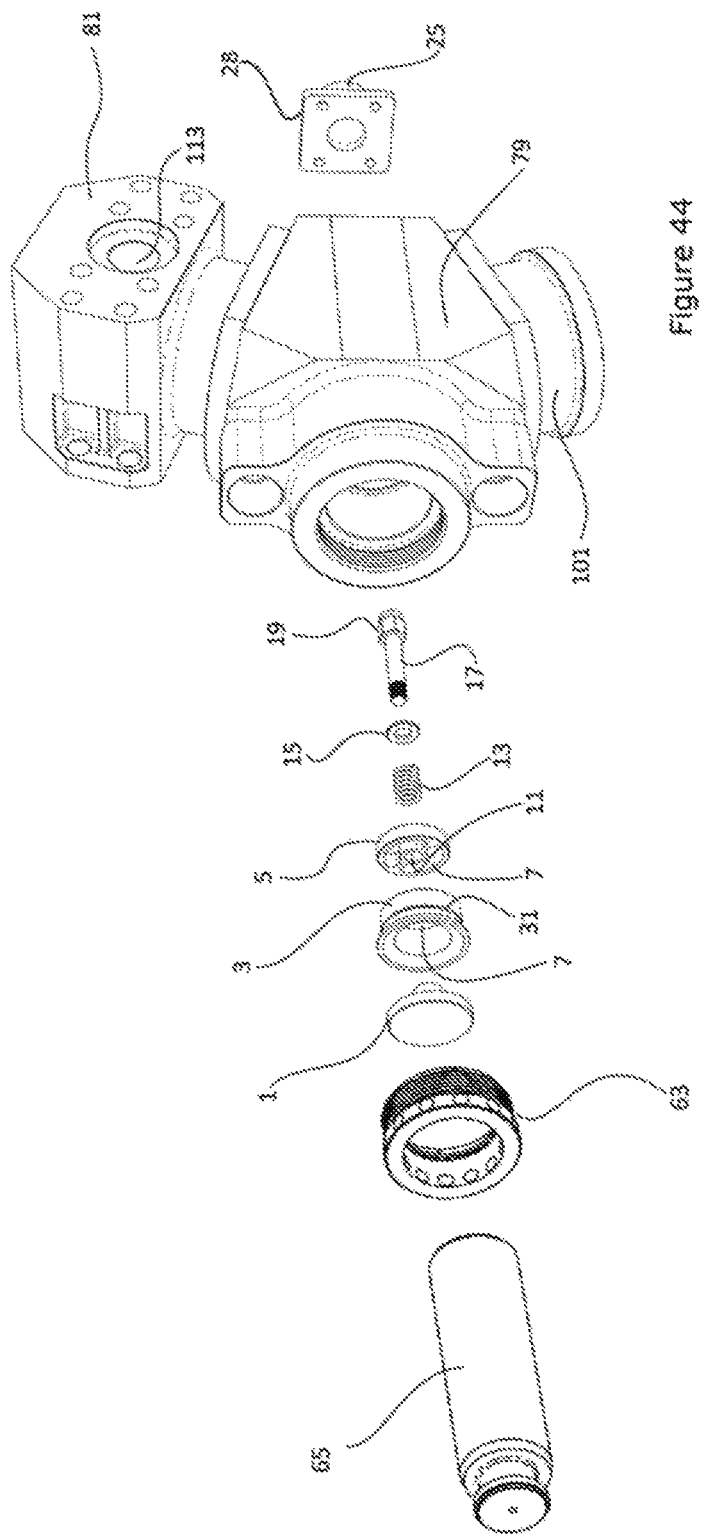
FIG. 44 is a partially exploded isometric view of the modified segmented fluid end of FIG. 42.
Figure 45:
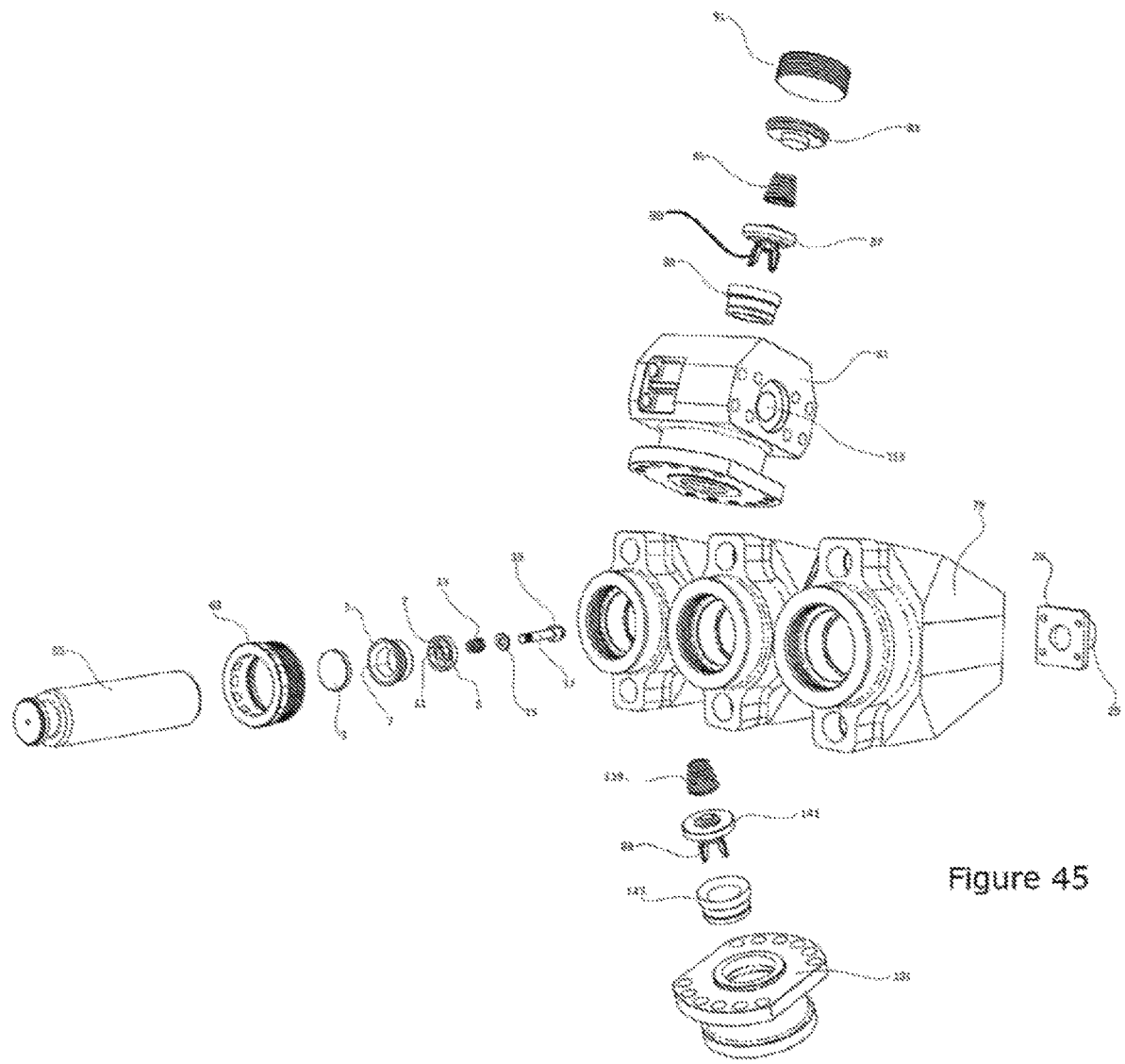
FIG. 45 is an exploded isometric view of the modified segmented fluid end of FIG. 42.

Referring to FIGS. 31 and 37, internal threads in the valve assembly housing of the two-piece housing 213 screw onto the attachment threads of the main adapter housing.

Referring to FIG. 48, larger internal threads in the valve assembly housing of the two-piece housing 213s screw onto the attachment threads of the main adapter housing.

Referring to FIGS. 53, 54, 55, 57, there is shown a larger ACD Outer Spring Retainer 253. This has the same function as ACD Outer Spring Retainer 53 but is modified for a larger diameter valve stem required for the ACFE.

Referring to FIGS. 53, 54, 55, and 57, there is shown a Bolt on ACD 260. This design allows the largest valve for the ACFE. This is the complete ACD assembly to be used on the ACFE. It can vary in size depending on center distance of the fluid end. Illustrated is the ACFE on 10" centers. The total output of fluid without cavitation will increase dramatically on 12" centers because of being able to go to an even larger valve size which increases the valve to plunger ratio. This ACD 260 will allow a larger valve than the CFE could use. Instead of adding another valve, to give a freer flow to the conventional design to cut down on cavitation, this ACD 260 gives the ACFE design the same advantage but with just one larger valve. When the center distance is great enough, additional valves can be added to the bolt-on ACD 260 for even greater flow. Also, the location gives a straight pull on the frac fluid which cuts down on cavitation.

Figure 54:
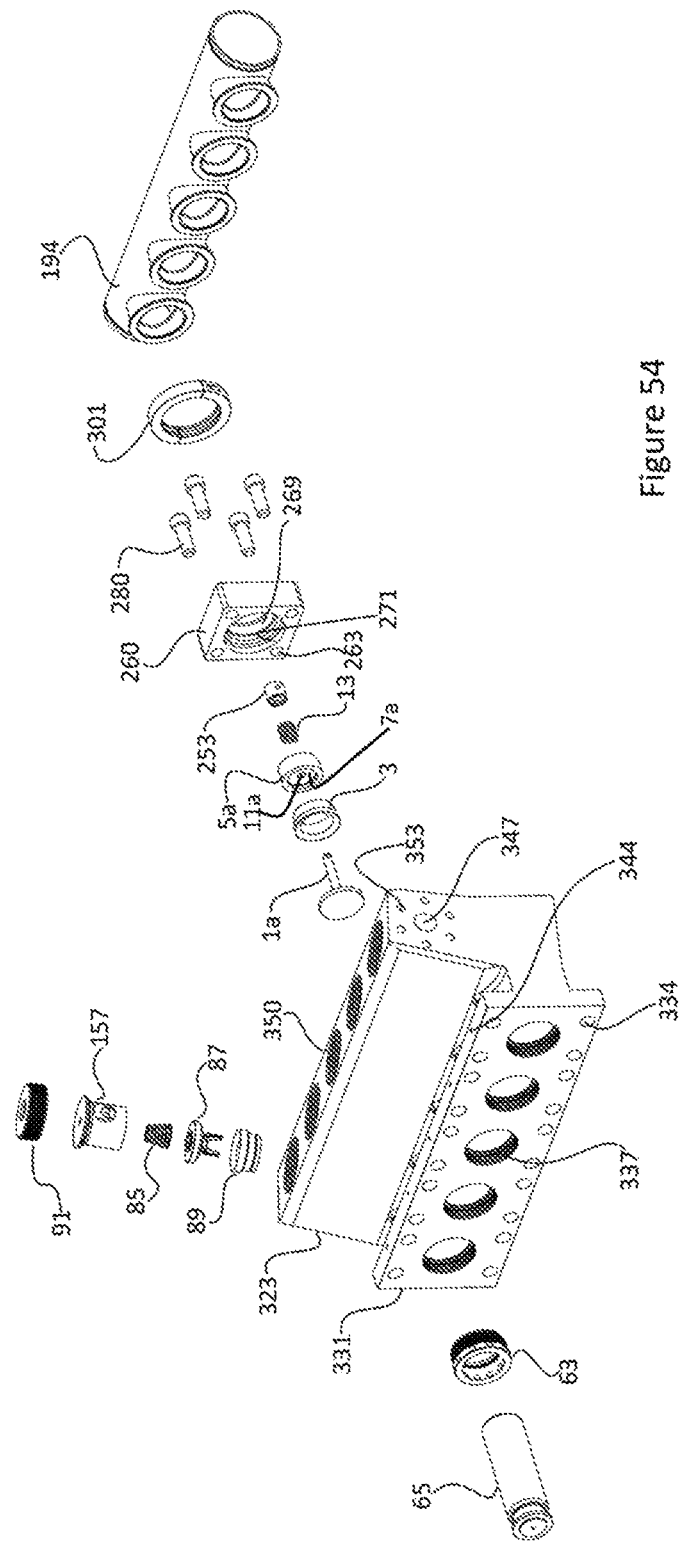
FIG. 54 is an isometric exploded view of the anti-cavitation fluid end of FIG. 53.

Referring to FIG. 54, there are shown through holes 263 that allow attachment of the ACD to the new ACFE design fluid end. These access holes 263 can vary in size or quantity, depending on pressure demands of the pump.

Referring to FIGS. 53, 54, 55, and 57, there is shown a taper 269 in the ACD for holding the valve seat. This area 269 may be modified to hold new designed valve seats.

Figure 53:
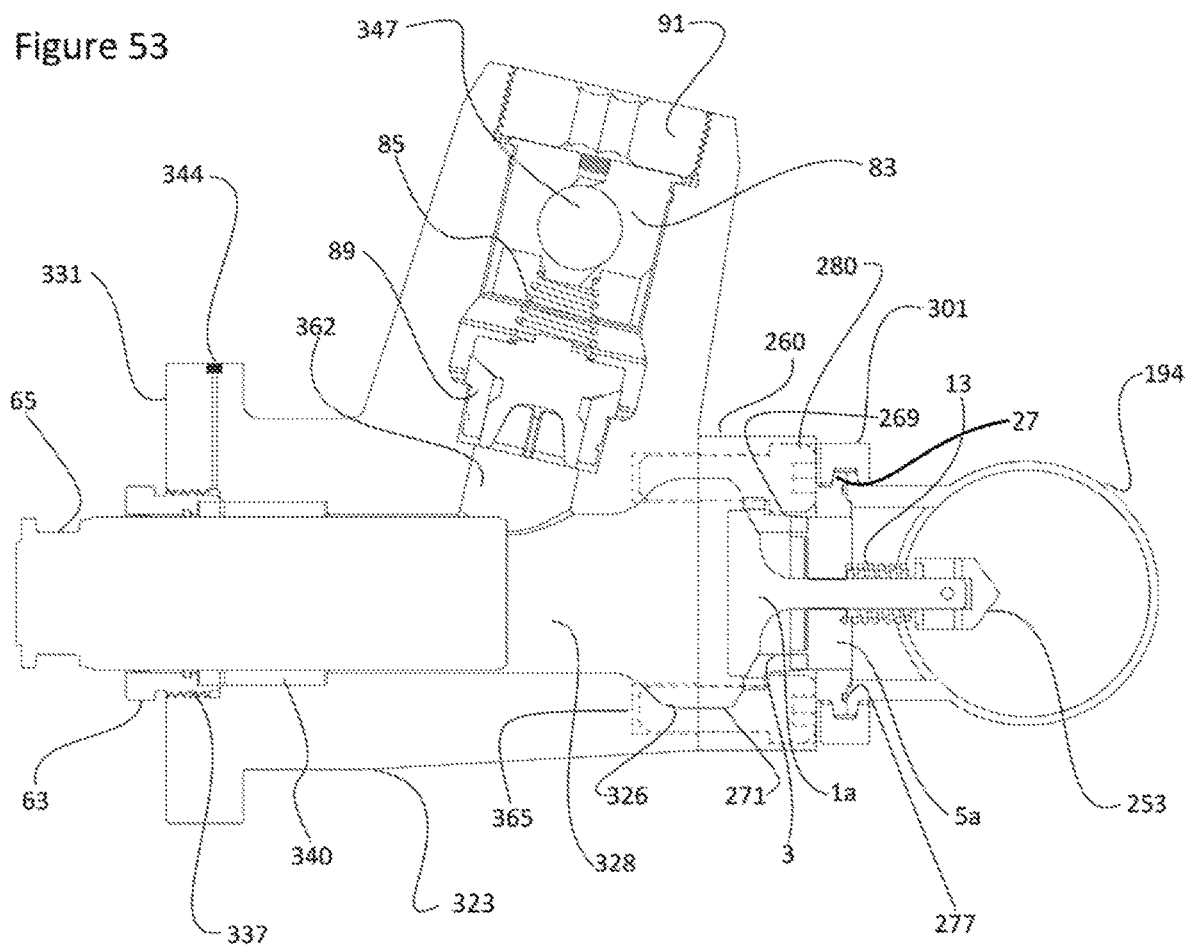
FIG. 53 is a side elevation sectional view of the anti-cavitation fluid end in accordance with another embodiment.
Figure 56:
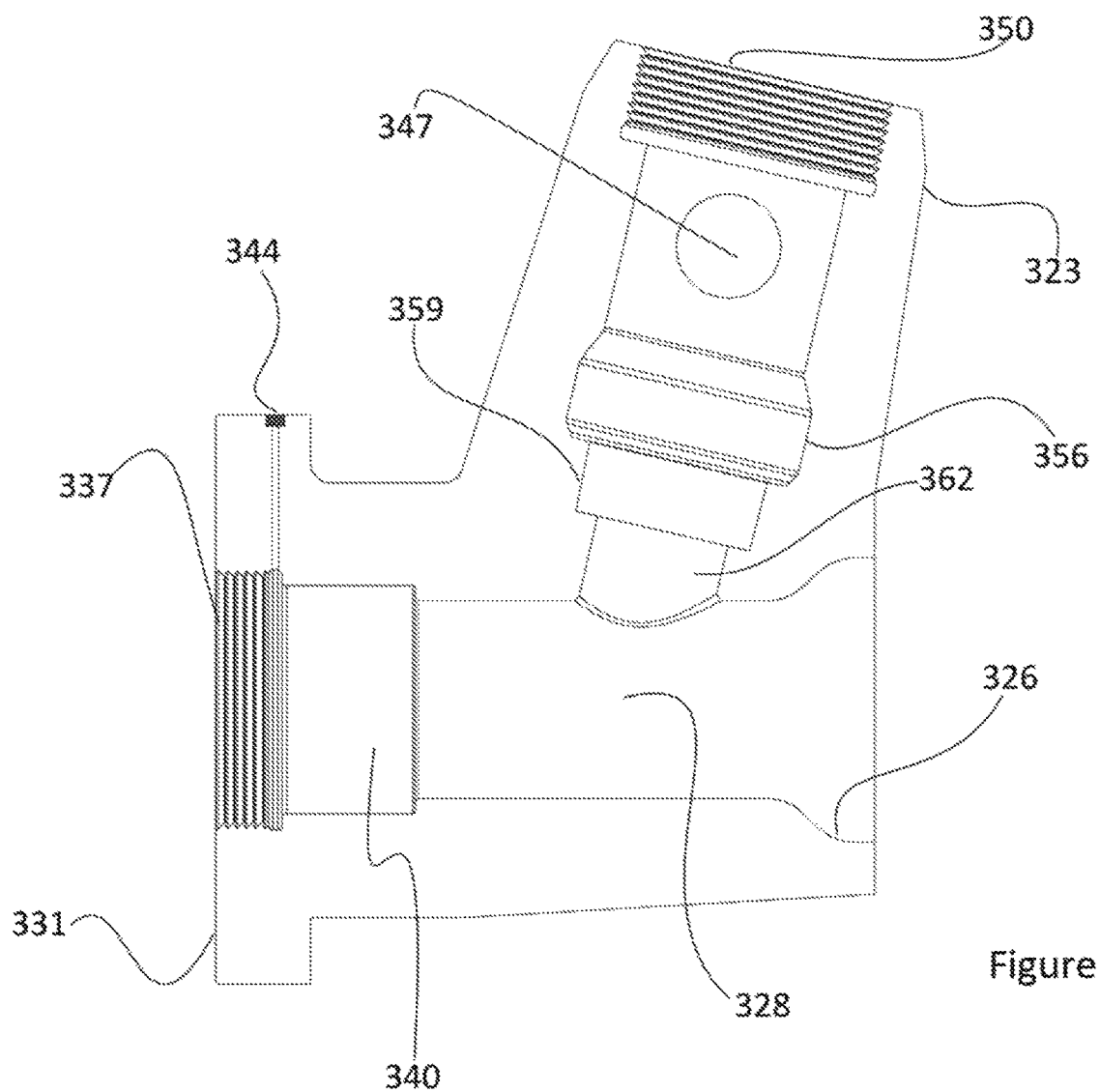
FIG. 56 is a side elevation sectional view of the anti-cavitation fluid end in accordance with another embodiment.
Figure 57:
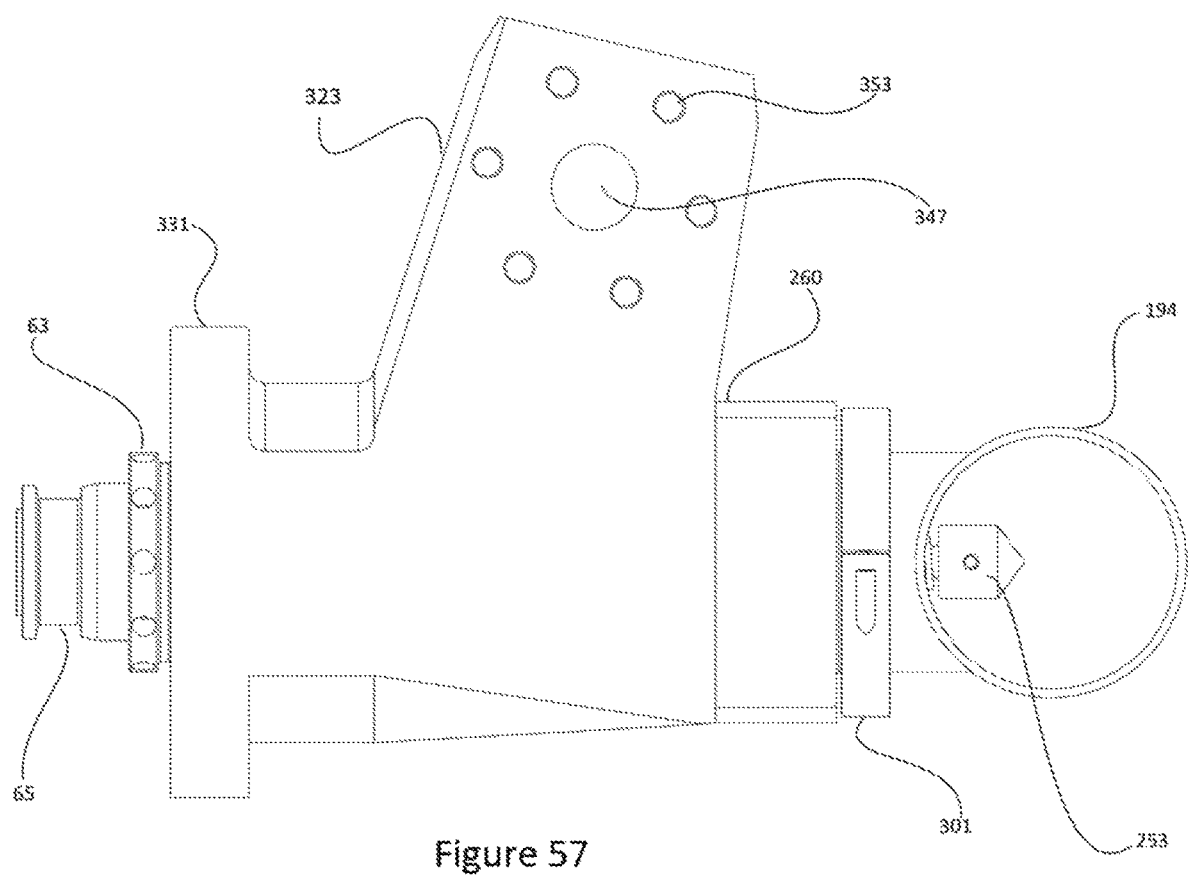
FIG. 57 is a side elevation sectional view of the anti-cavitation fluid end in accordance with another embodiment.
Figure 58:
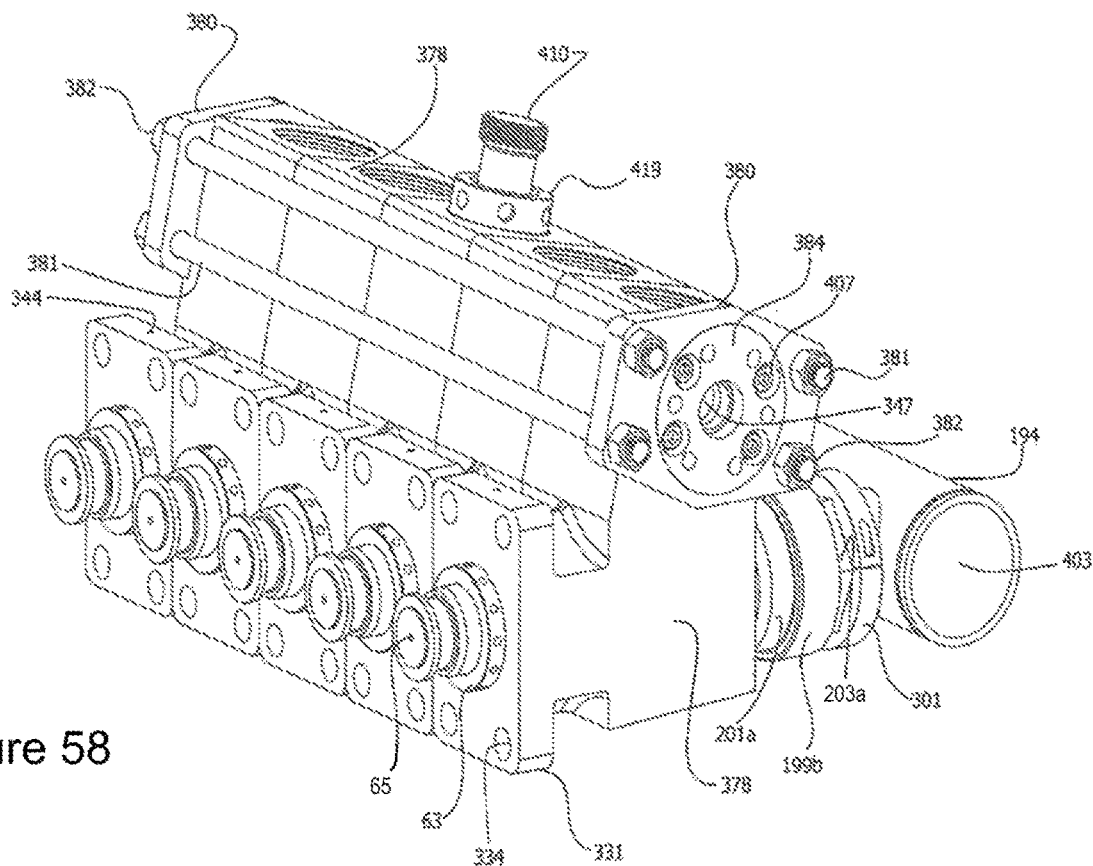
FIG. 58 is a top and front isometric view of a segmented anti-cavitation fluid end in accordance with a preferred embodiment.
Figure 59:
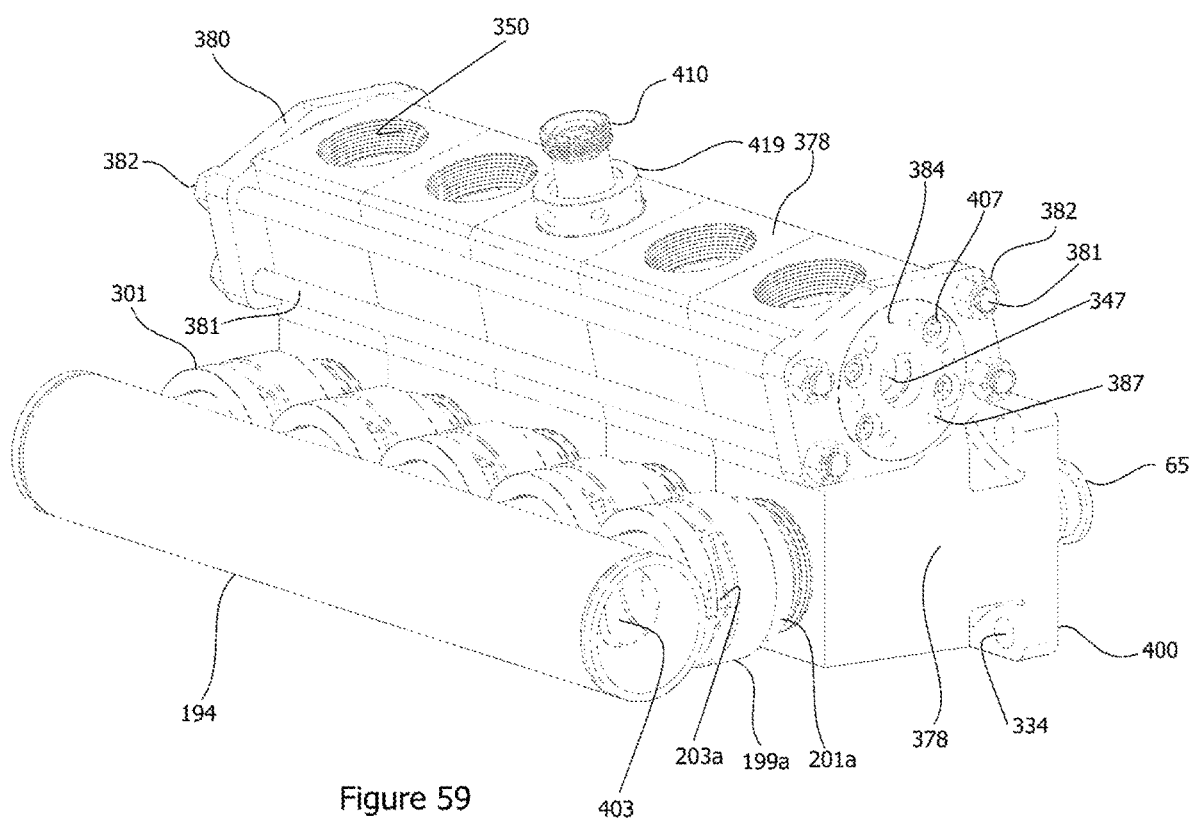
FIG. 59 is a top and rear isometric view of the segmented anti-cavitation fluid end of FIG. 58.
Figure 60:
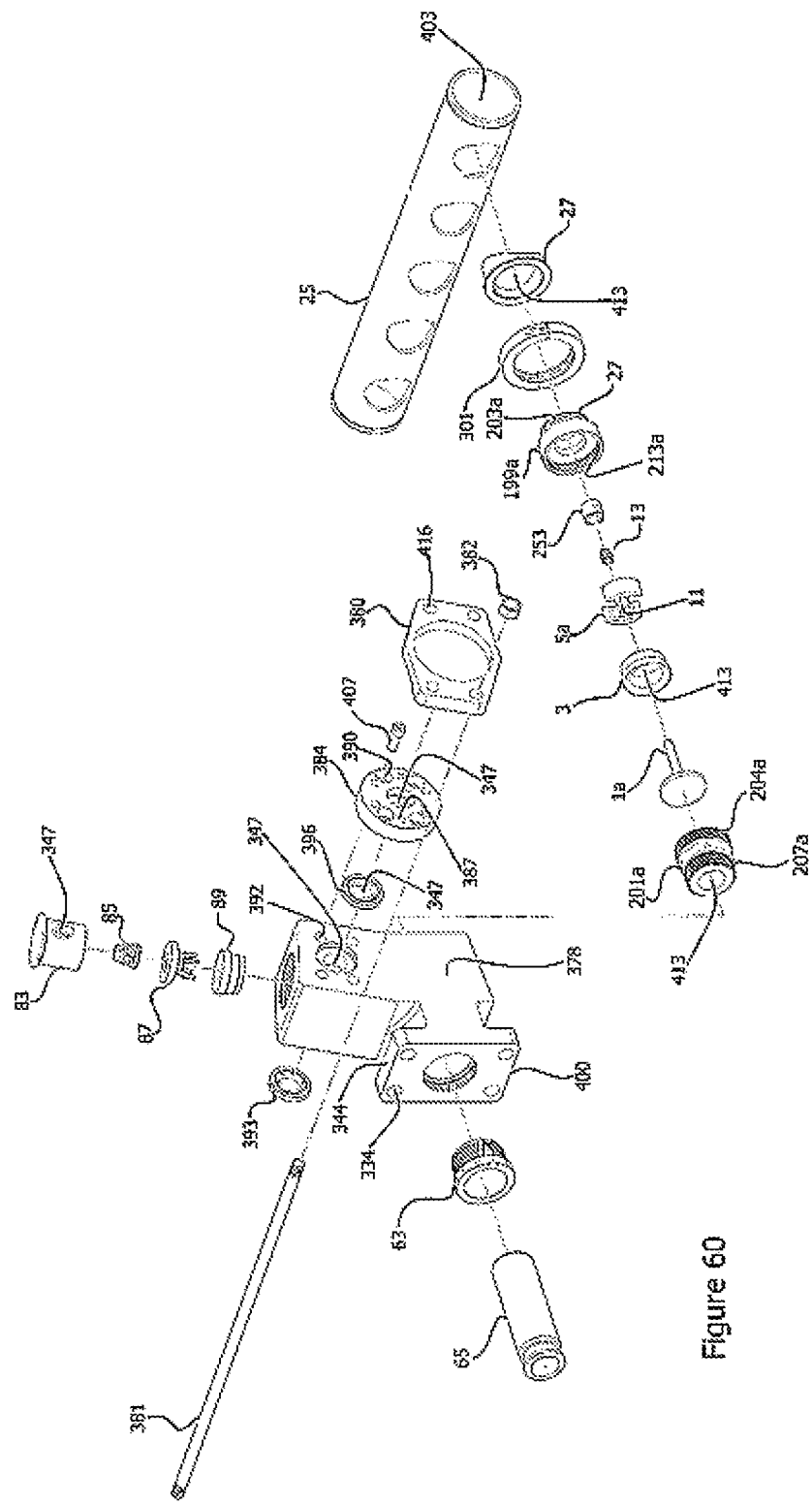
FIG. 60 an exploded isometric view of a portion of the segmented anti-cavitation fluid end of FIG. 58.
Figure 61:
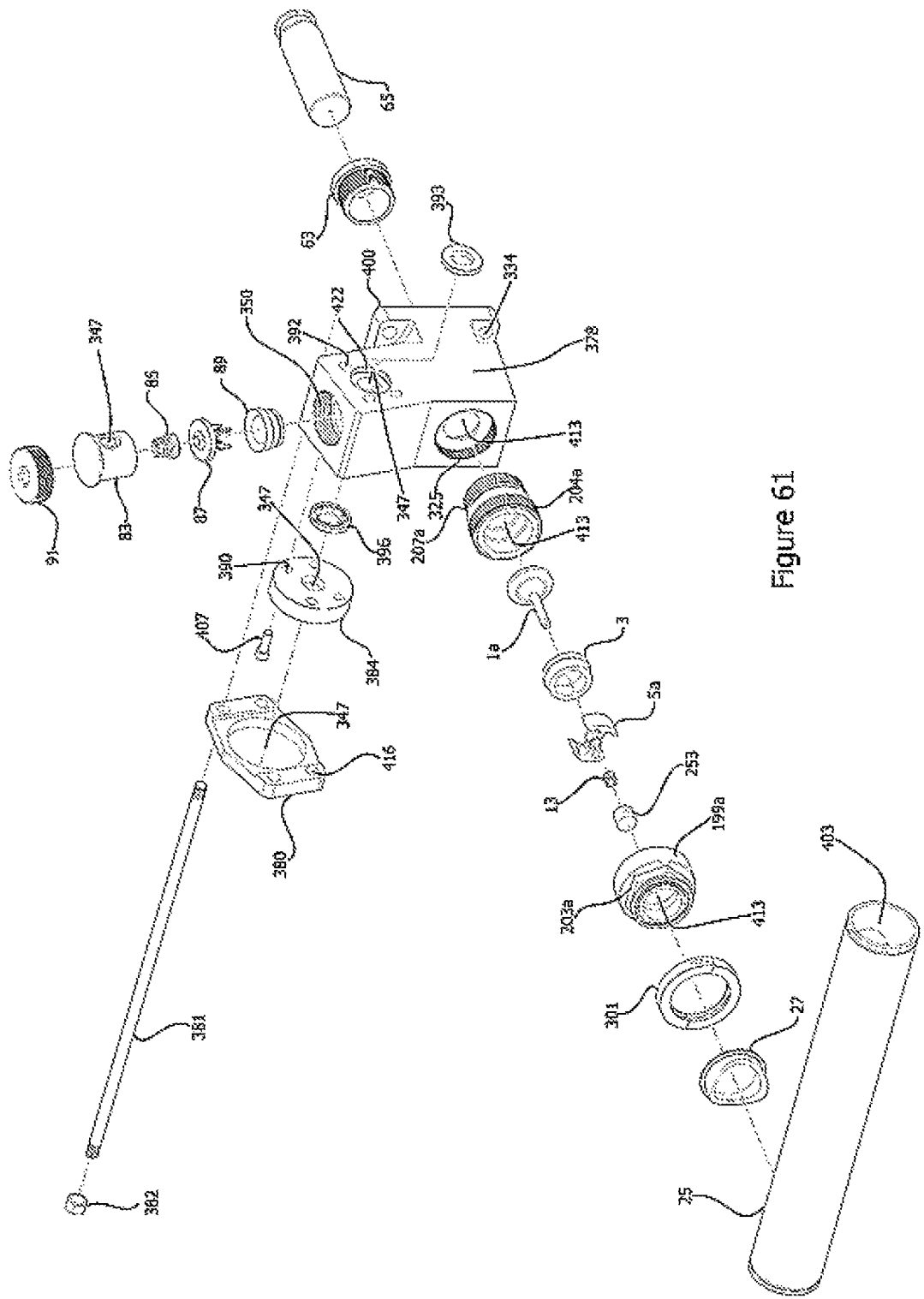
FIG. 61 is an exploded isometric view of a portion of the segmented anti-cavitation fluid end of FIG. 59.
Figure 62:
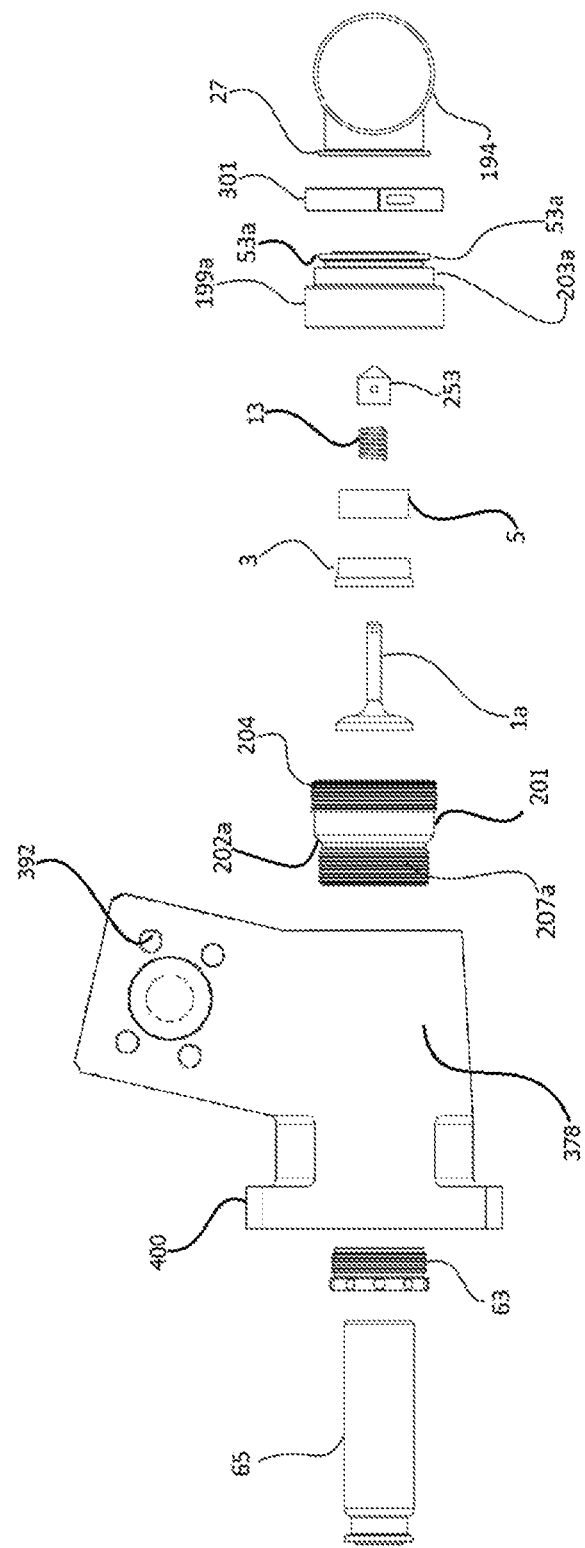
FIG. 62 is an exploded side elevation view of a portion of the segmented anti-cavitation fluid end of FIGS. 58 and 59.
Figure 63:
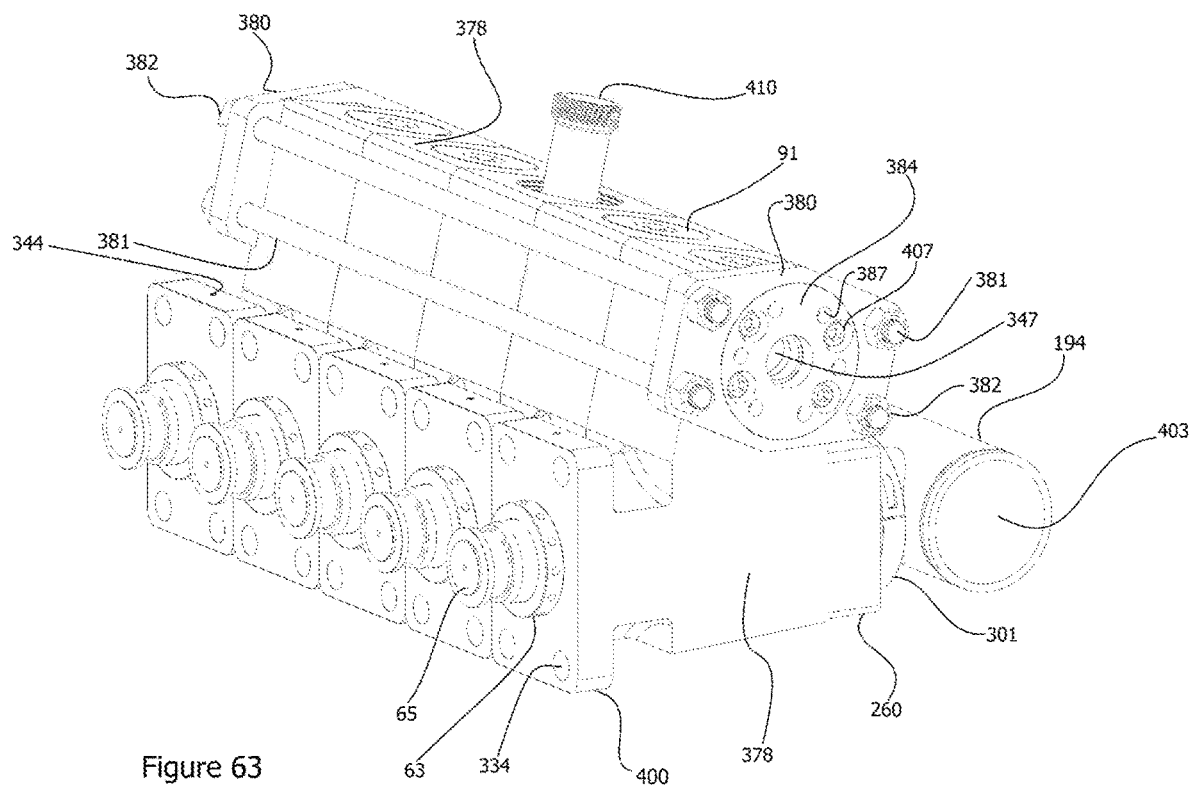
FIG. 63 is a top and front isometric view of a segmented anti-cavitation fluid end in accordance with another embodiment.
Figure 64:
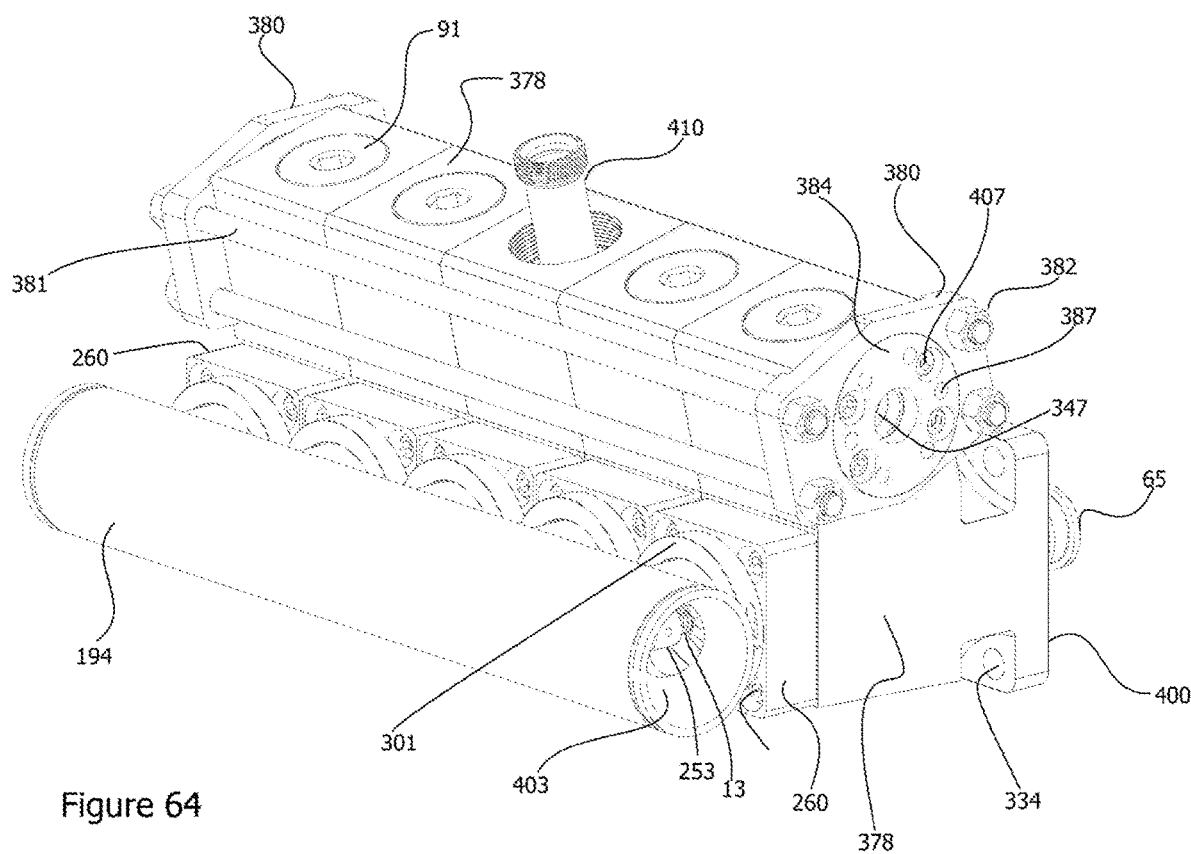
FIG. 64 is a top and rear isometric view of the segmented anti-cavitation fluid end of FIG. 63.
Figure 65:
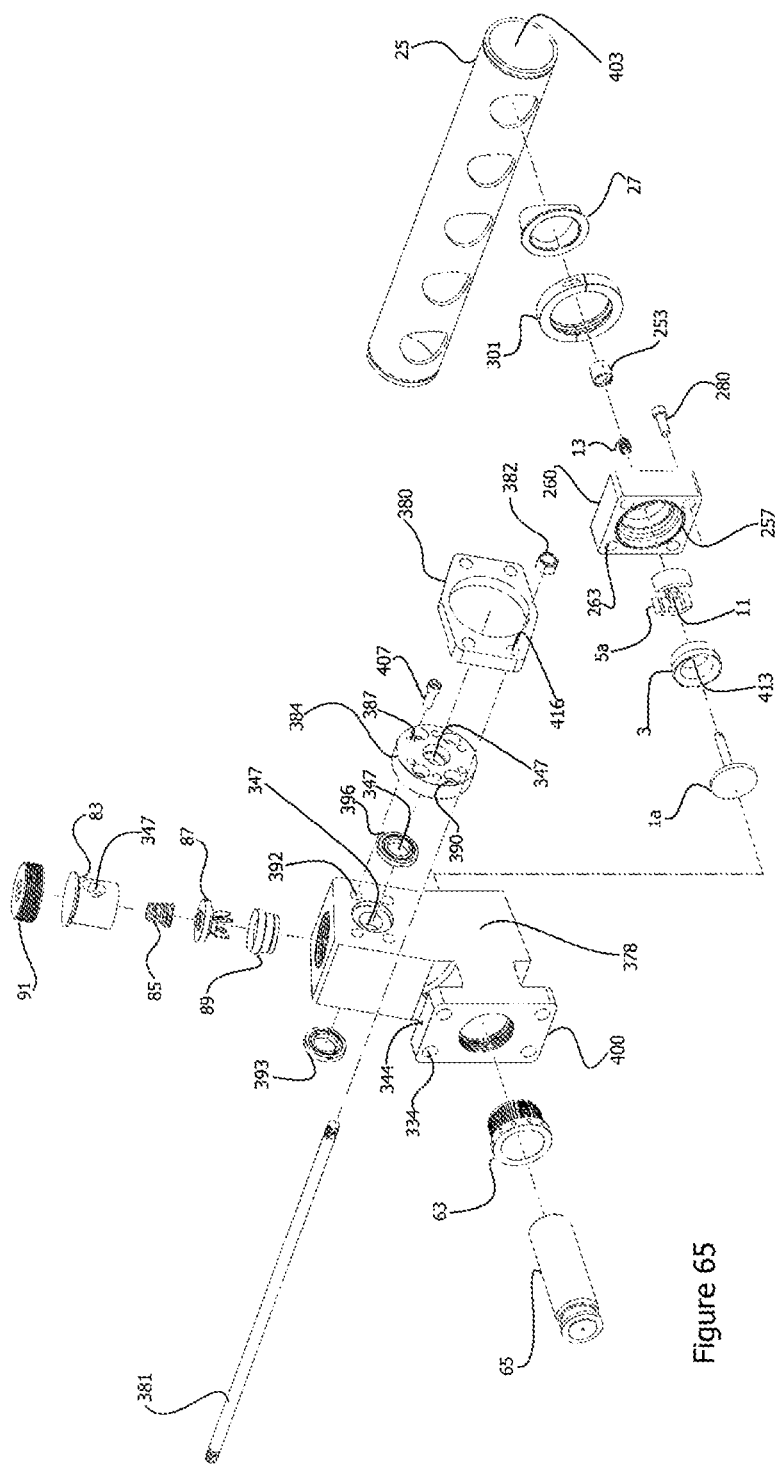
FIG. 65 an exploded isometric view of a portion of the segmented anti-cavitation fluid end of FIG. 63.
Figure 66:
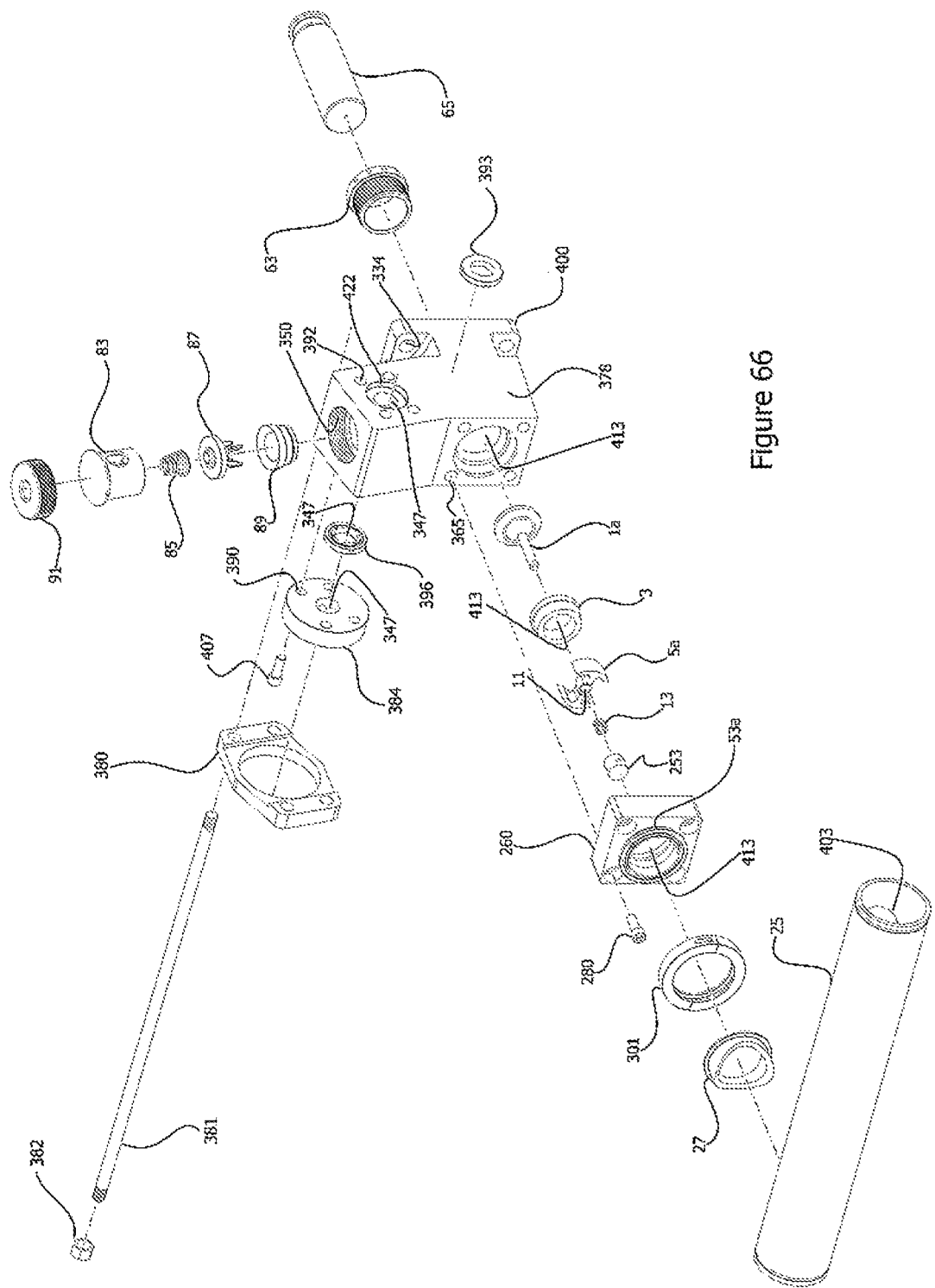
FIG. 66 an exploded isometric view of a portion of the segmented anti-cavitation fluid end of FIG. 64.
Figure 67:
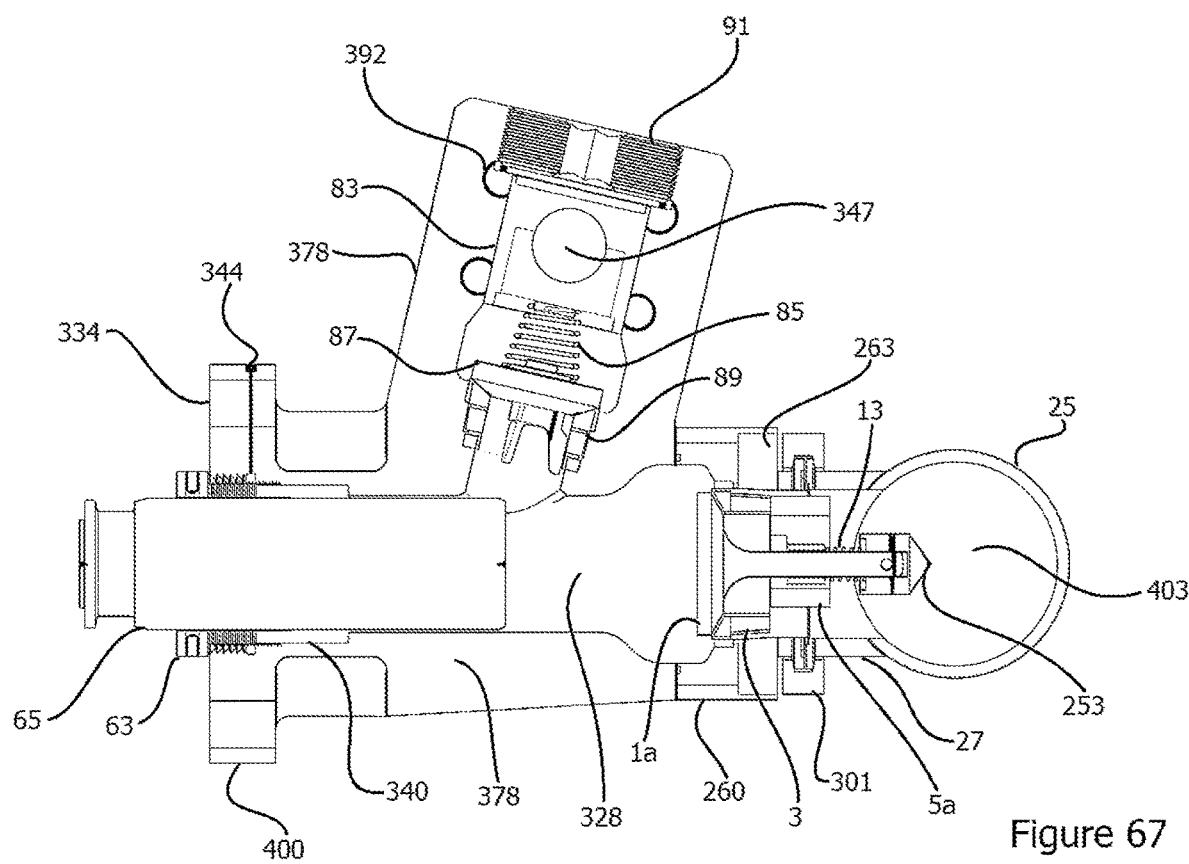
FIG. 67 is a sectional view of the segmented anti-cavitation fluid end of FIGS. 63 and 64.
Figure 68:
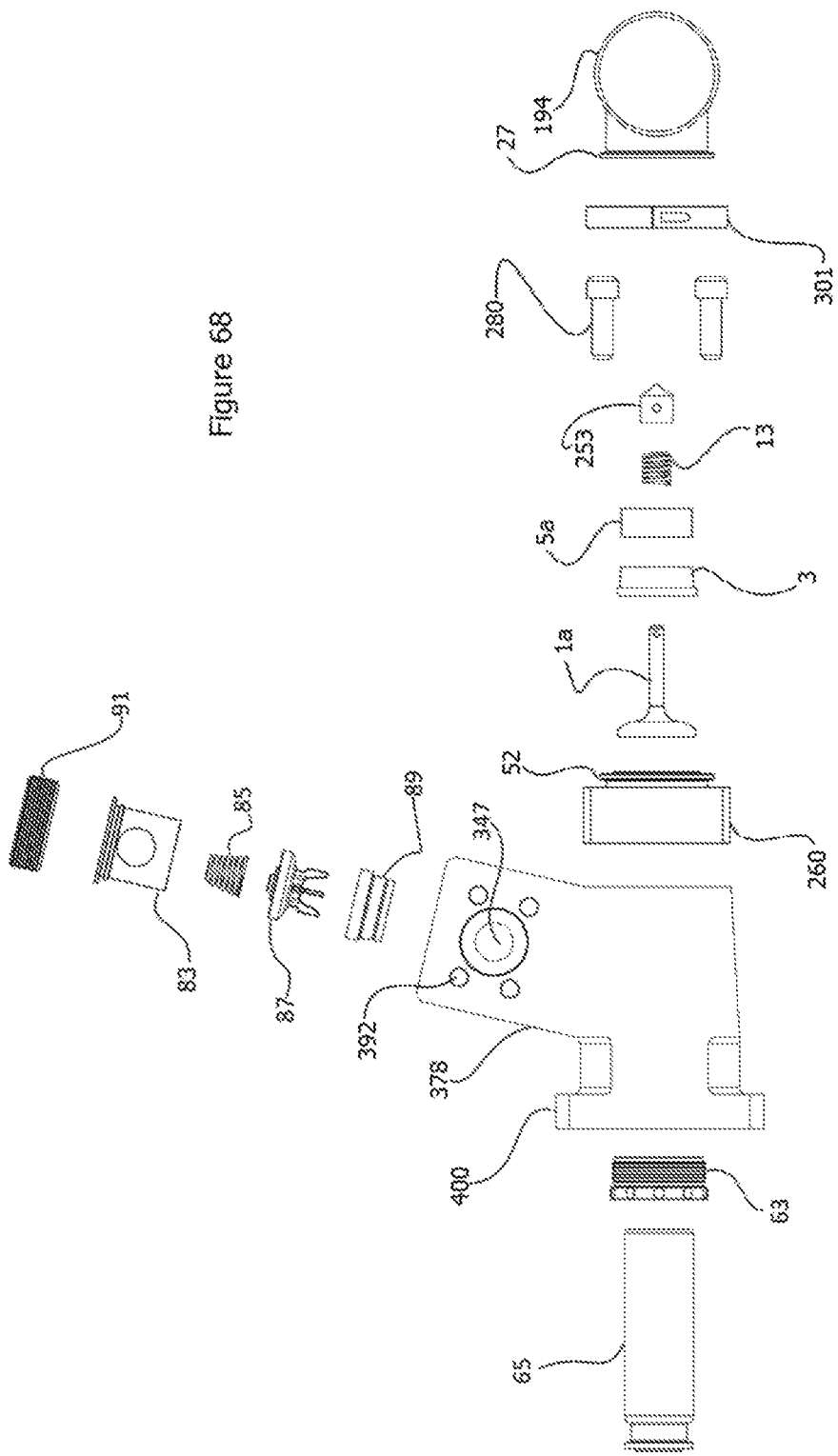
FIG. 68 is a side elevation exploded view of the segmented anti-cavitation fluid end of FIGS. 63 and 64.
Figure 69:
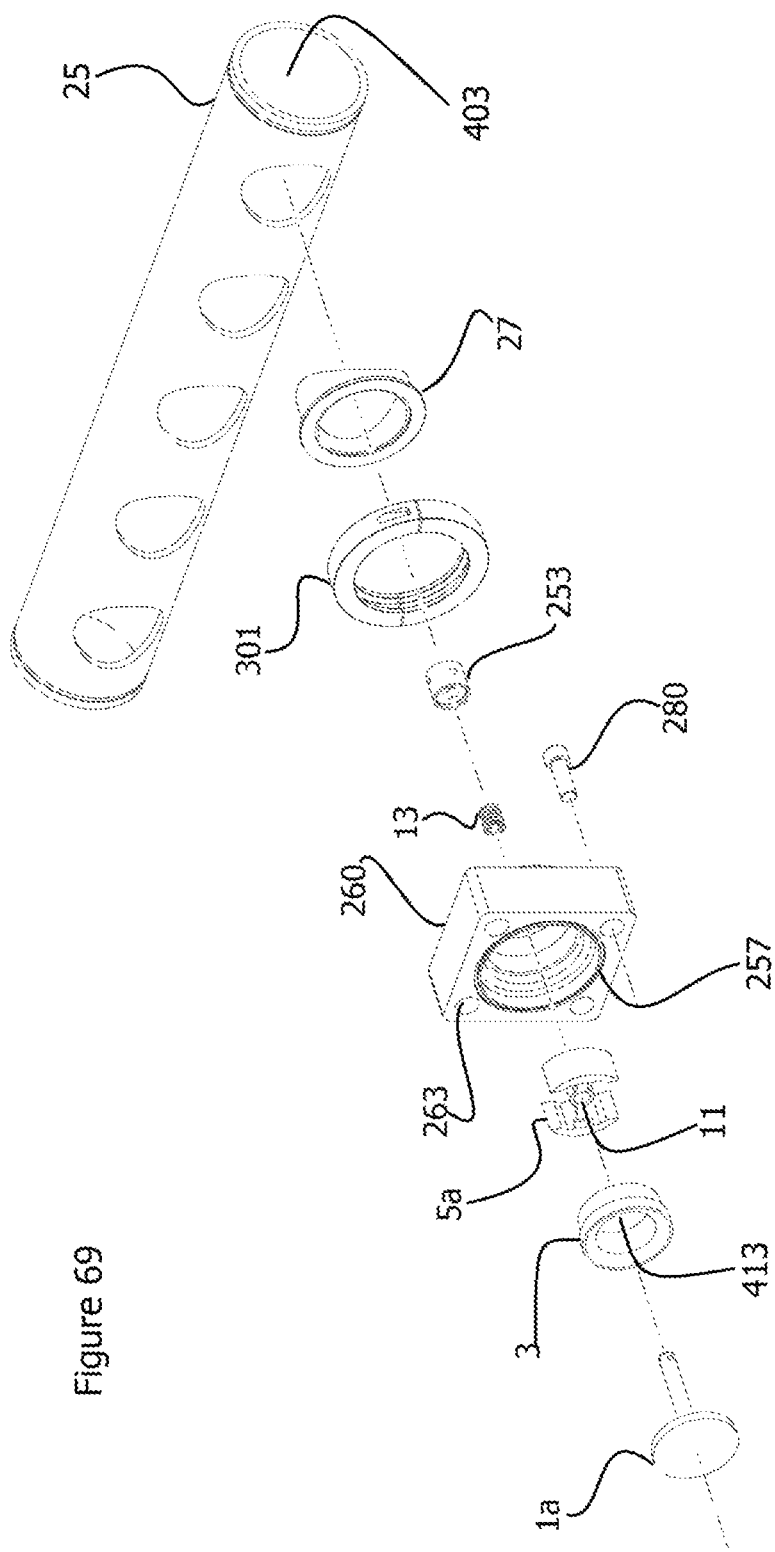
FIG. 69 is an exploded view of a portion of the manifold assembly of FIGS. 63 and 64.

Referring to FIGS. 53, 54, and 56, there is shown a bottle bore 271 built into the ACD. This allows frac fluids to pass around valve. These illustrations show half of the bottle bore in the ACD. The other half is machined into the back of the ACFE. The bottle bore could be machined completely into the ACD or the ACFE. This ACD design allows the design of the much freer flowing ACFE. There is nothing in the market comparable to this ACFE compared to flow output with less cavitation compared to today's conventional designs.

Referring to FIG. 53, there is shown an O-ring sealing gland 274 that seals against leak when the ACD is attached to the ACFE. The type of seals used can vary.

Referring to FIG. 53, there is shown an O-ring sealing gland 277 that seals against leak when the ACD is connected to the suction manifold. The type of seals used can vary.

Figure 55:
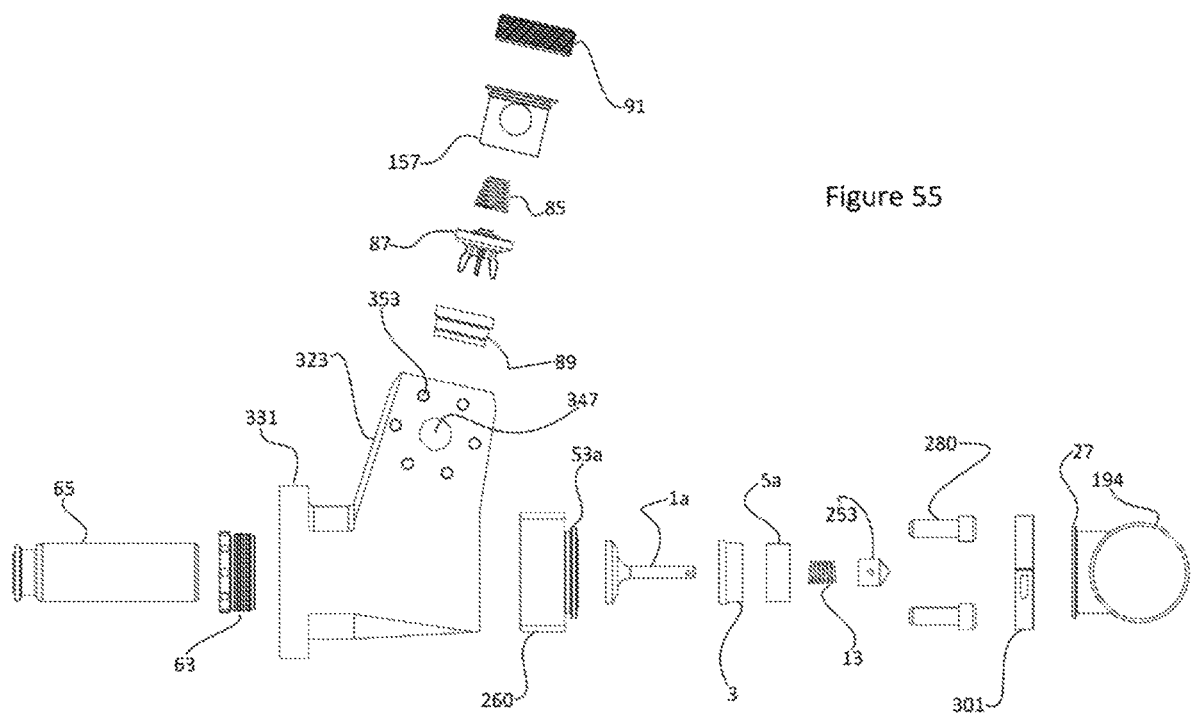
FIG. 55 is an elevation exploded view of the anti-cavitation fluid end of FIG. 48.

Referring to FIGS. 53, 54, and 55, there is shown a bolt 280 to attach max size ACD to new design fluid end. The bolt on ACD allows the largest valve for the center distance of the fluid end.

Referring to FIGS. 53, 54, and 55, there is shown a two-piece clamp 301. This is an alternative method of connecting the suction manifold to the ACD.

Referring to FIGS. 48, 49, 50, 51, 52, there is shown the anti-cavitation fluid end 320 and, referring to FIGS. 53, 54, 55, 56, and 57, there is shown a bolt in version 323. The location and larger ACD allows for the new ACFE. Arranging the larger valve, larger valve than in CFEs, in line with the draw of the plunger, CFEs have to make a 90 degree turn on the suction draw of the plunger which is a restriction to the free flow of the plunger draw which adds to the cavitation in the CFE, allows for a much freer flow of fluids. Aligning the flow of fluids is a great advantage both the ACD designed to fit existing CFEs and the new ACFE design share. The ACFE can be a mono block as illustrated or as a segmented fluid end. the only difference between 320 and 323 is the type connection to the ACD. The angle of the pressure side of the ACFE can be 90 degrees to the plunger or at an angle. An angle version is shown in the illustration. Element 320 of these illustrations depicts a screw-in connection of the ACD to the ACFE. The larger valves used in the ACD are larger than the valves used in conventional fluid ends. High pressure fluid ends are restricted to smaller valves due to the strength needs of the CFE to keep from getting the walls of the fluid end from getting so thin that the fluid end cracks and is a complete loss. The ACFE does not have this restraint because the valve is located outside of the fluid end. Only center distance between cylinders gives the ACD a valve restriction. This allows for the larger valve which gives easier volume pull which cuts down on cavitation. The size of valve to plunger diameter is a major difference between CFE and the ACFE. In CFE designs the higher the pressure the thicker the walls have to be which makes for smaller valves. That and the valve not being located in line with the draw of the plunger is the reason CFEs cavitate so bad. The location and size of the valve also are regulating out by controlling the rpm of the pump. The built-in restrictions of the CFE make cavitation worse as you increase the rpm because the draw cannot keep up with the demand. Since the ACD valve on the ACFE is located in optimum position and you have a much larger valve you can run the pump at a higher rpm before cavitation starts. Thus, the output of the ACFE is greater than the CFE and is a much stronger fluid end. The higher output and stronger fluid end offer a much better value to the consumer.

Figure 52:
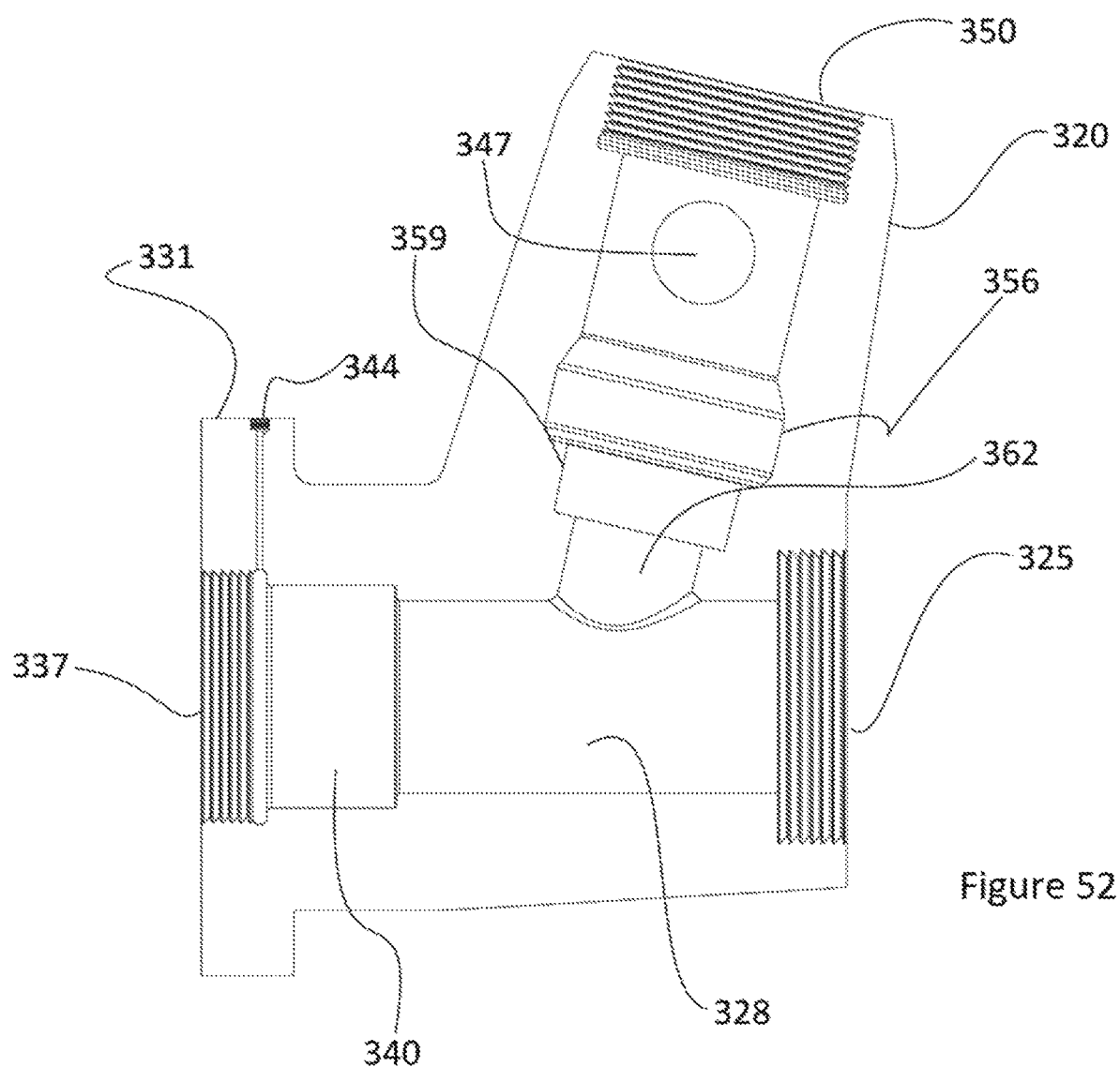
FIG. 52 is a side elevation sectional view of the anti-cavitation fluid end in accordance with another embodiment.

Referring to FIGS. 48, and 52, there is shown a screw-in cavity 325 for connection with the screw-in ACD. the location and larger ACD allows for the new ACFE. This cavity is for the larger screw-in design ACD. The screw end has a size restriction, but its restriction allows for a larger valve than in the CFE. When an even larger valve is required, the bolt on ACD 323 may be used. The attachment of the ACD makes for a much faster intake valve change. You have to pull the pressure valve to get access to pull the suction or intake valve for removal in CFEs. You can change the intake valve of the ACD without removal of the pressure valve. Usually both valves are changed at the same time in the CFEs because of the way the valves have to removed. The intake valve wears less than the pressure valve and, with the ACD, you change the valves when needed instead of the way the valves are changed in most CFE. This provides a good cost savings to the consumer.

Anti-Cavitation Fluid End

The discussion above has related, in part, to modifications to conventional fluid ends ("CFEs"). This disclosure provides a new fluid end as shown in FIGS. 48-57. In the following discussion as well as the rest of this disclosure, like parts will be referenced with like element numbers.

As discussed, the ACD adds a second intake valve which makes it easier to draw fluid into the compression chamber than drawing through a single valve. A plunger with a diameter of 4.5" is the most typical sized plunger and the highest percentage of length of stroke is 8". The pump can run up to 5 strokes per second. The valve seat for the diameter plunger has an inside diameter of 3.2". the surface area is 8.0425. The plunger diameter of 4.5" has a surface area of 15.9043". The ratio of plunger surface area to valve surface area in conventional fluid ends is problematic and is the main cause of cavitation in all CFEs. You simply cannot pull enough fluid through the valve seat to keep up with demand. All the high horsepower fluid ends, the ones illustrated in the discussion above, have the same ratios. By utilizing the existing hole in the back of conventional fluid ends, another 8.0425" of surface area of available fluid draw is provided that is also in a straight line with the draw of the plunger. The ratio of plunger diameter to valve seat diameter as provided herein is plunger 15.9043 to valve seat diameter 16.085". These ratios help provide a better performing fluid end with much less cavitation and more output per stroke. This ratio gain is the reason cavitation is drastically reduced.

This higher ratio of plunger surface area to valve surface area allows the pump to be run at a higher rpm, increasing the total output of the pump with reduced cavitation.

Conventional fluid ends draw from below the plunger, usually at a 90-degree angle. Making the turn with the fluid puts more strain on the draw contributing to the cavitation problem. It is easier to go in a straight line than make a 90-degree turn, especially at increased speeds. As conventional fluid ends have similar restrictions, these restrictions prevent such fluid ends from exceeding their current performance level. Larger valves cannot be put into current CFE's without fluid end failure.

The Anti-Cavitation Fluid End of the present disclosure (ACFE) raises the level of performance in maintenance and output of the pump far above the maximum level of conventional fluid ends. The ACFE can be manufactured as a mono block or segmented fluid end.

In the design of the present disclosure, the intake valve and intake valve fluid access from the fluid end have been removed. Thus, the fluid end is much stronger. There are no 90-degree hard turns necessary to get a full charge of fluid. A larger ACD than that discussed above is coupled to the back of the fluid end in-line with the draw of the plunger, the optimum position. Because of this alignment, even with standard valve sizes, the ACFE will produce less cavitation.

Different valve sizes may be chosen for the ACFE to give control of fluid end tuning. This permits the operator to tune the ACFE for maximum performance by, for example, matching plunger to valve ratios, depending upon performance levels and customer demands. This tuning cannot be performed today with conventional fluid ends.

The largest ACD can utilize the center distance of all fluid ends for placement of a larger valve seat. As more fluid can pass through larger openings than smaller ones, this increased size of the in-line valve seat permits the ACFE to achieve the same result with one valve than CFE's having two. The larger removable ACD is cheaper to produce than manufacturing the intake requirements of a mono block.

The ACFE provides greater fluid end strength because the large intake valve cavity of CFE's is replaced with solid steel. Thus, the ACFE weighs less than a comparable CFE. Quite a lot of mass is removed when you take away all mass needed to support the intake valve of all fluid ends. As the vast majority of frac pumps are mobile, weight is a factor on highway bound mobile units due to highway weight regulations.

Changing the ACD valve is much faster and easier than the conventional method in a mono block which requires removal of the pressure valve in order to gain access to remove the intake valve. There is ready access for removal of the ACD. The valve of the ACD can be changed in the field or switched out with another ACD ready to go into service. The one removed may be easily repaired back at the shop when time permits. Thus, the ACFE intake valve may be changed faster than any other CFE intake valve.

In CFE's, the arm that holds the intake valve spring in a compressed position fails frequently. CFE arms are usually formed from thin pieces of metal which, in the full flow of fluid entering the fluid end, either wear out quickly or break. CFE arms can also fail because grooves machined into the fluid end that hold the arm get washed out. The entire intake system of CFEs is restrictive to production and prone to failure.

The ACFE of the present disclosure replaces the entire CFE intake system and places a larger intake valve into the optimum position, in-line with the draw of the plunger, resulting in much higher output than the CFEs can achieve.

The mono block ACFE can also easily be designed as a segmented fluid end. Segmenting the fluid end will not affect the ACDs attached to the ACFE.

The most common form of CFEs is the mono block. There are few segmented fluid ends. The ACFE costs less to produce than other mono block fluid ends. The ACFE offers smaller forging size, less machining time, and less assembly time.

Referring to FIGS. 49 and 54, inner larger spring retainer 7a with a freer flow design to accommodate the larger design for the ACFE is shown. This retainer is for use in the larger ACD that would be used in the ACFE. Its design could be used in the standard ACD that fits existing fluid ends.

Referring to FIGS. 48, 50, 53, and 55, a clamp 53a is shown which can be used instead of screw-on caps to connect the suction manifold to the ACD. There are many ways to connect the suction manifold to the ACD.

Referring to FIGS. 48, 49, 50, 53, 54, the one-piece valve 1a design can be used in standard ACDs and in the ACFE, a much larger size may be used.

Referring to FIGS. 48, 49, 50, 53, 54, an ACD inner spring retainer 5a alternative design is shown. This performs a same or similar function as spring retainer 5 but is larger and a freer flow design.

Referring to FIGS. 49, 54, an alternative valve stem guide 11a though spring retainer is shown which performs a same or similar function as valve stem guide 11 though spring retainer.

Referring to FIG. 53, there is shown a bottle bore cut into back of ACFE 326 to accept a larger ACD. This version of the ACD bolts on. By bolting the ACD on you can take full advantage of the center distance of the fluid end. In all versions but the bolt on style, you have to worry about getting the walls of the fluid end so thin that the fluid end fails in operation under high pressure. In the internal versions of the ACD, the compression chamber is used as the bottle bore. In this illustration, the ACD shares the bottle bore with the ACFE. Half of the bottle bore is in the ACD and the other half is in the ACFE. The bottle bore could be machined all in the ACFE or in the ACD. The bottle bore dictates the size of the valve used in all fluid ends. The very high pressures that the fluid end is run keep the valve at a restrictive size. So, all CFE plunger diameter to valve size ratio is wrong. In conventional mono blocks, when running a 5" diameter plunger, the most common diameter path through the valve assembly is 3.20". You can see running the full stroke, up to 5 times a second, that you cannot pull enough fluid through the valve to keep up. You have to slow down the strokes per second to get the fluid flow down so that the fluid supply is proper to the strokes per second. Once you go past what the supply should be is when cavitation starts. When the demand is greater than the supply you are trying to stretch the fluid, which cause cavitation bubbles to form. The higher the demand over supply the more cavitation occurs. By moving the valve to the outside of the fluid end you can increase the size of the valve which increases the flow up to 100%, that is at pressures up to 20,000 psi. The bolt on ACD allows more fluid output because of greater fluid access and you can run at a higher RPM before cavitation occurs. This design of the ACD will only work with the ACFE, not existing CFEs. The larger valve system is what will make the ACFE the highest output and longer lived, due to much less cavitation, fluid end in the market.

Referring to FIGS. 48, 50, 52, 53, and 56, there is shown a compression chamber 328 of the ACFE. The compression chamber 328 is provided in different sizes. The different sizes accommodate different size plungers. The smaller the plunger, the higher the pressure the pump can attain before failure. The plunger can be removed the same as in the CFE-just unscrew or remove the bolts of the ACDs.

Referring to FIGS. 48, 49, 50, 51, 52, 53, 54, 55, 56, and 57, there is shown a mounting flange 331 of the ACFE. The illustrations show the most common way of attaching the fluid end to the power frame. These illustrations show stay rods to be used to locate the ACFE. This is the same way to attach the CFE to power frames. There are other ways of attachment due to other pump designs or new quick-change hookups.

Referring to FIGS. 49, and 54, there is shown holes 334 in the mounting flange to accept stay rods. These holes 334 are present in the ACFE and the CFE if using the type flange illustrated.

Referring to FIGS. 49, 52, 53, and 56, there is shown a recessed threaded area 337 to screw in a packing nut that holds the packing that seals the fluid end to the moving plungers. The packing nut can have different ways of connecting to the fluid end, different threads or bolted on as in an external packing gland, but all the different ways provide the same function.

Referring to FIGS. 48, 52, 53, and 56, there is shown a packing gland 340. This area holds the packing seals. All fluid ends use packing seals to seal against leakage.

Referring to FIGS. 48, 49, 52,53, 54, and 56, there is shown Referring to FIGS. 48, 49, 50, 51, 52, 53, 54, 55, 56, and 57, there is shown Referring to FIGS. 49, 52, 54, and 56, there is shown a lubrication path 344 to lubricate the packing seals. All packing seals have to be lubricated due to the friction between the packing and the plunger.

Referring to FIGS. 49, 50, 51, 54, 55, and 57, there is shown a pressurized fluid exit 347 out of fluid end. All fluid ends have a pressure outlet. They can be different diameters and locations. The location is different in the ACFE. It allows the exiting fluid for adjacent cylinders to pass over the valve spring and retainer instead of through the spring as in most fluid ends.

Referring to FIGS. 48, 52, and 56, there is shown a retaining nut area 350. This area 350 holds the retaining nut. The nut holds the spring retainer of the ACFE and gives access to the pressure valve and seat for installation and removal. All CFEs have this access for removal of the pressure valve and seat. In the CFE the pressure valve has to be removed to remove the intake valve seat.

Referring to FIGS. 52, and 56, there is shown a taper area 359 to hold the pressure valve seat. This area 359 is where the pressure valve seat is installed.

Referring to FIGS. 52, 53, and 56, there is shown an exit path 362 of pressurized fluid out of the compression chamber. This is a transition area where fluid is pushed out of the compression chamber and through the valve for exit out of the fluid end.

Referring to FIG. 53, there are shown threaded bolt holes 365 to hold the bolt on ACD to the ACFE. The bolts can vary in size and quantity depending on center distance of the ACFE and pressures run.

Segmented Anti-Cavitation Fluid End

The discussion above has related, in part, to modifications to CFE's and ACFE's. This disclosure provides a new fluid end as shown in FIGS. 58-69. The modifications discussed above with respect to CFE's and ACFE's are easily applied to this new fluid end, a Segmented Anti-Cavitation Fluid End (SACFE). Therefore, with respect to the SACFE, like parts are referenced with like element numbers.

While there has been illustrated and described what is, at present, considered to be a preferred embodiment of the present invention, it will be understood by those skilled in the art that various changes and modifications may be made, and equivalents may be substituted for elements thereof without departing from the true scope of the invention. Therefore, it is intended that this invention not be limited to the particular embodiment disclosed as the best mode contemplated for carrying out the invention, but that the invention will include all embodiments falling within the scope of this disclosure.

I claim:

1. A fluid end adapted to be operatively connected to a power frame and a source of hydraulic fracturing fluid, the fluid end comprising one or more intake chambers, one or more exhaust chambers, a compression chamber, a plunger chamber, and one or more intake manifolds;

the intake manifolds being fluidly connected to the intake chambers such that the intake manifolds are adapted to deliver the hydraulic fracturing fluid to the intake chambers;

the intake chambers each comprising intake valve assemblies adapted to regulate flow from the intake chambers to the compression chamber;

the exhaust chambers each comprising a valve assembly adapted to regulate flow from the compression chamber to the exhaust chambers;

the plunger chamber adapted to receive a plunger; and wherein one of the one or more intake chambers comprises an anti-cavitation chamber, the anti-cavitation chamber being across from and co-planar with the plunger chamber.

2. The fluid end of claim 1, the anti-cavitation chamber being axially aligned with the plunger chamber.

3. The fluid end of claim 1, the one or more intake manifolds comprising an anti-cavitation manifold, the anti-cavitation manifold being adapted to supply the anti-cavitation chamber with the hydraulic fracturing fluid.

4. The fluid end of claim 3, wherein the anti-cavitation chamber comprises an anti-cavitation device, the anti-cavitation device comprising a housing comprising an anti-cavitation valve assembly.

5. The fluid end of claim 4, wherein the anti-cavitation device housing comprises one piece.

6. The fluid end of claim 4, wherein the anti-cavitation device housing comprises first and second pieces, the first piece comprising a barrel chamber and the second piece being adapted to retain the first piece.

7. The fluid end of claim 4, the one or more intake chambers comprising a second intake chamber, the second intake chamber comprising a longitudinal axis that is intersecting of a longitudinal axis of the plunger chamber.

8. The fluid end of claim 7, the one or more intake manifolds further comprising a second intake manifold adapted to supply the second intake chamber with the hydraulic fracturing fluid.

9. The fluid end of claim 8, the anti-cavitation manifold and the second intake manifold being fluidly connected.

10. A method of reducing cavitation within a fluid end comprising the steps of:

providing a fluid end comprising an intake chamber, an exhaust chamber, a compression chamber, a plunger chamber, and an access opening across from and axially aligned with the plunger chamber;

inserting an anti-cavitation device comprising an intake valve assembly into the access opening, the intake valve assembly being adapted to regulate the flow of hydraulic fracturing fluid into the compression chamber; and connecting the anti-cavitation device to an intake manifold adapted to supply hydraulic fracturing fluid to the anti-cavitation device.

11. The method of claim 10, wherein the intake chamber comprises a second intake valve assembly, the method further comprising the steps of:

providing a second intake manifold adapted to supply hydraulic fracturing fluid to the intake chamber.

12. The method of claim 11 comprising the additional step of:

fluidly connecting the first intake manifold with the second intake manifold.

13. The method of claim 11, wherein the anti-cavitation device comprises a one-piece housing.

14. The method of claim 11, wherein the anti-cavitation device comprises a two-piece housing.

15. The method of claim 11, wherein the fluid end is a segmented fluid end.

16. The method of claim 11, wherein the fluid end is a one-piece fluid end.

17. An anti-cavitation device comprising a housing and valve assembly, the housing being adapted to be sealingly inserted into an access opening of a fluid end, the access opening being positioned across from and axially aligned with the plunger chamber.

18. The anti-cavitation device of claim 17, the housing comprising threads adapted to retain the anti-cavitation device within the access opening.

19. The anti-cavitation device of claim 18, the housing comprising two pieces, the first piece comprising a barrel chamber and the second piece being adapted to retain the first piece.

20. The anti-cavitation device of claim 19, the housing being adapted to be fluidly connected to an intake manifold.

* * * * *